United States Patent
Kim et al.

(10) Patent No.: US 12,512,223 B2
(45) Date of Patent: Dec. 30, 2025

(54) SYSTEMS AND METHODS OF PROVIDING DEEP LEARNING BASED NEUROCOGNITIVE IMPAIRMENT EVALUATION USING EXTENDED REALITY

(71) Applicant: The Board of Trustees of the University of Illinois, Urbana, IL (US)

(72) Inventors: Inki Kim, Urbana, IL (US); Adam Cross, Peoria, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/530,965

(22) Filed: Dec. 6, 2023

(65) Prior Publication Data
US 2024/0186009 A1  Jun. 6, 2024

Related U.S. Application Data

(60) Provisional application No. 63/386,172, filed on Dec. 6, 2022.

(51) Int. Cl.
*G16H 50/20* (2018.01)
*G06F 3/01* (2006.01)
(Continued)

(52) U.S. Cl.
CPC ............ *G16H 50/20* (2018.01); *G06F 3/011* (2013.01); *G06T 13/40* (2013.01); *G06T 19/006* (2013.01);
(Continued)

(58) Field of Classification Search
CPC ... G06T 19/006; G06T 2210/41; G06T 19/00; G06T 2215/16; G06T 13/40; G06T 15/00;
(Continued)

(56) References Cited

U.S. PATENT DOCUMENTS 11,556,777 B2  1/2023  Wang et al.
2013/0171596 A1*  7/2013  French ................... G09B 19/00
434/236
(Continued)

OTHER PUBLICATIONS

Echemendia, Ruben J., et al. "The sport concussion assessment tool 5th edition (SCAT5)." British journal of sports medicine (2017).
(Continued)

*Primary Examiner* — Sujit Shah
(74) *Attorney, Agent, or Firm* — Quarles & Brady LLP

(57) ABSTRACT

Systems and methods of deep-learning neurocognitive impairment evaluation using extended reality. One system includes an electronic processor configured to generate an extended reality user environment ("XR-UX") for display via a user device, the XR-UX including a first augmented object configured to change position within the XR-UX and a second augmented object configured to dynamically change position within the XR-UX based on a position of the user device. The electronic processor is also configured to control the first augmented object to traverse a path within the XR-UX. The electronic processor is also configured to receive motion data describing movement of the user device. The electronic processor is also configured to determine a medical classification based on the physical movement of the user device in relation to the path. The electronic processor is also configured to generate and transmit an assessment report for display, the assessment report including the medical classification.

19 Claims, 29 Drawing Sheets

(51) Int. Cl.
  *G06T 13/40*   (2011.01)
  *G06T 19/00*   (2011.01)
  *G16H 15/00*   (2018.01)
  *G16H 50/50*   (2018.01)
(52) U.S. Cl.
  CPC .............. *G16H 15/00* (2018.01); *G16H 50/50* (2018.01); *G06T 2200/24* (2013.01); *G06T 2210/41* (2013.01)
(58) Field of Classification Search
  CPC .... G06T 2200/24; G16H 50/20; G16H 20/70; G16H 20/30; G16H 50/30; G16H 40/67; G16H 15/00; G06F 3/015; G06F 1/163; G06F 3/011; G06F 3/016; G06F 3/013; G06F 3/012; A61B 5/6803; A61B 5/4082; A61B 5/163; A61B 5/4088; A61B 3/113; A61B 5/742; A61B 5/0077; A61B 5/375
  See application file for complete search history.

(56) References Cited

U.S. PATENT DOCUMENTS

2021/0304504 A1* 9/2021 Parr ....................... G06T 15/005
2022/0313143 A1* 10/2022 Reneker ............... H04N 13/344

OTHER PUBLICATIONS

Jaeger, Sabrina, et al. "Challenges for brain data analysis in VR environments." 2019 IEEE Pacific Visualization Symposium (PacificVis). IEEE, 2019.
Ameen, Saleem, et al. "AI and clinical decision making: the limitations and risks of computational reductionism in bowel cancer screening." Applied Sciences 12.7 (2022): 3341.
Harris, Sarah A., et al. "Do sideline tests of vestibular and oculomotor function accurately diagnose sports-related concussion in adults? A systematic review and meta-analysis." The American journal of sports medicine 50.9 (2022): 2542-2551.
Chancellor, Sarah E., et al. "Pathophysiology of concussion." Seminars in Pediatric Neurology. vol. 30. WB Saunders, 2019.
Murphy, Sarah, et al. "Tripartite stratification of the Glasgow Coma Scale in children with severe traumatic brain injury and mortality: An analysis from a multi-center comparative effectiveness study." Journal of neurotrauma 34.14 (2017): 2220-2229.
Schlinger, Henry D. "The myth of intelligence." Psychological Record 53.1 (2003): 15-32.
Benthall, Sebastian. "Don't fear the reaper: refuting Bostrom's superintelligence argument." arXiv preprint arXiv:1702.08495 (2017).
Hubenschmid, Sebastian, et al. "Relive: Bridging in-situ and ex-situ visual analytics for analyzing mixed reality user studies." Proceedings of the 2022 CHI Conference on Human Factors in Computing Systems. 2022.
Seborg, D. E., Thomas F. Edgar, and S. L. Shah. "Adaptive control strategies for process control: a survey." AIChE Journal 32.6 (1986): 881-913.
Shahriari, Bobak, et al. "Taking the human out of the loop: A review of Bayesian optimization." Proceedings of the IEEE 104.1 (2015): 148-175.
Sharma, Neha, Vibhor Jain, and Anju Mishra. "An analysis of convolutional neural networks for image classification." Procedia computer science 132 (2018): 377-384.
Zhai, Shumin. "Characterizing computer input with Fitts' law parameters—the information and non-information aspects of pointing." International Journal of Human-Computer Studies 61.6 (2004): 791-809.
Sinha, Sudeshna, Ramakrishna Ramaswamy, and J. Subba Rao. "Adaptive control in nonlinear dynamics." Physica D: Nonlinear Phenomena 43.1 (1990): 118-128.
Snyder, Aliyah R., and Christopher C. Giza. "The future of concussion." Seminars in Pediatric Neurology. vol. 30. WB Saunders, 2019.
Stutz, David, and Andreas Geiger. "Learning 3d shape completion under weak supervision." International Journal of Computer Vision 128 (2020): 1162-1181.
Subagdja, Budhitama, and Ah-Hwee Tan. "Interactive teachable cognitive agents: Smart building blocks for multiagent systems." IEEE Transactions on Systems, Man, and Cybernetics: Systems 46.12 (2016): 1724-1735.
Park, Sun Young, et al. "Identifying challenges and opportunities in human-AI collaboration in healthcare." Conference Companion Publication of the 2019 on Computer Supported Cooperative Work and Social Computing. 2019.
Polinder, Suzanne, et al. "A multidimensional approach to post-concussion symptoms in mild traumatic brain injury." Frontiers in neurology 9 (2018): 1113.
Tagge, Chad A., et al. "Concussion, microvascular injury, and early tauopathy in young athletes after impact head injury and an impact concussion mouse model." Brain 141.2 (2018): 422-458.
Taylor, Luke, and Geoff Nitschke. "Improving deep learning with generic data augmentation." 2018 IEEE symposium series on computational intelligence (SSCI). IEEE, 2018.
Teasdale, Graham, and Bryan Jennett. "Assessment of coma and impaired consciousness: a practical scale." The Lancet 304.7872 (1974): 81-84.
Romão, Teresa. "Fostering Learning and Behavior Change Through Computer Entertainment." Entertaining the Whole World (2014): 41-62.
Theiler, James. "Efficient algorithm for estimating the correlation dimension from a set of discrete points." Physical review A 36.9 (1987): 4456.
Geijtenbeek, Thomas. "Scone: Open source software for predictive simulation of biological motion." Journal of Open Source Software 4.38 (2019): 1421.
Saaty, Thomas L. "Decision making—the analytic hierarchy and network processes (AHP/ANP)." Journal of systems science and systems engineering 13 (2004): 1-35.
Vassiliadis, Dimitris. "Parametric adaptive control and parameter identification of low-dimensional chaotic systems." Physica D: Nonlinear Phenomena 71.3 (1994): 319-341.
Kristman, Vicki L., et al. "Methodological issues and research recommendations for prognosis after mild traumatic brain injury: results of the International Collaboration on Mild Traumatic Brain Injury Prognosis." Archives of physical medicine and rehabilitation 95.3 (2014): S265-S277.
Vlachos, I., and D. Kugiumtzis. "State space reconstruction for multivariate time series prediction." arXiv preprint arXiv:0809.2220 (2008).
Wright, W. Geoffrey, et al. "Assessing subacute mild traumatic brain injury with a portable virtual reality balance device." Disability and rehabilitation 39.15 (2017): 1564-1572.
Wang, Senzhang, Jiannong Cao, and S. Yu Philip. "Deep learning for spatio-temporal data mining: A survey." IEEE transactions on knowledge and data engineering 34.8 (2020): 3681-3700.
Warrick, Douglas, et al. "Hummingbird flight." Current Biology 22.12 (2012): R472-R477.
Zhao, Xiangmo, et al. "Fusion of 3D LIDAR and camera data for object detection in autonomous vehicle applications." IEEE Sensors Journal 20.9 (2020): 4901-4913.
Zibrek, Katja, Elena Kokkinara, and Rachel McDonnell. "Don't stand so close to me: investigating the effect of control on the appeal of virtual humans using immersion and a proximity-based behavioral task." Proceedings of the ACM Symposium on Applied Perception. 2017.
Zipursky, Amy R., et al. "Evaluation of brief screening tools for neurocognitive impairment in HIV/AIDS: a systematic review of the literature." AIDS (London, England) 27.15 (2013): 2385.
Larson, Erik J. The myth of artificial intelligence: why computers can't think the way we do. Harvard University Press, 2021.
Luck, Michael, and Ruth Aylett. "Applying artificial intelligence to virtual reality: Intelligent virtual environments." Applied artificial intelligence 14.1 (2000): 3-32.

(56) References Cited

OTHER PUBLICATIONS

Gong, Liang, Åsa Fast-Berglund, and Björn Johansson. "A framework for extended reality system development in manufacturing." IEEE Access 9 (2021): 24796-24813.

Gordon, Kevin E., and Stefan Kuhle. "Reported concussion'time trends within two national health surveys over two decades." Brain injury 32.7 (2018): 843-849.

Govindarajan, Usharani Hareesh, Amy JC Trappey, and Charles V. Trappey. "Immersive technology for human-centric cyberphysical systems in complex manufacturing processes: a comprehensive overview of the global patent profile using collective intelligence." Complexity 2018 (2018): 1-17.

Grebogi, Celso, Edward Ott, and James A. Yorke. "Crises, sudden changes in chaotic attractors, and transient chaos." Physica D: Nonlinear Phenomena 7.1-3 (1983): 181-200.

Guastello, Stephen J. "Emergence in organizations and human collective intelligence." (2013).

Guastello, Stephen J. "Nonlinear dynamical systems for theory and research in ergonomics." New Paradigms in Ergonomics (2020): 17-43.

Hall, Lynne, et al. "Designing empathic agents: Adults versus kids." Intelligent Tutoring Systems: 7th International Conference, ITS 2004, Maceió, Alagoas, Brazil, Aug. 30-Sep. 3, 2004. Proceedings 7. Springer Berlin Heidelberg, 2004.

Hallac, David, Peter Nystrup, and Stephen Boyd. "Greedy Gaussian segmentation of multivariate time series." Advances in Data Analysis and Classification 13.3 (2019): 727-751.

Hanocka, Rana, et al. "Meshcnn: a network with an edge." ACM Transactions on Graphics (ToG) 38.4 (2019): 1-12.

Levin, Harvey S., and Ramon R. Diaz-Arrastia. "Diagnosis, prognosis, and clinical management of mild traumatic brain injury." The Lancet Neurology 14.5 (2015): 506-517.

Hassani, Kaveh, Ali Nahvi, and Ali Ahmadi. "Design and implementation of an intelligent virtual environment for improving speaking and listening skills." Interactive Learning Environments 24.1 (2016): 252-271.

Belanger, Heather G., et al. "Factors moderating neuropsychological outcomes following mild traumatic brain injury: A meta-analysis." Journal of the International Neuropsychological Society 11.3 (2005): 215-227.

Hedrick, Tyson L., et al. "Morphological and kinematic basis of the hummingbird flight stroke: scaling of flight muscle transmission ratio." Proceedings of the Royal Society B: Biological Sciences 279.1735 (2012): 1986-1992.

Losoi, Heidi, et al. "Recovery from mild traumatic brain injury in previously healthy adults." Journal of neurotrauma 33.8 (2016): 766-776.

Verma, Himanshu, et al. "Rethinking the role of AI with physicians in oncology: revealing perspectives from clinical and research workflows." Proceedings of the 2023 CHI Conference on Human Factors in Computing Systems. 2023.

Ho, Wan Ching, Kerstin Dautenhahn, and Chrystopher L. Nehaniv. "Comparing different control architectures for autobiographic agents in static virtual environments." International Workshop on Intelligent Virtual Agents. Berlin, Heidelberg: Springer Berlin Heidelberg, 2003.

Ho, Wan Ching, Kerstin Dautenhahn, and Chrystopher L. Nehaniv. "Computational memory architectures for autobiographic agents interacting in a complex virtual environment: A working model." Connection Science 20.1 (2008): 21-65.

Ho, Wan Ching, and Kerstin Dautenhahn. "Towards a narrative mind: The creation of coherent life stories for believable virtual agents." International Workshop on Intelligent Virtual Agents. Berlin, Heidelberg: Springer Berlin Heidelberg, 2008.

Ho, Wan Ching, and Scott Watson. "Autobiographic knowledge for believable virtual characters." International Workshop on Intelligent Virtual Agents. Berlin, Heidelberg: Springer Berlin Heidelberg, 2006.

Hollan, James, Edwin Hutchins, and David Kirsh. "Distributed cognition: toward a new foundation for human-computer interaction research." ACM Transactions on Computer-Human Interaction (TOCHI) 7.2 (2000): 174-196.

Hospedales, Timothy, et al. "Meta-learning in neural networks: A survey." IEEE transactions on pattern analysis and machine intelligence 44.9 (2021): 5149-5169.

Howard, Jeremy, and Sylvain Gugger. "Fastai: A layered API for deep learning." Information 11.2 (2020): 108.

Zając, Hubert D., et al. "Clinician-facing AI in the Wild: Taking Stock of the Sociotechnical Challenges and Opportunities for HCI." ACM Transactions on Computer-Human Interaction 30.2 (2023): 1-39.

Paquin, Hugo, Alex Taylor, and William P. Meehan III. "Office-based concussion evaluation, diagnosis, and management: pediatric." Handbook of Clinical Neurology 158 (2018): 107-117.

MacKenzie, I. Scott, Tatu Kauppinen, and Miika Silfverberg. "Accuracy measures for evaluating computer pointing devices." Proceedings of the SIGCHI conference on Human factors in computing systems. 2001.

Yurkiewicz, Ilana R., et al. "Outcomes from a US military neurology and traumatic brain injury telemedicine program." Neurology 79.12 (2012): 1237-1243.

Kim, Inki, and Mukhil Umashankar. "A Real-Time Analysis of Human Performance in Interactive and Adaptive Mixed-Reality Simulation." 2022 IEEE/ACM Conference on Connected Health: Applications, Systems and Engineering Technologies (CHASE). IEEE, 2022.

Ishida, Toru, et al. "Augmented Experiment: Participatory Design with Multiagent Simulation." IJCAI. vol. 7. 2007.

Iverson, Grant L., et al. "Predictors of clinical recovery from concussion: a systematic review." British journal of sports medicine 51.12 (2017): 941.

Resch, Jacob E., et al. "The sensitivity and specificity of clinical measures of sport concussion: three tests are better than one." BMJ Open Sport-Exercise Medicine 2.1 (2016).

Jameson, Anthony, and Krzysztof Z. Gajos. "19 Systems That Adapt to Their Users."

Jaques, Natasha, et al. "Understanding and predicting bonding in conversations using thin slices of facial expressions and body language." Intelligent Virtual Agents: 16th International Conference, IVA 2016, Los Angeles, CA, USA, Sep. 20-23, 2016, Proceedings 16. Springer International Publishing, 2016.

Reneker, Jennifer C., et al. "Technology and concussion: A scoping review." Journal of Concussion 5 (2021): 2059700221992952.

Fox, Jesse, Jeremy Bailenson, and Joseph Binney. "Virtual experiences, physical behaviors: The effect of presence on imitation of an eating avatar." Presence: Teleoperators and Virtual Environments 18.4 (2009): 294-303.

Scheibmeir, Jim, and Yashwant Malaiya. "Contextualization of the Augmented Reality Quality Model through Social Media Analytics." Advances in Science, Technology and Engineering Systems Journal 5.4 (2020): 184-191.

Jindal, Gaurav, Rajan R. Gadhia, and Prachi Dubey. "Neuroimaging in sports-related concussion." Clinics in Sports Medicine 40.1 (2021): 111-121.

Yue, John K., et al. "Transforming research and clinical knowledge in traumatic brain injury pilot: multicenter implementation of the common data elements for traumatic brain injury." Journal of neurotrauma 30.22 (2013): 1831-1844.

Haarbauer-Krupa, Juliet, et al. "Epidemiology of chronic effects of traumatic brain injury." Journal of neurotrauma 38.23 (2021): 3235-3247.

Drexler, K. Eric. "Reframing superintelligence: Comprehensive AI services as general intelligence." Future of Humanity Institute, University of Oxford (2019).

Kadariya, Dipesh, et al. "kBot: knowledge-enabled personalized chatbot for asthma self-management." 2019 IEEE International Conference on Smart Computing (SMARTCOMP). IEEE, 2019.

Kalman, Ri E. "Design of a self-optimizing control system." Transactions of the American Society of Mechanical Engineers 80.2 (1958): 468-477.

(56) References Cited

OTHER PUBLICATIONS

Possin, Katherine L., et al. "The brain health assessment for detecting and diagnosing neurocognitive disorders." Journal of the American Geriatrics Society 66.1 (2018): 150-156.
Kazakov, Rossen, Susan Howick, and Alec Morton. "Managing complex adaptive systems: A resource/agent qualitative modelling perspective." European Journal of Operational Research 290.1 (2021): 386-400.
Kiddle, Steven J., Nicola Voyle, and Richard JB Dobson. "A blood test for Alzheimer's disease: progress, challenges, and recommendations." Journal of Alzheimer's Disease 64.s1 (2018): S289-S297.
King, Abby C., et al. "Testing the comparative effects of physical activity advice by humans vs. computers in underserved populations: The COMPASS trial design, methods, and baseline characteristics." Contemporary clinical trials 61 (2017): 115-125.
Kliková, B., and Aleš Raidl. "Reconstruction of phase space of dynamical systems using method of time delay." Proceedings of WDS. vol. 11. 2011.
Klyubin, Alexander S., Daniel Polani, and Chrystopher L. Nehaniv. "Representations of space and time in the maximization of information flow in the perception-action loop." Neural computation 19.9 (2007): 2387-2432.
Kobsa, Alfred, Jürgen Koenemann, and Wolfgang Pohl. "Personalised hypermedia presentation techniques for improving online customer relationships." The knowledge engineering review 16.2 (2001): 111-155.
Kontos, Anthony P., et al. "Neuropsychological assessment following concussion: an evidence-based review of the role of neuropsychological assessment pre-and post-concussion." Current pain and headache reports 20 (2016): 1-7.
World Health Organization. Global status report on violence prevention 2014. World Health Organization, 2014.
Kontos, Anthony P., et al. "Discriminative validity of vestibular ocular motor screening in identifying concussion among collegiate athletes: A national collegiate athletic association-department of defense concussion assessment, research, and education consortium study." The American journal of sports medicine 49.8 (2021): 2211-2217.
Lahav, Alon, and Ayellet Tal. "Meshwalker: Deep mesh understanding by random walks." ACM Transactions on Graphics (TOG) 39.6 (2020): 1-13.
Pierpoint, Lauren A., and Christy Collins. "Epidemiology of sport-related concussion." Clinics in sports medicine 40.1 (2021): 1-18.
Lempke, Landon B., Julianne D. Schmidt, and Robert C. Lynall. "Athletic trainers' concussion-assessment and concussion-management practices: an update." Journal of athletic training 55.1 (2020): 17-26.
Lichtenstein, Benyamin B., and Donde Ashmos Plowman. "The leadership of emergence: A complex systems leadership theory of emergence at successive organizational levels." (2009).
Carroll, Linda J., et al. "Systematic review of the prognosis after mild traumatic brain injury in adults: cognitive, psychiatric, and mortality outcomes: results of the International Collaboration on Mild Traumatic Brain Injury Prognosis." Archives of physical medicine and rehabilitation 95.3 (2014): S152-S173.
Liu, Haiyang, Zhihai Wang, and Yange Sun. "Stacking model of multi-label classification based on pruning strategies." Neural Computing and Applications 32 (2020): 16763-16774.
Liu, Xiaolan, et al. "Distributed intelligence in wireless networks." IEEE Open Journal of the Communications Society (2023).
Lombardi, Gemma, et al. "Structural magnetic resonance imaging for the early diagnosis of dementia due to Alzheimer's disease in people with mild cognitive impairment." Cochrane Database of Systematic Reviews 3 (2020).
Lumba-Brown, Angela, et al. "Centers for Disease Control and Prevention guideline on the diagnosis and management of mild traumatic brain injury among children." JAMA pediatrics 172.11 (2018): e182853-e182853.
Manley, Geoff T., et al. "A systematic review of potential long-term effects of sport-related concussion." British journal of sports medicine (2017).
Marcus, Hani J., et al. "Vestibular dysfunction in acute traumatic brain injury." Journal of neurology 266 (2019): 2430-2433.
Peeters, Marieke MM, et al. "Hybrid collective intelligence in a human-AI society." AI & society 36 (2021): 217-238.
Halstead, Mark E., Kevin D. Walter, and Council on Sports Medicine and Fitness. "Sport-related concussion in children and adolescents." Pediatrics 126.3 (2010): 597-615.
Marr, Bernard. "Extended Reality in Healthcare: 3 Reasons the Industry Must Get Ready for AR and VR." Forbes, Forbes Magazine, Jun. 15, 2021, www.forbes.com/sites/bernardmarr/2021/06/14/extended-reality-in-healthcare-3-reasons-the-industry-must-get-ready-for-ar-and-vr/?sh=3ba8acc673a4.
Matejka, Justin, Tovi Grossman, and George Fitzmaurice. "Ambient help." Proceedings of the SIGCHI Conference on Human Factors in Computing Systems. 2011.
Kraus, Matthias, et al. "The value of immersive visualization." IEEE computer graphics and applications 41.4 (2021): 125-132.
Mehlmann, Gregor, et al. "Multiple agent roles in an adaptive virtual classroom environment." Intelligent Virtual Agents: 10th International Conference, IVA 2010, Philadelphia, PA, USA, Sep. 20-22, 2010. Proceedings 10. Springer Berlin Heidelberg, 2010.
Meier, Timothy B., et al. "The underreporting of self-reported symptoms following sports-related concussion." Journal of science and medicine in sport 18.5 (2015): 507-511.
Zhu, Mengqi, et al. "An objective balance error scoring system for sideline concussion evaluation using duplex kinect sensors." Sensors 17.10 (2017): 2398.
Dewan, Michael C., et al. "Estimating the global incidence of traumatic brain injury." Journal of neurosurgery 130.4 (2018): 1080-1097.
Ellis, Michael J., et al. "Evaluation of a pilot paediatric concussion telemedicine programme for northern communities in Manitoba." International journal of circumpolar health 78.1 (2019): 1573163.
McCrea, Michael, et al. "Unreported concussion in high school football players: implications for prevention." Clinical journal of sport medicine 14.1 (2004): 13-17.
Fine, Michael S., et al. "Dynamic motor tracking is sensitive to subacute mTBI." Experimental brain research 234 (2016): 3173-3184.
Brundage, Miles. "Taking superintelligence seriously: Superintelligence: Paths, dangers, strategies by nick bostrom (Oxford university press, 2014)." Futures 72 (2015): 32-35.
Milgram, Paul, and Fumio Kishino. "A taxonomy of mixed reality visual displays." IEICE Transactions on Information and Systems 77.12 (1994): 1321-1329.
Miller, Gabrielle F., et al. "Predictors of traumatic brain injury morbidity and mortality: examination of data from the national trauma data bank: predictors of TBI morbidity & mortality." Injury 52.5 (2021): 1138-1144.
Mucha, Anne, et al. "A brief vestibular/ocular motor screening (VOMS) assessment to evaluate concussions: preliminary findings." The American journal of sports medicine 42.10 (2014): 2479-2486.
Soares, Nate, and Benja Fallenstein. "Aligning superintelligence with human interests: A technical research agenda." Machine Intelligence Research Institute (MIRI) technical report 8 (2014).
Agar, Nicholas. "Don't worry about superintelligence." Journal of Ethics and Emerging Technologies 26.1 (2016): 73-82.
Carion, Nicolas, et al. "End-to-end object detection with transformers." European conference on computer vision. Cham: Springer International Publishing, 2020.
Obermeyer, Ziad, and Ezekiel J. Emanuel. "Predicting the future—big data, machine learning, and clinical medicine." The New England journal of medicine 375.13 (2016): 1216.
Oertel, Catharine, et al. "Engagement in human-agent interaction: An overview." Frontiers in Robotics and AI 7 (2020): 92.
Ong, Triton, et al. "Extended reality for enhanced telehealth during and beyond COVID-19." JMIR serious games 9.3 (2021): e26520.
Mitra, Paroma, and Tariq Sharman. "HIV neurocognitive disorders." (2020).

(56) References Cited

OTHER PUBLICATIONS

Parveau, Marc, and Mehdi Adda. "Toward a user-centric classification scheme for extended reality paradigms." Journal of Ambient Intelligence and Humanized Computing 11 (2020): 2237-2249.

Fitts, Paul M., and James R. Peterson. "Information capacity of discrete motor responses." Journal of experimental psychology 67.2 (1964): 103.

Meeuwisse, W., and J. Dvorak. "Consensus statement on concussion in sport—the 5 th." (2017).

Thagard, Paul. "Cognitive architectures." The Cambridge handbook of cognitive science 3 (2012): 50-70.

Peng, Bei, et al. "A need for speed: Adapting agent action speed to improve task learning from non-expert humans." Proceedings of the international joint conference on autonomous agents and multiagent systems. 2016.

Schatz, Philip, et al. "Sensitivity and specificity of the ImPACT Test Battery for concussion in athletes." Archives of clinical neuropsychology 21.1 (2006): 91-99.

Pincus, Steven M. "Approximate entropy as a measure of system complexity." Proceedings of the National Academy of Sciences 88.6 (1991): 2297-2301.

Reiners, Dirk, et al. "The combination of artificial intelligence and extended reality: A systematic review." Frontiers in Virtual Reality 2 (2021): 721933.

Bootsma, Reinoud J., Laure Fernandez, and Denis Mottet. "Behind Fitts' law: kinematic patterns in goal-directed movements." International Journal of Human-Computer Studies 61.6 (2004): 811-821.

Seifabadi, Reza, et al. "Correlation of ultrasound tomography to MRI and pathology for the detection of prostate cancer." Medical Imaging 2019: Ultrasonic Imaging and Tomography. vol. 10955. SPIE, 2019.

Wilson, Robert C., et al. "Balancing exploration and exploitation with information and randomization." Current opinion in behavioral sciences 38 (2021): 49-56.

Zemek, Roger L., et al. "Prognosticators of persistent symptoms following pediatric concussion: a systematic review." JAMA pediatrics 167.3 (2013): 259-265.

Rosenstein, Michael T., James J. Collins, and Carlo J. De Luca. "A practical method for calculating largest Lyapunov exponents from small data sets." Physica D: Nonlinear Phenomena 65.1-2 (1993): 117-134.

McCrory, Paul, et al. "Consensus statement on concussion in sport—the 5th international conference on concussion in sport held in Berlin, Oct. 2016." British journal of sports medicine 51.11 (2017): 838-847.

Smith, Aaron W., Kyley McGeeney, and Maeve Duggan. "US smartphone use in 2015." (2015).

Tariq, Aftab, Ahmad Yousaf Gill, and Hafiz Khawar Hussain. "Evaluating the Potential of Artificial Intelligence in Orthopedic Surgery for Value-based Healthcare." International Journal of Multidisciplinary Sciences and Arts 2.1 (2023): 27-35.

Collie, Alexander, et al. "CogSport: reliability and correlation with conventional cognitive tests used in postconcussion medical evaluations." Clinical journal of sport medicine 13.1 (2003): 28-32.

Peterson, Alexis B., et al. "Surveillance report of traumatic brain injury-related emergency department visits, hospitalizations, and deaths, United States, 2014." (2019).

Caraban, Ana, et al. "23 ways to nudge: A review of technology-mediated nudging in human-computer interaction." Proceedings of the 2019 CHI conference on human factors in computing systems. 2019.

Anderson, Brian DO, and Arvin Dehghani. "Challenges of adaptive control-past, permanent and future." Annual reviews in control 32.2 (2008): 123-135.

Candelieri, Antonio, Andrea Ponti, and Francesco Archetti. "Uncertainty quantification and exploration-exploitation trade-off in humans." Journal of Ambient Intelligence and Humanized Computing (2021): 1-34.

Apple Developer. Visualizing and Interacting with a Reconstructed Scene.; 2022. https://developer.apple.com/documentation/arkit/content_anchors/visualizing_and_interacting_with_a_reconstructed_scene.

Araki, Takashi, Hiroyuki Yokota, and Akio Morita. "Pediatric traumatic brain injury: characteristic features, diagnosis, and management." Neurologia medico-chirurgica 57.2 (2017): 82-93.

Ashby, William R. "An introduction to cybernetics." (1956).

Asken, Breton M., et al. "Concussion Basics III: serum biomarker changes following sport-related concussion." Neurology 91.23 (2018): e2133-e2143.

Asken, Breton M. "Concussion biomarkers: deviating from the garden path." JAMA neurology 76.5 (2019): 515-516.

Atri, Alireza. "The Alzheimer's disease clinical spectrum: diagnosis and management." Medical Clinics 103.2 (2019): 263-293.

Barakonyi, Istvan, and Dieter Schmalstieg. "Augmented reality agents for user interface adaptation." Computer Animation and Virtual Worlds 19.1 (2008): 23-35.

Barr, William B. "Point/Counter-Point-Links between traumatic brain injury and dementia remain poorly defined." Archives of clinical neuropsychology 35.2 (2020): 128-132.

Alhaji, Basel, et al. "Engineering human-machine teams for trusted collaboration." Big Data and Cognitive Computing 4.4 (2020): 35.

Ben Abdessalem, Hamdi, and Claude Frasson. "Real-time brain assessment for adaptive virtual reality game: A neurofeedback approach." Brain Function Assessment in Learning: First International Conference, BFAL 2017, Patras, Greece, Sep. 24-25, 2017, Proceedings 1. Springer International Publishing, 2017.

Benosman, Mouhacine. "Model-based vs data-driven adaptive control: an overview." International Journal of Adaptive Control and Signal Processing 32.5 (2018): 753-776.

Billsus, Daniel, and Michael J. Pazzani. "Adaptive news access." The adaptive web: methods and strategies of web personalization. Berlin, Heidelberg: Springer Berlin Heidelberg, 2007. 550-570.

Bohon C. Apple's ARKit: Cheat sheet. TechRepublic. Published online 2021. https://www.techrepublic.com/article/apples-arkit-everything-the-pros-need-to-know/.

Bresó, Adrián, et al. "Usability and acceptability assessment of an empathic virtual agent to prevent major depression." Expert Systems 33.4 (2016): 297-312.

Tobalske, Bret W., et al. "Three-dimensional kinematics of hummingbird flight." Journal of Experimental Biology 210.13 (2007): 2368-2382.

Toresdahl, Brett G., et al. "A systematic review of telehealth and sport-related concussion: baseline testing, diagnosis, and management." HSS Journal® 17.1 (2021): 18-24.

Brooks, Rodney. "A robust layered control system for a mobile robot." IEEE Journal of Robotics and Automation 2.1 (1986): 14-23.

Broshek, Donna K., Anthony P. De Marco, and Jason R. Freeman. "A review of post-concussion syndrome and psychological factors associated with concussion." Brain injury 29.2 (2015): 228-237.

Brusilovsky, Peter. "Methods and techniques of adaptive hypermedia." Adaptive hypertext and hypermedia (1998): 1-43.

Franklin, Cat. "Apple unveils new ipad pro with breakthrough lidar scanner and brings trackpad support to ipados." (2020).

Cavedon, Lawrence, et al. ""'C' Mon dude!": Users adapt their behaviour to a robotic agent with an attention model." International Journal of Human-Computer Studies 80 (2015): 14-23.

Centers for Disease Control and Prevention. "Report to congress on traumatic brain injury in the United States: epidemiology and rehabilitation." National Center for Injury Prevention and Control 2 (2015): 1-72.

Cheng, Bo, et al. "Flight mechanics and control of escape manoeuvres in hummingbirds. I. Flight kinematics." Journal of Experimental Biology 219.22 (2016): 3518-3531.

Cohen, Philip R., and Hector J. Levesque. "Intention is choice with commitment." Artificial intelligence 42.2-3 (1990): 213-261.

Corwin, Daniel J., et al. "Vestibular deficits following youth concussion." The Journal of pediatrics 166.5 (2015): 1221-1225.

Costa, Sandra, et al. "Emotional storytelling using virtual and robotic agents." International Journal of Humanoid Robotics 15.03 (2018): 1850006.

(56) References Cited

OTHER PUBLICATIONS

Charek, Daniel B., Michael Collins, and Anthony Kontos. "Office-based concussion evaluation, diagnosis, and management: adult." Handbook of clinical neurology. vol. 158. Elsevier, 2018. 91-105.

Decker, Keith S., and Katia Sycara. "Intelligent adaptive information agents." Journal of Intelligent Information Systems 9 (1997): 239-260.

Dooley, Kevin J. "A complex adaptive systems model of organization change." Nonlinear dynamics, psychology, and life sciences 1 (1997): 69-97.

Christopher, Edward, Kareem W. Alsaffarini, and Aimun A. Jamjoom. "Mobile health for traumatic brain injury: a systematic review of the literature and mobile application market." Cureus 11.7 (2019).

Burgess, Eleanor R., et al. "Healthcare AI Treatment Decision Support: Design Principles to Enhance Clinician Adoption and Trust." Proceedings of the 2023 CHI Conference on Human Factors in Computing Systems. 2023.

Teel, Elizabeth F., et al. "Differential sensitivity between a virtual reality (VR) balance module and clinically used concussion balance modalities." Clinical journal of sport medicine: official journal of the Canadian Academy of Sport Medicine 26.2 (2016): 162.

Kipkogei, Elly, et al. "Explainable transformer-based neural network for the prediction of survival outcomes in non-small cell lung cancer (NSCLC)." medRxiv (2021): Oct. 2021.

Kroshus, Emily, et al. "NCAA concussion education in ice hockey: an ineffective mandate." British journal of sports medicine (2013).

Evangelidis, Konstantinos, Theofilos Papadopoulos, and Stella Sylaiou. "Mixed Reality: A reconsideration based on mixed objects and geospatial modalities." Applied Sciences 11.5 (2021): 2417.

Feng, Yutong, et al. "Meshnet: Mesh neural network for 3d shape representation." Proceedings of the AAAI conference on artificial intelligence. vol. 33. No. 01. 2019.

Fitts, Paul M. "The information capacity of the human motor system in controlling the amplitude of movement." Journal of experimental psychology 47.6 (1954): 381.

Fougères, Alain-Jérôme, and Egon Ostrosi. "Intelligent agents for feature modelling in computer aided design." Journal of Computational Design and Engineering 5.1 (2018): 19-40.

Fralick, Michael, et al. "Association of concussion with the risk of suicide: a systematic review and meta-analysis." JAMA neurology 76.2 (2019): 144-151.

García-Serrano, Ana M., Paloma Martínez, and Josefa Z. Hernández. "Using AI techniques to support advanced interaction capabilities in a virtual assistant for e-commerce." Expert Systems with applications 26.3 (2004): 413-426.

Davis, Gavin A., et al. "The child sport concussion assessment tool 5th edition (Child SCAT5)." British journal of sports medicine (2017).

Gianfrancesco, Milena A., et al. "Potential biases in machine learning algorithms using electronic health record data." JAMA internal medicine 178.11 (2018): 1544-1547.

\* cited by examiner

```
/// Determines the distance the hummingbird should travel in its next movement
/// While the vector and time is also changed by the focus and user. This step does not address that.
/// This is not the final distance the agent may travel. If the agent changes it duration or vector this function may be called again.
/// - Parameters:
///    - movementType: The next planned movement
///    - currentVector: The current vector the hummingbird is planned on traveling on
///    - duration: The duration of the next movement
/// -Returns: A Float that determines the distance the hummingbird will travel in the next step
///
func distanceDetermination (movementType: HummingbirdMovement, currentVector: SIMD3<Float>, duration: Float)
   -> Float{
   let hummingbirdPos = hummingbird.position(relativeTo: nil)
   let spherePos = hummingbird.position(relativeTo: nil)
   let distanceHumSphere = distance(hummingbirdPos, sherePos)
   let distanceCurrent = distance(currentVector, .zero)
   var distance = distanceCurrent
   // The distance between the capture spere and hummingbird is a direct relationship to user
   performance. If the sphere is close to the hummingbird the distance traveled is decreased as
   compared to the distance if the sphere was far from the hummingbird.
   distance = (distanceHum Sphere)/distance
   // .moveHummingbirdForwardAfterStop is the next movement when the hummingbird stopped because if failed
      a safety constraint from the real world space.
   if movementType == .moveHummingbirdForwardAfterStop {
      // Since the warning relates to user safety we want to make sure the hummingbird travels at least 1
         meter from the specifiy Scene Mesh
      // This maintains the ratio determined previously but also meets safety
      while distance < 1 {
         distance *= 2
      }
   }
   return distance
}
```

FIG. 4

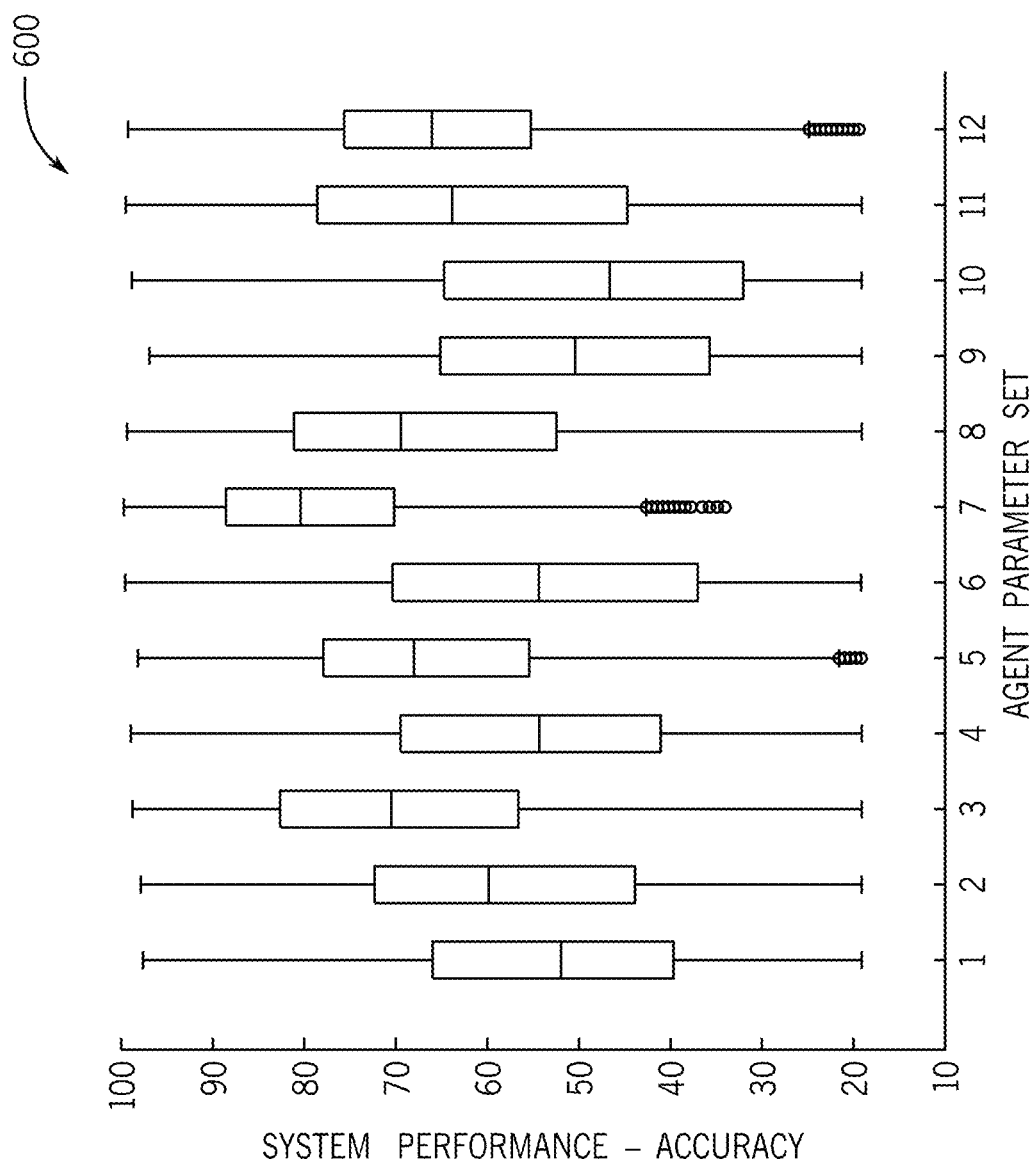

FIG. 9

| PARAMETER SET NO. | PHASE SPACE RECONSTRUCTION | CORRELATION DIMENSION | APPROXIMATED ENTROPY | LARGEST LYAPUNOV EXPONENT | MEAN DISTANCE $E(\|X_U(t_i) - X_A(t_i)\|)$ | STANDARD DEVIATION OF THE DISTANCE $\sqrt{VAR(\|X_U(t_i) - X_A(t_i)\|)}$ |
|---|---|---|---|---|---|---|
| 1 | EMBEDDING DIMENSION:3 ESTIMATED DELAY:10 TIMESERIES LENGTH:19677 | 2.16156 | 0.9153 | 4.17579 | 0.49361 | 0.27944 |
| 2 | EMBEDDING DIMENSION:3 ESTIMATED DELAY:10 TIMESERIES LENGTH:19672 | 2.15233 | 0.8070 | 3.94299 | 0.4573 | 0.32372 |
| 3 | EMBEDDING DIMENSION:3 ESTIMATED DELAY:10 TIMESERIES LENGTH:19790 | 2.07637 | 0.8523 | 4.17237 | 0.27997 | 0.19798 |
| 4 | EMBEDDING DIMENSION:3 ESTIMATED DELAY:10 TIMESERIES LENGTH:19719 | 1.68308 | 0.8982 | 4.00097 | 0.45472 | 0.28182 |
| 5 | EMBEDDING DIMENSION:3 ESTIMATED DELAY:10 TIMESERIES LENGTH:19789 | 2.3478 | 0.7895 | 4.36346 | 0.30979 | 0.20361 |
| 6 | EMBEDDING DIMENSION:3 ESTIMATED DELAY:10 TIMESERIES LENGTH:19715 | 2.28697 | 0.7141 | 4.10641 | 0.55692 | 0.37929 |
| 7 | EMBEDDING DIMENSION:3 ESTIMATED DELAY:10 TIMESERIES LENGTH:19795 | 2.24721 | 0.8273 | 3.96805 | 0.17401 | 0.11693 |
| 8 | EMBEDDING DIMENSION:3 ESTIMATED DELAY:10 TIMESERIES LENGTH:19741 | 2.26906 | 0.7483 | 4.46428 | 0.3858 | 0.33777 |
| 9 | EMBEDDING DIMENSION:3 ESTIMATED DELAY:10 TIMESERIES LENGTH:19613 | 1.78692 | 0.8885 | 4.13649 | 0.61585 | 0.39418 |
| 10 | EMBEDDING DIMENSION:3 ESTIMATED DELAY:10 TIMESERIES LENGTH:19659 | 2.37305 | 0.9092 | 4.92407 | 0.58687 | 0.34126 |
| 11 | EMBEDDING DIMENSION:3 ESTIMATED DELAY:10 TIMESERIES LENGTH:19771 | 2.32681 | 0.7669 | 4.70616 | 0.40691 | 0.30787 |
| 12 | EMBEDDING DIMENSION:3 ESTIMATED DELAY:10 TIMESERIES LENGTH:19791 | 2.44905 | 0.9957 | 4.9297 | 0.32745 | 0.20351 |

SYSTEMS AND METHODS OF PROVIDING DEEP LEARNING BASED NEUROCOGNITIVE IMPAIRMENT EVALUATION USING EXTENDED REALITY

CROSS-REFERENCE TO RELATED APPLICATIONS

This application claims priority to U.S. Provisional Application No. 63/386,172, filed Dec. 6, 2022, the entire contents of which is incorporated herein by reference.

STATEMENT OF FEDERALLY SPONSORED RESEARCH

N/A

BACKGROUND

Neurocognitive impairment ("NCI") takes on many forms, affecting hundreds of millions of individuals worldwide, yet NIC lacks an objective method of detection. Traumatic brain injury ("TBI") is a well-known cause of NCI as TBI has gained considerable media attention over the past twenty years. All forms of dementia, including Alzheimer disease, demonstrate some level of NCI as well. HIV-associated neurocognitive disorders ("HANDS") are another common cause of NCI, affecting 52-63% of infected patients. While substantial research into biomarkers and advanced imaging techniques for each of these conditions is ongoing, no blood test is currently used for diagnosis of NCI in the clinical setting, and imaging studies are insensitive for mild and early disease. The gold-standard diagnostic tool in all cases is one of several validated, but subjective, neuropsychological batteries. These tests are primarily paper-based, dependent on language and education, suffer from learning bias, and must be administered by a healthcare professional.

TBI is the leading cause of both death and disability in children. TBI is the most common cause of disability in all persons up to forty years of age. Symptoms of TBI are wide-ranging and can include confusion, disorientation, amnesia, headache, dizziness, imbalance, impaired cognition, impaired level of consciousness, nausea, sleep disturbance, visual disturbances, motor impairment, and the like. Morbidity and mortality risk for all causes of TBI averages to 1.5%. This risk is significantly higher for individuals identifying as non-Hispanic Black (2.4%) and self-pay (4.7%), suggesting that inequalities likely exist regarding these vulnerable populations.

TBI is further subclassified into mild, moderate, and severe categories based on Glasgow Coma Scale ("GCS") evaluation. The GCS evaluation is a physical exam classification tool that was published nearly fifty years ago. The incidence of mild TBI ("mTBI"), also known as a concussion, has increased rapidly over the past decade, with some sources estimating rates as high as one concussion per two hundred individuals over the age of eleven. Yet our ability to detect and quantify concussion-related injury remains limited to observational and symptom-based tools that are both time-intensive and subjective.

Evidence-based diagnostic and management guidelines were not developed for pediatric mTBI in the United States until 2018. These guidelines, developed by the Centers for Disease Control and Prevention ("CDC"), recommend a combination of computerized cognitive testing and symptom scales to facilitate diagnosis. For example, the Immediate Post-Concussion Assessment and Cognitive Testing ("ImPACT") battery is a proprietary toolkit specifically endorsed by the CDC guidelines and consists of seven tests measuring capabilities across the neurocognitive domains of memory (verbal, visual, and spatial), cognitive processing speed, visual-motor processing speed, impulse inhibition, and self-reported symptom rating. The ImPACT must be administered by a trained medical professional, such as a physician, medic, or athletic trainer.

More objective evaluations, such as CT, MRI, and radiographs, are not routinely indicated within the CDC guidelines due to their expense and low sensitivity and specificity. Many advanced imaging techniques are under investigation, such as specialized diffusion tensor imaging ("DTI"); however, these modalities are costly and lack sufficient evidence for incorporation into current practice. Several biomarkers have been studied as diagnostic tools for mTBI including tau protein levels, anti-glutamate-receptor autoantibodies, multiplex bead array markers, and many others. No marker has yet demonstrated sufficient evidence for endorsement by the CDC.

In practice, only 60% of athletic trainers were using neurocognitive testing for the evaluation of sports-related concussion ("SRC") in 2020 despite neurocognitive testing being designation as the gold standard. Other commonly used tools include the Vestibular/Ocular-Motor Screening ("VOMS"), which is a symptom-based tool, and the Balance Error Scoring System ("BESS"), which requires the evaluator to quantify the number of errors observed while the athlete attempts to balance in different positions and on different surfaces. Further complicating the diagnosis is the fact that approximately half of athletes do not immediately report concussion symptoms. While the causes for underreporting are multifactorial, an estimated 11-16% of high school athletes "sandbag" their results. Sandbagging generally refers to the tactic of intentionally underperforming on an initial evaluation to artificially lower expectations for future evaluations. Sandbagging is used by some athletes as a method of obfuscating a decline in capabilities that might otherwise be detected on post-concussion testing. Sandbagging, combined with symptom underreporting, adversely affects the ability to reliably detect concussion events.

Post-concussion prognostication is even more challenging. Fewer tools exist, and the evidence for any given tool is weak and at times contradictory. While many patients recover fully in a matter of days, others suffer symptoms that persist for months or even years. Some studies suggest that vestibular deficits at the time of injury strongly predict extended recovery times. Other factors may include greater severity of symptoms following injury, history of mental health problems, and history of migraine headaches. Post-concussion syndrome ("PCS") refers to any combination of signs and symptoms attributed to concussion that persist beyond the expected recovery time, which is itself undefined. PCS prevalence remains a topic of study, but its associations with chronic depression, anxiety, and cognitive impairment are well-known. In a recent meta-analysis of 700,000 individuals with mTBI and 6.2 million unaffected individuals, individuals with a known history of mTBI were twice as likely to commit suicide (relative risk of 2.03, 95% CI 1.47-2.80). The complex and variable manifestations, widespread prevalence, and significant associated morbidity further highlight the need for more advanced and widely available detection tools.

SUMMARY OF THE DISCLOSURE

The present disclosure addresses the aforementioned drawbacks by providing systems and methods for establishing a new paradigm of neurocognitive assessment through the creation of a self-administered testing application for mobile devices that generates an objective metric of NCI in multiple manifestations, something that does not exist in current practice. The configurations described herein may be applied to traumatic brain injury in the form of a widely available screening and serial examination tool as an initial test case.

Accordingly, in some examples, the technology disclosed herein may be implemented using a user device, such as, e.g., a mobile communication device. The user device may include a display device (or screen) configured to provide a user interface. The user interface may include a capture object, such as, e.g., a textured translucent capture sphere. In some configurations, the capture object may be positioned in a center of a screen at a set distance from a user. In some configurations, the technology disclosed herein may execute (or otherwise perform) a calibration process (also referred to herein as a calibration period). During the calibration process, the technology disclosed herein may collect data describing environmental surroundings of the user device (e.g., as environment data) and determine, based on the environment data, a set of environment boundaries or constraints. After the calibration process, the technology disclosed herein may present a virtual object, such as, e.g., a virtual hummingbird. The virtual object may be introduced into a mixed reality ("MR") environment. As the virtual object begins to move, the user adjusts the position of their device and the angle of their screen to retain (or capture) the hummingbird within the capture sphere. The bird's simulated trajectory may move in all three axes (e.g., the X-axis, the Y-axis, and the Z-axis), such that the user may adjust in all three dimensions as well. The hummingbird's flight path may be adaptive. As one non-limiting example, in some configurations, the hummingbird may first travel in a simple linear trajectory and progressively becoming more challenging as the user continues to perform well.

The technology disclosed herein may be implemented within the healthcare industry, such as, e.g., for self-administered diagnosis of mTBI. For instance, the technology disclosed herein may be implemented as an advanced medical application for smartphones and tablets that uses mixed reality to test a person's ability to follow an object in 3D space as a way of sampling their neurocognitive functionality (e.g., malfunction(s)). During the test, the user will continuously follow a virtual hummingbird while it flies quickly around the user's area (as seen on their screen using their camera). The hummingbird adapts to the user's performance and actively tries to avoid being captured. Because this tracking task demands agility, complete visual attention, and fast reflexes, even slight errors in movement can reveal subtle signs of NCI. The user's exact tracking path through the cloud network can be shared with doctors in real-time (or near real-time) and replayed on-demand to better understand what their NCI looks like. Alternatively, or in addition, an advanced artificial intelligence ("AI") system analyzes how the user moved in response to the hummingbird's flightpath and determines how and when signs of NCI showed up during the test.

One configuration provides a system for providing neurocognitive impairment simulation using extended reality. The system may include one or more electronic processors. The one or more electronic processors may be configured to generate an extended reality user environment ("XR-UX") for display via a user device, the XR-UX including a first augmented object configured to change position within the XR-UX and a second augmented object configured to dynamically change position within the XR-UX based on a position of the user device. The one or more electronic processors may be configured to control the first augmented object to traverse a path within the XR-UX. The one or more electronic processors may be configured to receive motion data describing physical movement of the user device. The one or more electronic processors may be configured to determine a medical classification based on the physical movement of the user device in relation to the path. The one or more electronic processors may be configured to generate and transmit an assessment report for display, the assessment report including the medical classification.

Another configuration provides a method for providing neurocognitive impairment simulation using extended reality. The method may include generating, with one or more electronic processors, an extended reality user environment ("XR-UX") for display via a user device, the XR-UX including a first augmented object and a second augmented object. The method may include controlling, with the one or more electronic processors, the first augmented object to traverse a path within the XR-UX. The method may include receiving, with the one or more electronic processors, motion data describing movement of the user device. The method may include controlling, with the one or more electronic processors, the second augmented object within the XR-UX to dynamically change position based on the movement of the user device. The method may include determining, with the one or more electronic processors, a medical classification based on the movement of the user device in relation to the path. The method may include generating and transmitting, with the one or more electronic processors, an assessment report for display, the assessment report including the medical classification.

Yet another configuration provides a non-transitory, computer-readable medium storing instructions that, when executed by an electronic processor, perform a set of functions, the set of functions comprising: generating an extended reality user environment ("XR-UX") for display via a user device, the XR-UX including a first augmented object configured to change position within the XR-UX and a second augmented object configured to dynamically change position within the XR-UX based on a position of the user device; controlling the first augmented object to traverse a path within the XR-UX; receiving motion data describing physical movement of the user device; determining a medical classification based on the physical movement of the user device in relation to the path; and generating and transmitting an assessment report for display, the assessment report including the medical classification.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the technology disclosed herein, however, and reference is therefore made to the claims and herein for interpreting the scope of the technology disclosed herein.

BRIEF DESCRIPTION OF THE DRAWINGS

The following drawings are provided to help illustrate various features of examples of the disclosure and are not intended to limit the scope of the disclosure or exclude alternative implementations.

FIG. 4 shows a sample snippet of code representing a function used to determine an agent's travel distance according to some configurations.

FIG. 6 illustrates a boxplot that summarizes the system performance over the different agent parameter-set values experimented according to some configurations.

FIG. 9 illustrates a table summarizing nonlinear dynamic behaviors according to some configurations.

DETAILED DESCRIPTION

Figure 1B:
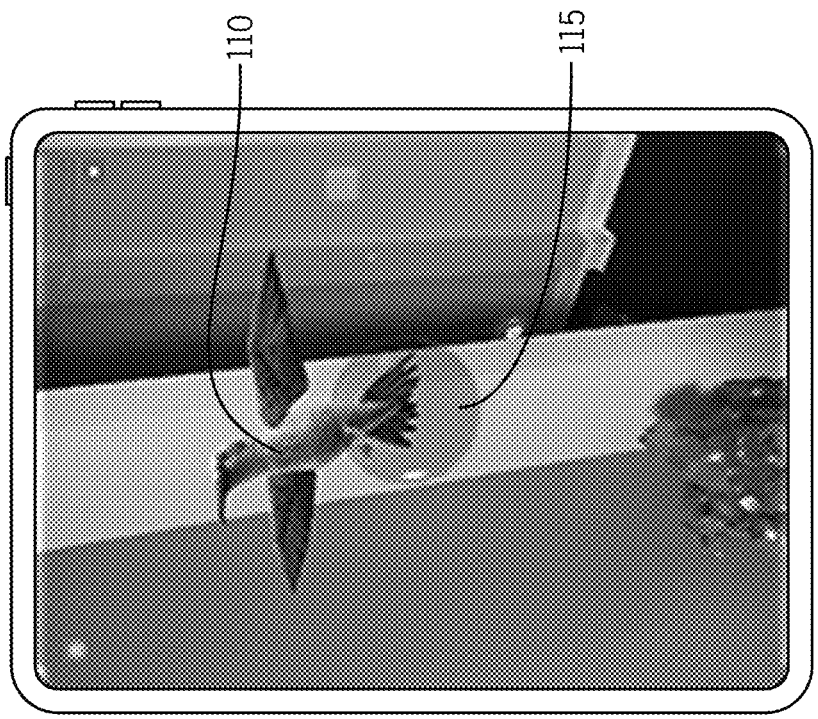
FIGS. 1A-1B illustrate a Scene Mesh and a hummingbird in mixed reality according to some configurations.

As described herein, there are a variety of causes of neurocognitive impairments (NCIs). Mild traumatic brain injury (mTBI), also known as a concussion, can cause a wide variety of short- and long-term disabilities known collectively as NCIs. All forms of dementia, including Alzheimer disease, also demonstrate some level of NCI. HIV-associated neurocognitive disorders (HANDS) are another common cause of NCI, affecting approximately 52-63% of infected patients.

There are gaps in some approaches to evaluating NCI for concussion detection. NCI manifests in diverse and sometimes subtle ways, yet the assessment methods currently used for NCI rely on subjective physical exams and symptom reporting, neither of which is very precise nor reliable, limiting accuracy of detection (e.g., at a fixed 85% specificity rate, sensitivity varies widely across 24-100%). In addition, the NCI examiner's direct observations cannot be reviewed in an open, transparent manner by other physicians to help the other physicians develop second opinions. Further, NCI examinees' perceptions, attitudes, or environments may affect outcomes; it is particularly challenging to detect sports-related concussions (SRCs), of which a substantial number of cases (e.g., approximately 45-65%) go undetected because athletes may not perceive symptoms, athletes may underreport their symptoms in an attempt to keep playing, or athletic trainers lack the necessary knowledge about sideline evaluation tools devised to screen athletes who require clinical assessment. The classic recommendation for the "best" clinical tests is that said testing be administered by a trained clinician, but that approach is time-consuming and impedes early detection. As a result, many TBI victims do not receive proper follow-up care.

Accordingly, such gaps in NCI evaluation pose a clinical problem. Late or missed TBI diagnoses and treatments impact the quality of life of a substantial number of individuals. The estimated annual incidence of diagnosed TBI is the highest (1,299 per 100,000 people) in North America, implying that the rest of the world suffers from a lack of early diagnosis, since low- and middle-income countries are believed to have higher rates of TBI than high-income countries. In the U.S. in 2014, approximately 2.5 million people visited an emergency department (ED) for TBI-related symptoms; however, because that number does not include office-based or outpatient visits, persons serving in the U.S. military, or those who never sought medical care after the injury, it is substantially lower than the true number of TBI cases. Furthermore, morbidity and mortality associated with TBI represent a substantial cost to society. The average mortality risk for all causes of TBI is 1.5 percent; the risk is significantly higher for individuals who identify as non-Hispanic Black (2.4%) or are uninsured (4.7%), suggesting that these vulnerable populations face inequalities in care.

These prevalence and incidence statistics suggest the need for interoperable systems of care so that people at particularly high risk of injury may seek diagnoses early and easily. Although the risk of TBI persists throughout the lifespan at all geographical locations, the highest incidences are found in the youngest (<age 4) and oldest (>age 75) populations. Other incidence peaks are found in children (aged 10-17) because of sports-related injuries, and in young adults (aged 18-24) because of motor vehicle crashes; those two populations, youth athletes and young adults, are the primary target populations for the proposed research.

As described herein, conditions associated with NCI often present heterogeneously through various combinations of physical and cognitive impairments, posing a challenge to diagnosis. Common etiologies, such as TBI and dementia, are not yet routinely identified through objective lab or imaging results but instead rely on a combination of physical and cognitive evaluations as well as symptom reporting. The testing batteries are primarily paper-based, dependent on language and education, suffer from learning bias, and must be administered by a healthcare professional. Accordingly, the technology disclosed herein addresses these limitations by developing a new interoperability standard for NCI based on an individual's ability to track an object within a mixed reality ("MR") space and will first test this paradigm as a novel method for the detection and characterization of concussion.

The technology may use on-board sensors of smartphones and tablets (including Light Detection and Ranging ("LiDAR") systems) to accurately recognize the position and orientation of a user in a MR environment, in which a high-fidelity virtual hummingbird may be programmed to fly and the user may be tasked to capture it with a translucent virtual sphere located a set distance apart from the center of the device screen. The hummingbird was designed to fly adaptive to the user's tracking performance as well as to the environment.

Through the application, the position and rotation of the bird and the user's simulated capture sphere are recorded every $1/60^{th}$ of a second for two minutes as tabular data elements. These data will be converted into a three-dimensional ("3D") representation of the physical position and rotation of both elements for interactive visualization and annotation of tracking patterns, and also for an input to predictive machine-learning to support diagnosis, sub-classification, and prognostication. Concussed and healthy human subjects will be recruited to provide baseline tracking data for the application. The collected data set will then be used to retrain pre-existing high-performance image classification and image segmentation models through the process of transfer learning to facilitate rapid, low-cost testing of varying neural network strategies. The features extracted from the highest-performing retrained models will provide a method of automatically detecting and classifying features of concussion within minutes of injury without requiring the presence of a medical professional. The application will utilize on-device storage and computational resources to improve scalability and reduce bandwidth. Finally, the generated 3D model and accompanying model-detected features will be integrated into the institutional health record data structure to facilitate its practical application in future stages of the project.

The technology disclosed herein provides a tool that enables self-administered sampling and playback of a user's neurocognitive state using a mixed-reality-based application suite on popular and ubiquitous smart mobile devices to facilitate standardized data collection, sharing, and assessment to help achieve a "distributed diagnosis" in extended reality ("XR"). The ultimate result will be interoperable systems that can be used by a combination of expert physicians and artificial intelligence ("AI").

As noted herein, NCI caused by mild traumatic brain injury ("mTBI") manifests in a heterogeneous and sometimes subtle manner, so current screening tools include a detailed and varied array of tests to improve detection. These tests are time-intensive, susceptible to observer and reporter biases, and require language-specific comprehension and verbal communication skills.

To address the drawbacks of current screening tools, the technology disclosed herein provides a new system that is unified, objective, rapid, and self-administered on handheld devices. The disclosed technology may also enable crosstalk between the various forms of NCI by creating a single interoperability standard, opening the field to broader research opportunities. As one non-limiting example, the computational model build by using the technology disclosed herein may enable deeper analysis of the relationship between TBI and dementia, a topic of intense scrutiny over the past few decades but with very few answers to show for it. Utilizing machine learning methods to analyze the data captured with the technology disclosed herein may also provide the ability to detect and categorize NCI at a level of precision beyond currently available methods. This may foster new insights into how various causes of NCI manifest and improve the ability to create finer gradations of severity and prognostication classification systems. Its portability and self-administered functionality also create new possibilities for real-time (or near real-time), on-site testing in remote or dangerous areas, such as evaluating a quarantined individual with an infection, a soldier in a combat zone, etc. On-device processing may also dramatically reduce infrastructure costs, improve scalability, and permit most or all the protected health information to remain with the individual. These features may allow not only the detection and evaluation of how NCI manifests in new ways, but also may bring that opportunity to more people in more places.

Accordingly, the technology disclosed herein provides advantages over existing systems. For instance, a recent review of 29 studies that developed smartphone-accessible applications for measuring functional impairments (in balance, neurocognition, vision, and oculomotor function) concluded that, despite the technologies' superior ability (relative to physician observation) to detect impairments, the technologies cannot be used as standalone tools to replace the gold-standard evaluation because the technologies' false-positive and false-negative rates are too high. The technology disclosed herein may involve going through multi-staged human-subject studies to assess the application's performance in comparison to the gold-standard clinical diagnostic tools.

The following discussion relates to systematic identification of parameters for the design of adaptive agent(s) in extended reality ("XR"). In XR, a user can interact with virtual agent(s) that adapt to the immediate needs of the user and their environment. Most current adaptive agents focus on facilitating reciprocal feedback and communications with human users in which the agent behaviors are reactively rather than proactively reorganizing the user-agent system toward a desirable goal. Just as in biological and organizational systems, an XR system may also be controlled by a small set of powerful parameters to shape adaptive agent behaviors. The technology disclosed herein describes a virtual hummingbird in XR as an adaptive agent and examines the agent-user interaction with human subjects to establish a systems-oriented perspective and design method for adaptive agents in XR. The analysis of variance found that substantial variance exists among the effectiveness of control parameters with respect to implementation. In addition, a nonlinear dynamic analysis indicated a potentially chaotic complex systems dynamic that may underlie a seemingly favorable system status, which is a topic of further investigation. The technology disclosed herein includes a systems-oriented design approach for an adaptive agent in XR that integrates biomimetic design principles, experimental design, parametric systems control, and nonlinear dynamic analyses

1—Introduction

XR, including augmented reality ("AR") and mixed reality ("MR"), has the potential to transform healthcare delivery through information visualization, self-guided interactions, and long-distance collaboration. As the XR field evolves, AI is expected to advance XR by conferring intelligence on XR or producing new insights through smart interpretation of XR-generated data. An optimal combination of AI and XR for healthcare applications is a contemporary topic in the smart health community, and the design of an intelligent agent in XR is one possible approach. A fundamental challenge in the design and implementation of adaptive agents in XR is that of agent adaptation. This is not theoretically well described and thus modeling, analysis, and validation of agent behaviors are not properly guided with consistency. A wealth of theories, methods, and engineering design practices associated with adaptive system have not been threaded together: the theoretical account of complex adaptive systems in biology and in organization; the technical methods of adaptive control; and the practice of adaptive interface design. Historically, those disparate topics have remain siloed in their respective fields, and in those contexts, they have little in common with XR. As a result, the current applications of an adaptive agent in XR lack consensus in their conceptualizations and implementations.

2—Theoretical Basis and Empirical Works of an Adaptive Agent in XR

The notion of adaptive behavior has theoretical origins from the distinct fields of complex systems and control theory, and has been practically demonstrated over a wide array of applications in human-computer interaction ("HCI"). In parallel, intelligent agents have become popular with the growth of AI research. In one topical field of XR, the user can interact with virtual agent(s) that adapt to the immediate needs of the user and/or their environment. However, it currently lacks established guidelines, principles, and methodology to help standardize these adaptive agents in XR. This section will first review a conceptual and theoretical foundation of adaptive behaviors spanning across different fields and translate them in the context of XR. In addition, this section will examine existing methods and issues related to the design of an adaptive agent for such simulation systems.

2.1—Characterizing Adaptive Behaviors in the Context of XR

Theoretically, adaptive behaviors were characterized with observation of similarities and differences among diverse complex systems, such as behaviors of organisms in ecological systems, evolution of human societies, and behaviors of investors in financial markets. When an agent adapts to a new situation, it reorganizes its internal structure of feedback, communication, or workflow patterns. For example, adaptive behaviors are carried out in response to variations/perturbation/disturbance from an external environment by (re)shaping feedback loops within its subsystems so that their feedback control will continue to keep the system at a stable state. Depending on the system purpose and requirements, this feedback control may vary substantially (refer to the different type of control objectives) and towards various purposes, such as minimizing a cost function for self-tuning control or keeping a system robust against disturbance. In addition to these control-theoretic accounts, adaptive behaviors may also change the rule of interaction with an agent (i.e., schemata) or introduce a new set of strategies to an existing workflow. These variable adaptation mechanisms commonly point towards a single goal of keeping the system at a "desired status" rather than outputting stereotypic behaviors or passively assimilating with the environmental variations. To analyze adaptive behaviors, therefore, it is important to identify a set of key behavioral modalities (i.e., parameters for their regulation and presentation) that can keep the system status as desired over time.

For the analysis of a system's status and parameters, non-linear dynamic systems ("NDS") theory have offered rich principles, models, and constructs as a meta-theory. Primarily, adaptive behavior is defined by its self-organizing and learning process, a universal mechanism through which a system can shape its own structure without external aid. If a system is pushed far from equilibrium on the edge of chaos, or its control parameter passes a critical threshold (beyond a bifurcation point), the system's internal structure will reorganize itself through one of the self-organizing dynamics and shifts the system state or phase. The self-organizing dynamics are accompanied with enhanced information flows among the subsystems, often followed by the formation of a new hierarchy among the subsystems in order to create emerging dynamics of bottom-up and top-down influences.

Secondly, adaptive behavior can be effectively induced in an NDS by controlling for its parameter set as shown both in high-dimensional and low-dimensional systems. In general, a parameter or a set of multiple parameters for a system is configured as a constant, and abrupt changes in that parameter set could possibly drive the transition of the dynamical regime of NDS (modelled in terms of bifurcations, catastrophes, and crises). In biological systems, the control of parameter set is vital for adaptive self-regulation against environmental fluctuations. Likewise, in an XR simulation system, a parameter set may shape adaptive agent behavior (i.e., how the agent interacts with human under certain environmental conditions). This study presumes that adaptive agent behavior can be represented by defining and tuning a relevant parameter set in XR. In this context, it is assumed that an XR agent has a predefined goal and schemata (i.e., rules or patterns to drive decision and action) and be rationally bounded with incomplete or biased information, much the same as humans in the system.

Finally, adaptive agent behaviors in XR are linked to a decentralized network of intelligence (i.e., a distributed cognition) in a way that is similar to other digital platforms like email and web, and this similarity has contributed to the growth of collective intelligence. It is anticipated that next-generation communication networks and cyber-physical-human systems ("CPHS") will be the key enablers to bring together humans and agents, and XR is right at the intersection of both technologies. The envisioned XR systems will allow multiple people from remote physical locations to share ideas, plans, and coordinate actions, while smart agents facilitate mutual feedback and communications between humans, between humans and agents, and between humans and their "extended" environment.

2.2—Design of Adaptive Agent in XR

Moving beyond the theoretical and methodological foundations, this section reviews existing adaptive agents that were developed in the context of XR to identify concepts, design issues, and challenges. Typically, virtual agents were used to support human interaction with systems by providing customized information tailored to the individual user, promoting purposeful and socially engaging interaction through adaptive discourses and/or non-verbal communications, adapting the system's behavior-of-interest to the user's mental capacity. AR/VR literature seems to offer a unique perspective on agents as a type of virtual character that is seen as possessing its own will, increasing their perceived unpredictability.

Methodologically, interactive behaviors of adaptive agents are often guided by cognitive process models (such as episodic memory building and retrieval), cognitive architecture, domain-specific user models or scenarios, learning principles, knowledge representations, Bayesian networks, or AI model (such as reinforcement learning). Some literature pursues the design of agent behaviors that manifest particular traits, such as autonomous property (defined as an ability to adapt to context and situation without explicit user intervention), emotional bonding, or autobiographic property (one that possesses short-term memory of limited time span) that is essentially grounded on the subsumption architecture for its behavioral control.

Review of existing agent applications, concepts, and design approaches concludes that current adaptive agents primarily facilitate mutual feedback and communications with human users in which the agent behaviors are targeted at being "reactive" to the user rather than proactively reorganizing the system of user and agent toward a desirable goal. This lack of systems-oriented perspective contributes to the lack of formal methods available to analyze, explain, and control the agent behaviors. The present disclosure will illustrate a systems-oriented approach for the design of agent behaviors by developing and testing an agent in XR. The present disclosure will elaborate on a design process for agent behaviors, describe a systems perspective on the human-agent interaction, and propose a formal method to identify system-related parameters for adaptive behavior control.

3—System-Oriented Design of Adaptive Agent in Extended Reality

This section describes a design of a virtual hummingbird, an XR agent that can realistically fly and interact with a user in mixed-reality (MR) space, identify possible design issues with the control of adaptive behaviors, and propose a systems-oriented approach to help identify a subset of important parameters for the control of behaviors. The purpose of this interaction is to design the agent to fly adaptively in response to the user's object-following performance while the user attempts to keep the agent at the center of a handheld MR device within a virtual "capture sphere". This game-like application is being developed for the purpose of objectively assessing the perceptual, cognitive, and motor capability of the user.

3.1—Agent-User Interaction for the FlightPath in XR

Making the virtual hummingbird fly realistically in XR is not a trivial task as each environment is different in terms of many factors (such as spatial form, lighting, and humans and other objects existing within the space), and every user interacts with the agent and environment differently (so no explicit interaction rules or user models can be regulated). The XR for the FlightPath consists of a mixed blend of real and virtual cues, altogether called "environmental cues". Real cues may include, e.g., a table, sofa, lamp, floor, ceiling, or walls that compose the user's physical, spatial environment. Virtual cues are the ones that are artificially crafted and only visible through the device screen, including the capture sphere, user-set Room Bounds (a virtual spatial boundary within the user's space for the FlightPath, so the hummingbird will only fly within the boundary to ensure that the bird is always "capturable"), and the agent itself.

Technologically, machine-based recognition of a user's physical space with depth is enabled by Light Detection and Ranging (LiDAR)-embedded devices. At every $1/60^{th}$ of a second, the LiDAR receives hundreds of depth points for fusion, and as the user moves around their space, more depth points are created. Then, an augmented-reality framework (developed to combine a device's hardware and processors for sensing, scene processing, and MR display) uses this information to create mesh anchors in the shape of triangles, called the Scene Mesh. All Scene Mesh information may be combined to create the MR environment.

Figure 1A:
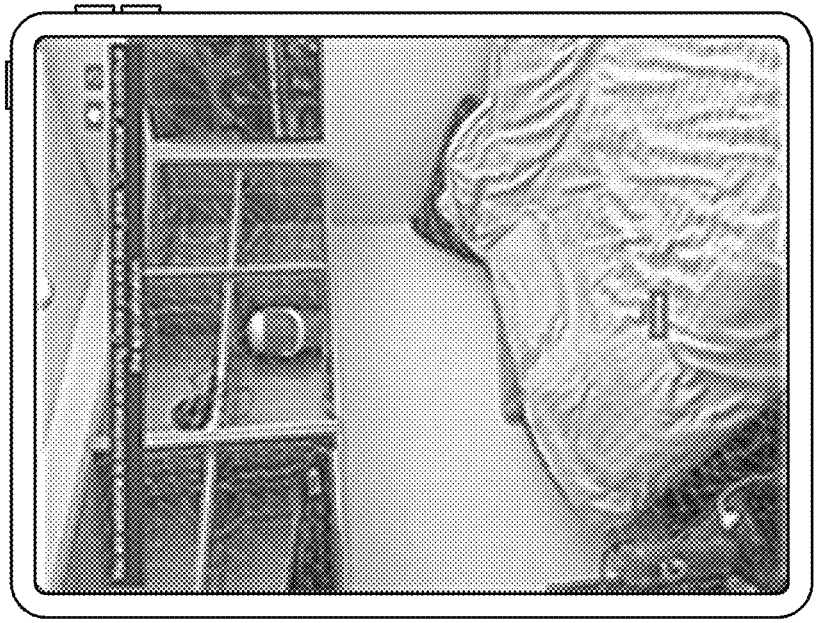

FIGS. 1A-1B illustrate the Scene Mesh and the hummingbird in MR according to some configurations. FIG. 1A is an illustration of multiple Scene Meshes (indicated by green lines), created for the attachment of virtual cues to form a MR space. FIG. 1B illustrates a virtual hummingbird (represented in FIG. 1B by reference numeral 110) created in the MR, which interacts with the user via the virtual capture sphere (represented in FIG. 1B by reference numeral 115) located a fixed distance apart from the display screen center.

For interaction in XR, the agent needs to recognize and examine all environmental cues and algorithmically analyze them to determine its next movements, then develop a response to user's movement in the context of these environmental constraints. Practically speaking, this means that a point of computation for flight planning and execution exists at every moment along the path.

3.2—Agent Behavior Set and Planning-Execution Model for Adaptive Responses

Hummingbirds are known for their characteristic flight motions of hovering, a motion that most avian species avoid because such low-speed flight tends to be energy-expensive. Through its typical flapping patterns (e.g., the long-axis rotation of the humerus, or, equivalently, inverting the wings during upstroke), it can possibly execute insect-like flight strokes that enable rapid transition among hovering, forward flight, and escaping maneuvers. This ability to fly at a speed of less than 5 m/s, combined with the agility to rapidly switch between three flight modes of hovering, forward flight, and escaping, makes hummingbirds a good choice for the adaptive testing of human object-following because the flight modes can be algorithmically altered to result in sudden flight trajectory changes that will help regulate the degree of predictability and difficulty for the task. Having control over predictability allows us to examine the influence of cognitive processes on the task performance (i.e., forming prediction based on learning from the previous flight patterns). The system's ability to manipulate the task difficulty keeps user engaged throughout the activity. This is especially true during the escape phase, which is an evasive reaction to external stimuli (either from human or environment) through rapid and large-angle rotations about all three body axes of the hummingbird, a kind of reactive agent behavior described in in greater detail herein.

Based on the literature of hummingbird flight kinematics and flight control and in the context of human-agent interaction in XR, the present disclosure extends the three flight modes to seven, considering a possible combination of previous flight modes just before switching to the current one, as set forth in Table 1 (below).

heading, a distance to travel with forward flight if applicable, body speed, pitch, and a set length of time to operate the agent). These low-level variables may be used for the characterization and prediction of the agent's future behavior (i.e., where it will be and where it will go at the end of each simulation stage).

Figure 3:
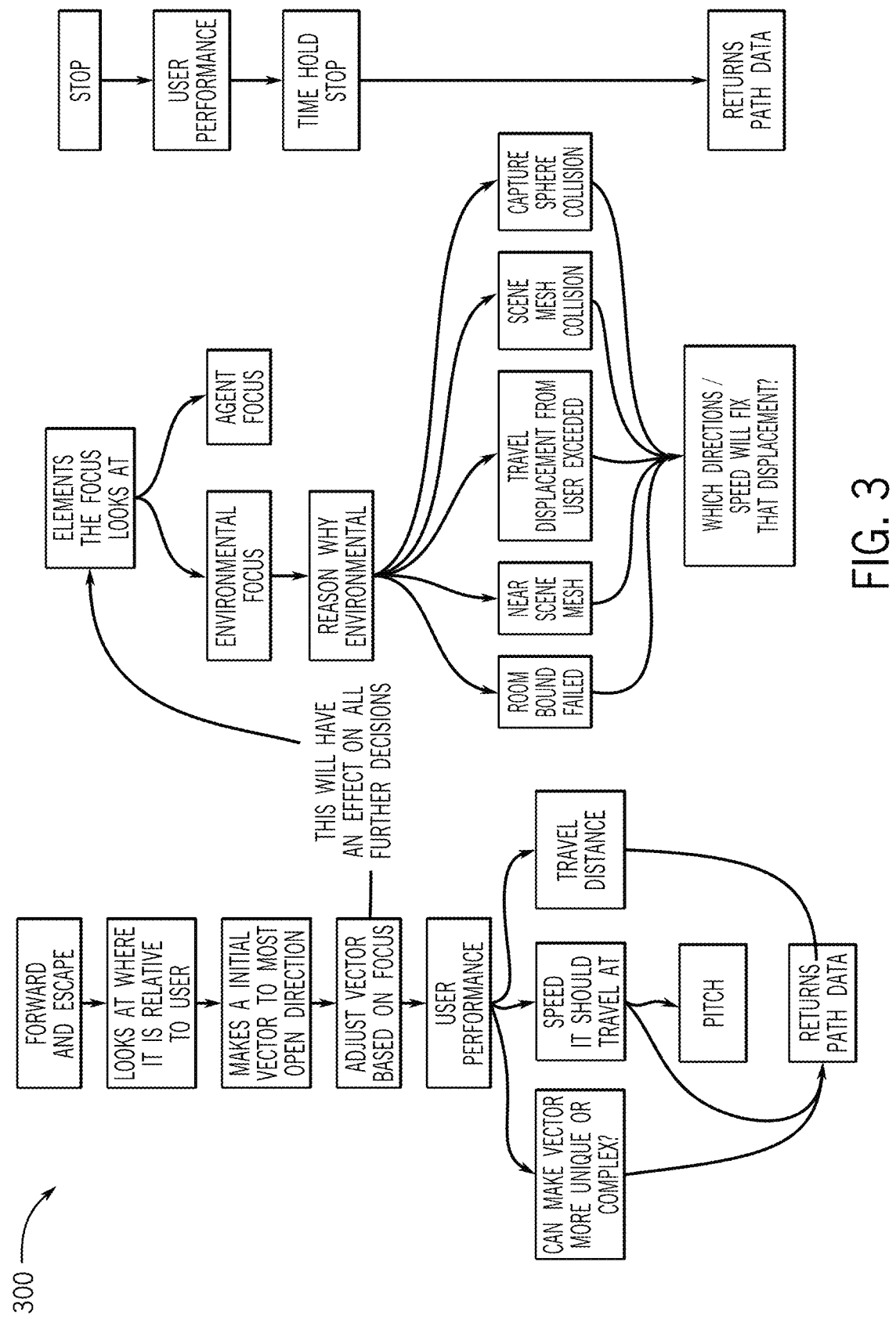
FIG. 3 is an activity diagram illustrating an example process of adaptive execution of a flight path according to some configurations.

FIG. 3 is an activity diagram 300 illustrating an example process of adaptive execution of a flight path according to some configurations. As illustrated in the example of FIG. 3,

TABLE 1

| | Flight Modes | |
|---|---|---|
| Flight Mode 1 | Agent stops to hover after a forward movement ("Agent focused stop") | The hummingbird briefly stops to self-evaluate its current forward flight path with respect to the user's capture sphere, irrelevant of other environmental cues. |
| Flight Mode 2 | Forward movement after stop induced by agent itself ("Agent focused forward") | The hummingbird continues forward movement after a brief stop to self-evaluate its flight path and if the evaluation passes all internal criteria set for the agent. |
| Flight Mode 3 | Escape Movement ("Agent focused escape") | The hummingbird escapes from the user's capture sphere. |
| Flight Mode 4 | Forward movement after escaping ("Agent focused forward escape") | The agent continues with the forward flight after a period of escaping. This transition from escaping to forward flight will select a new flight path that extends tangentially to the release angle of the previous escaping path. |
| Flight Mode 5 | Stopped Hit Hover Point ("Path focused hover stop") | The hummingbird flies forward and reaches a hover point, then stops. |
| Flight Mode 6 | Forward movement after a brief stop induced by environmental cues ("Environmentally focused forward") | The hummingbird generates a forward flightpath after having successfully passed a request to check with emerging environmental cues. This check request can be issued through the complex agent-environment interaction which is subdivided into five cases: a) the agent moves out of the preset Room Bound, b) the agent is only near a Scene Mesh and cannot be attached to it, c) the agent flies too far from the user's capture sphere and not within reach, d) multiple Scene Meshes collide, and the agent cannot be attached to one of them, and e) the user's capture sphere collides with an environmental cue by mistake, or collides with the agent when the user successfully follows the agent. |
| Flight Mode 7 | A stop after failing check ("Environmentally focused stop") | The hummingbird fails any one of the check requests triggered by environmental cues then stops, or hovers around, a fixed location in the space. This stop will continue until the failed condition resolves. |

Figure 2:
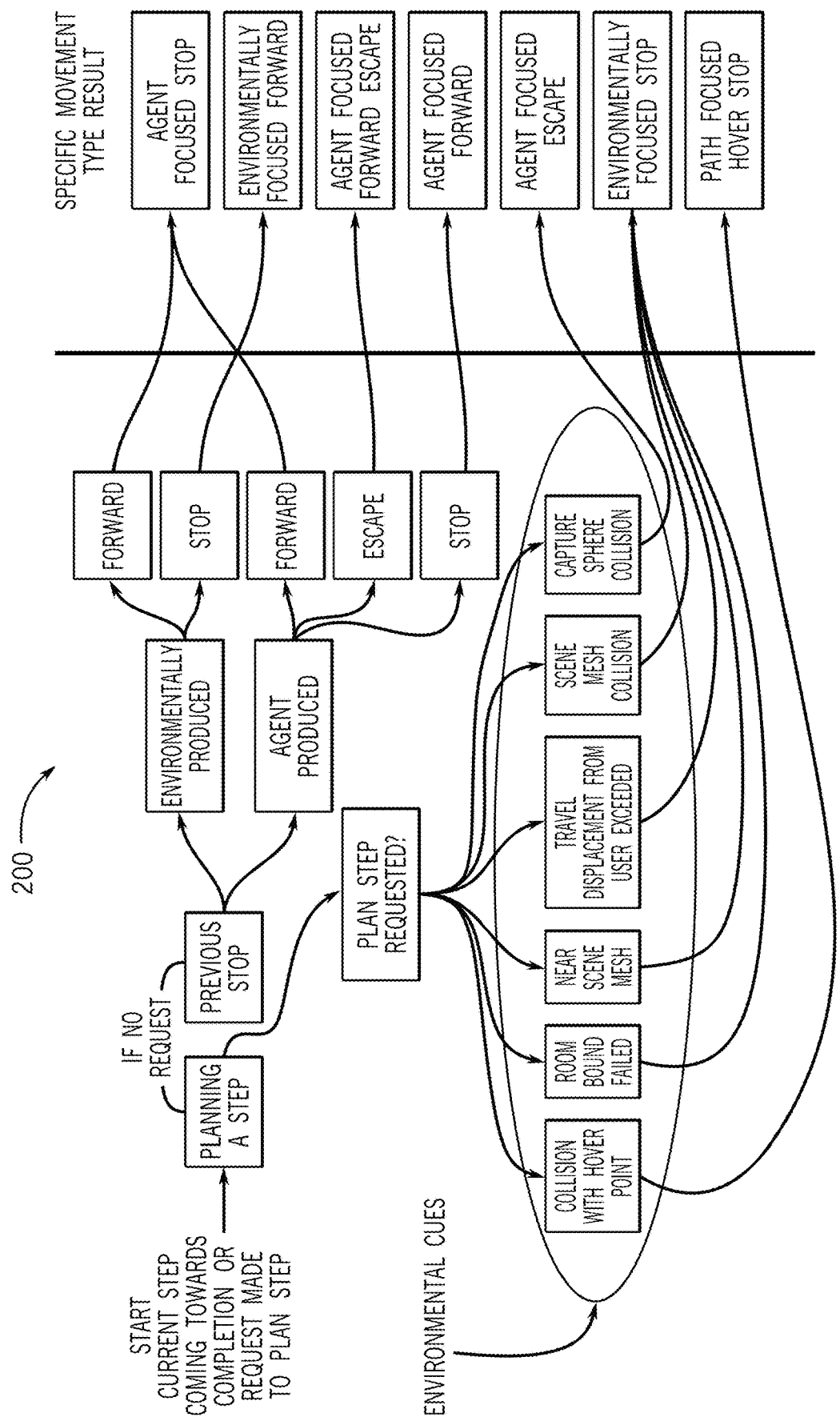
FIG. 2 illustrates an activity diagram illustrating an example planning process according to some configurations.

Putting together a logical sequence of determining next flight modes from the agent behavior set (defined above) allows the agent to form a process of adaptive planning. FIG. 2 illustrates an activity diagram 200 illustrating an example planning process according to some configurations. As illustrated in the example planning process of FIG. 2, the planning starts as the current flight mode reaches its termination (or if any one of the emerging environmental cues trigger a request to check), and ends with a determination of which of the seven flight modes to pursue next. This planning process informs the agent of the essential information about the flight mode at a high level. After determining the flight mode, the agent next determines its trajectory. There can be a near-infinite number of possible paths for the agent, and the adaptive algorithm must refine the number of possibilities, first with respect to the determined flight mode, then with other low-level variables, to regulate the agent's flight behaviors (including a vector-of-flight the adaptive execution of the flight path may be a hierarchical process, starting top-down from the high-level flight mode determined in FIG. 2, and specifying the low-level variables to execute a planned flight by adaptively refining the flight behaviors based on the instantaneous data of the user and the environment.

In some instances, an unexpected behavior of lower-level variables could occur due to the conflict among the high-level mode, which may result from the complex agent interaction with user and environment. For example, if the agent is too close to a Scene Mesh and simultaneously if the user is also too close to the agent, the agent would override the Scene Mesh warning and conversely go closer to the Scene Mesh in the next movement, increasing hazard to the user. For a possible solution, the algorithm may be modified so that at every step of agent interaction, the mode is checked to ensure no conflicts have emerged. Any conflicts detected from the mode check may not revert the execution process done at the previous step but could influence the next step. FIG. 4 shows a sample snippet of code 400 written in Xcode according to some configurations. The sample snippet of code 400 of FIG. 4 may represent a function used to determine an agent's travel distance. For instance, the sample snippet of code 400 may be used to determine the distance the agent would travel in the next forward phase. The agent may use both user performance and current mode to determine the distance. Periodically, the agent checks if the mode is in conflict and if the user performance is being effectively sampled. As one non-limiting example, even though the agent passes the check for mode conflicts, when the distance traveled makes it too easy for an already high-performing user, then the agent may choose to shorten the length of time for the interaction, causing the speed of the agent to increase. Since this is a final check, the distance determination function is not called again, and the agent speed will change to reflect the reduced length of time.

For computational efficiency, the processes of adaptive planning and execution can take advantage of sequential planning and reuse previously generated flight plans. With sequential planning, a movement mode determined for the agent at the current planning process can be fed back into additional plans to generate a set of candidate modes to be stored as a plan library for future use. This approach could relieve the computational burden of planning by allowing for retrieval of all possible modes for quick selection. In addition, repeated use of a flight plan can also benefit computation if the predictions about the flight behaviors are correct and only until a new change in the agent interaction or environmental cues emerges, which would then necessitate a new plan.

The agent's flight paths to be generated following the processes of adaptive planning and execution are neither totally random nor completely predictable. In some configurations, random flight paths may be avoided because they are not grounded on the agent's interaction with the user nor their environment and are therefore not suitable for evaluation of the user performance. On the other hand, simple or intuitive paths are more easily predicted and therefore require less constant reactive processing by the user, which in turn could substantially undermine the usefulness of FlightPath as a cognitive assessment tool. In this regard, the proposed agent adaptation enables an efficient and effective evaluation of an individual's performance by outputting flight paths that best reveal the strength and weakness of the object-following performance.

To summarize, the technology disclosed herein combines the two adaptive processes of mode planning with behavioral execution to create a novel XR agent. The resultant agent behavior can be assessed in terms of realism and adaptability. The primary goal of the agent's flight path is to avoid environmental collisions. And if there is no environmental cue that the agent deems necessary to avoid, the secondary goal is to react the user to a degree of difficulty that is based on their performance.

3.3—A System of Agent, User, and Environment

A major intellectual contribution of the present disclosure is the advocation for a systems perspective with respect to the analysis and control of agent behaviors in XR. As described herein, the predominant interaction-oriented view considers only the two-party interaction between agent and user, so the agent design focuses on the creation of reactions which can only be validated by the other party or user model, while the user model itself cannot be validated by the agent. This approach ignores the confounding effects of the environment on both parties. This bidirectional paradigm may work for specific agent applications, such as a conversational agent, but is not likely to be as useful in XR, in which the agent gathers as much information as possible from both the environment and the user.

In FlightPath, the agent's understanding of the user may facilitate the evaluation of the user performance. One of the agent's goals may include ensuring a discovery of the user's object-following performance limits as it adjusts its path variables. When a user can follow the agent with little to no effort, the agent attempts to change parameters to make its path more difficult to follow (e.g., it can move faster, lessen the stop time between forward movements, or use a combination of the two). When the user drops in performance, the agent will attempt to slow down, make more linear paths, stop for a longer period, etc.

Alternatively, or in addition, the agent's flight path may depend on the device's recognition of environmental cues through the Scene Mesh. The agent responds accurately to the Scene Mesh events in order to maintain high fidelity; when the agent detects that it is getting too close to a Scene Mesh, it moves away and avoids the Scene Mesh. At this point, the agent makes an adaptive response to prioritize adaptation to the environment over the user. This is a necessary response to prevent a real-world collision between the user and physical objects within their environment.

Therefore, an analysis of the agent may be grounded on the systemic behaviors that result from the three-party dynamics (user, agent, and environment). The user interacts with the agent and the agent interacts with both the user and their environment; these interactions come together to create a bond between the real and the virtual world. The user-agent-environment interaction dynamic is a complex system, and modeling this system using a systems-oriented perspective allows the creation of more realistic and lifelike virtual objects.

Figure 5A:
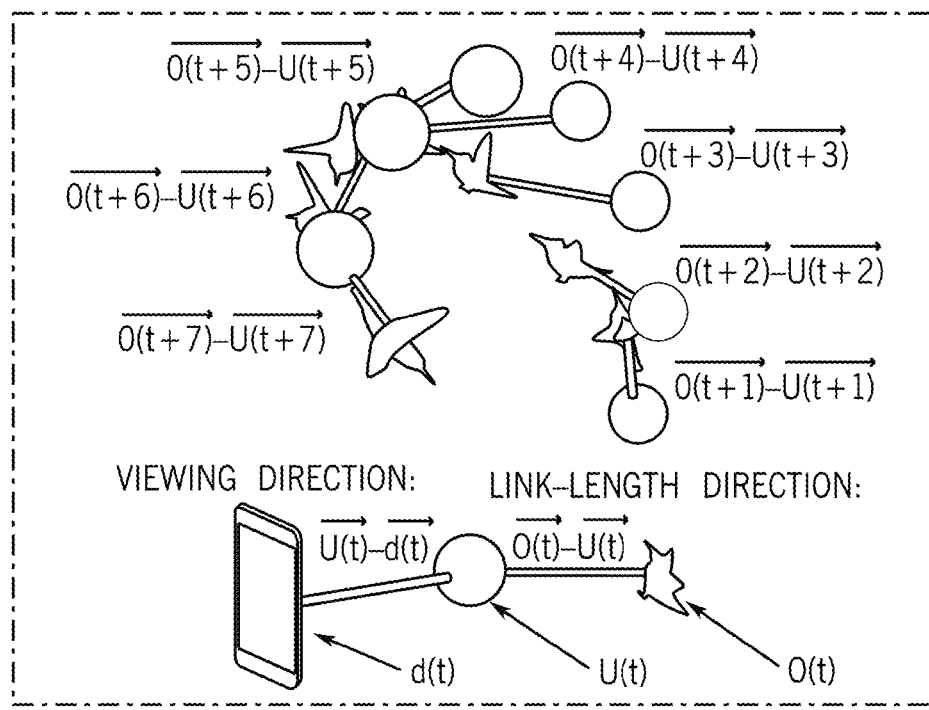
FIGS. 5A-5C illustrate NeuroDNA generation according to some configurations.
Figure 5B:
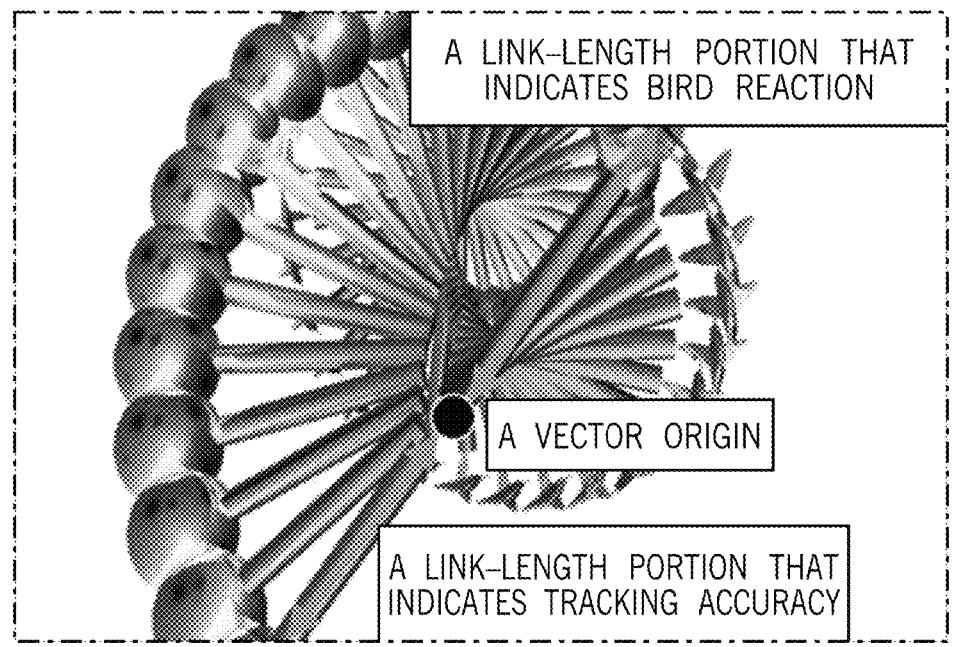
Figure 5C:

One possible measure of systemic behaviors in the disclosed technology is a connected pair of timeseries vectors, $O(t)$ and $U(t)$, where $O(t)$ indicates the center point of a bird's location in a 3-dimensional space, $[X_O(t), Y_O(t), Z_O(t)]$ and $U(t)$ indicates the corresponding user responses with the capture sphere in a 3-dimensional vector space, $[X_U(t), Y_U(t), Z_U(t)]$ (as illustrated in FIG. 5A). FIGS. 5A-5C illustrate NeuroDNA generation, the spatiotemporal vector mapping of continuous tracking for the hummingbird (FIG. 5A) can be restructured to visualize the underlying tracking performance of the user, with a connector that resembles the pairing bases for DNA strands (FIG. 5B). Depending on the bird flight path in space, such visualization may resemble a DNA structure, dubbed NeuroDNA (FIG. 5C). The bird's current location $O(t)$ at an instance of time t is determined collectively by running off the previous location of the user's capture sphere $U(t-1)$ while acting on its kinematic parameters during up- and downstrokes. Temporally sequential $U(t)$ vectors are linked by line segments as well. Ultimately, the spatiotemporal relationship between $O(t)$ and $U(t)$ represents how the user moved their device as they attempt to track the object (FIG. 5C). The representation begins with connecting $O(t)$ and $U(t)$ with time-dependent links, i.e., $O(t)$ paired with $U(t)$ over discrete sampling times, with each pair visualized in the same color (FIG. 5A). That inter-object distance between $O(t)$ and $U(t)$, or link-length, serves as a measure of instantaneous tracking performance whereby a relatively shorter link-length is an outcome of user tracking accuracy over bird reactivity (FIG. 5B). A single point with a zero link-length indicates that both objects are perfectly aligned. Because each object's position is sampled at a fixed rate of every 1/60th of a second, the distance between subsequent points (either the bird or the user's tracking sphere) indicates the relative speed of those objects. For example, as the hummingbird begins to move faster in response to accurate tracking, the distance between the tracked points along its path increases as well. Additionally, a second short line segment will extend from U(t) towards the center of the user's device screen d(t), with an arrow pointing back towards U(t) halfway along the line segment to indicate the direction of the user's viewing frustum (FIG. 5A). A schematic visual representation in FIG. 5A, connects O(t), the bird object, and U(t), the capture sphere, with time-dependent links, i.e., O(t) paired with U(t) over discrete sampling times. That inter-object distance between O(t) and U(t), or link-length, will serve here as a measure of instantaneous tracking performance whereby a relatively shorter link-length is an outcome of user tracking accuracy over bird reactivity. Over time, the temporally sequential O(t)-U(t) vectors are linked by vertically spreading the vector origin, creating a DNA-strand-like object (FIG. 5C).

3.4—Systematic Identification of Parameters

Once a proper measure is selected for monitoring the systemic behaviors between agent, user, and environment, a feasibility test may be used to examine systemic behaviors by experimentally varying relevant system parameters to demonstrate how the parameter may allow the adaptive agent to reach a desired system status. A feasibility test may be used when implementing adaptive agent behaviors (which are a subset of systems behavior) in order to control these behaviors appropriately. It takes a systematic approach to identify and select the small set of parameters that are most effective in shaping a desired system status. First, a candidate is prepared to include all possible parameters that may affect the adaptive behavior of the agent. Second, an experiment is designed to monitor the systemic behaviors of choice under a possible combination of values in the parameter set. Third, the small effective parameter set is chosen along with an estimated measure of impact. This set will serve as a handle for the agent to control its system behaviors. Hence, agent adaptation can be evaluated in this framework. Finally, the controllable system status will be examined using non-linear dynamic analysis methods. These analyses will facilitate the evaluation of various systemic behaviors of the agent's status, including chaotic properties and stability.

4—Validation

4.1—Experimental Design

Effective systems parameters may affect the agent's adaptive behaviors as well as its interaction with both user and environment. For example, a virtual shadow overlaid on the hummingbird might aid the user in visual detection and tracking, though the agent itself is not affected. This improved user performance, in turn, may change the agent's level of adaptation. This is another example of systemic behaviors.

Initially, candidate parameters were identified by examining the code base and from a literature review of object-tracking human performance. These parameters were narrowed down to 11 factors (see Table 2 below). For statistical significance, a Plackett-Burman design was used to test each of the 11 factors, with 12 replications for each block, over two experimental blocks. The dependent variable was the link length, a systemic measure that reflects both the accuracy of the user and the reactivity of the agent under a given environmental condition. For each factor, the values were empirically set by first determining a moderate/neutral value as a midpoint, then by examining visible changes over the midpoint with respect to either user or agent behavior. For testing, this study recruited 11 healthy subjects and let them interact with the agent in the FlightPath for two distinct 3-minute sessions.

TABLE 2

The list of parameters defined and specified to regulate the agent's flight patterns, and interaction with user and environment.

| Factor Name | Description | Values |
|---|---|---|
| forwardLeap | The distance the agent travels in one forward movement | Short: 0.25 m, medium: 0.55 m, long: 0.85 m |
| forwardLapse | The time the agent takes to travel one forward movement | Short: 0.5 s, medium: 1.0 s, long: 1.5 s |
| stayTime | The time the agent holds a stop movement | Short: 0.5 s, medium: 1.0 s, long: 1.5 s |
| hoverDensity | The number of Hover Points in the environment | Small: 3, medium: 6, large: 9 |
| hoverSens | The radius of the sensitivity around a Hover Point | Low: 0.1 m, medium: 0.15 m, high: 0.2 m |
| escapeSens | The radius around the center of the capture sphere that activates an escape maneuver | Low: 0.1 m, medium: 0.15 m, high: 0.2 m |
| escapeLapse | The time the agent takes to complete the escape maneuver | Short: 0.5 s, medium: 1.0 s, long: 2.0 s |
| escapeRadius | The radius of the curved escape path | Small: 0.2 m, medium: 0.7 m, large: 1.2 m |
| escapeAngle | The angle at which the agent should continue a tangent path. Note: with 0° tangent being the initial entrance angle. | Predictable: 180°, neutral: 150°, less predictable: 225°. |
| birdContrast | The skin contrast of the agent | Low, medium, high |
| shadow | The opacity of the shadows from the capture sphere and agent | High: 100%, neutral impact: 30%, low: 5% |

Accordingly, the technology disclosed herein may implement an adaptive flight-control algorithm for the virtual hummingbird in MR. For instance, at a frame rate of 60 Hz, the virtual hummingbird executes an algorithm mimicking how actual hummingbirds fly adaptive to external environments; through its typical flapping patterns), hummingbirds execute insect-like flight strokes that enable rapid transition among the basic maneuvers (hovering, forward flight, and escaping maneuvers). In some configurations, the flight algorithm implemented on an MR-based smart device is hierarchical in the sense that a basic maneuver is determined first based on the device-recognized spatial relationship of the hummingbird with respect to the user (i.e., the location of the capture sphere) and the environment (i.e., the space around the user for possible flight areas as well as the obstacles to avoid), and then lower-level flight parameter values specifying a maneuver pattern are referenced to execute the next flight.

The flight parameter values have been empirically configured and tested through a design-verification experiment in MR. For example, Fifteen healthy subjects were recruited for the experiment, during which they interacted with the agent in FlightPath for two distinct 3-minute sessions. Candidate parameters were identified by examining the code base and from a literature review, and were narrowed down to eleven factors. A Plackett-Burman design was used to test the effect size of those factors on the user performance of following the hummingbird, which quantified the dynamic distance between the capture sphere and the hummingbird, a measure reflecting both the accuracy of the user and the reactivity of the agent under a given parameter setting. An Analysis-of-Variance determined that most parameters (9 out of 11) were significant at a 5% risk level, and each has a substantially different impact on user performance.

4.2—Analysis of Results

The raw data was acquired from the app in a JSON file format and parsed in Matlab (R2022a, MathWorks) using the open-source encoder JSONLab (v2.0, Qianqian Fang). The parsed data was structured into a Matlab Table consisting of 14 variables that span user (deidentified subject serial number, spatial location of the capture sphere, and orientation of the user device), agent (spatial location of the hummingbird), and parameter set (designated by the experimental design). The initial table had 237,520 rows; 11,375 rows (4.79%) were removed because they exceeded three scaled Median Absolute Deviations from the median.

The first step of the analysis is to verify if the set of agent parameters manipulated in the experiment effectively induces systemic behaviors. The overall systems performance under a parameter set was quantified by using an accuracy measure (i.e., an instantaneous distance between the locations of the capture sphere $X_U(t_i)$, $i \in (1, \ldots, L)$ and the hummingbird $X_A(t_i)$, $i \in (1, \ldots, L)$), because it represents the outcome of interaction between a user and the virtual agent. That accuracy measure was formulated into a gross performance score $\bar{P}(\Delta t)$ in a manner such that the score reflects the effects of learning[79] for general users:

$$\bar{P}(t_1 \ldots L) = \alpha e^{-\beta \left( \frac{\sum_{i=1}^{L} X_U(t_i) - X_A(t_i)}{L} \right)}, \alpha = 100.0, \beta = 1.5 \quad (1)$$

FIG. 6 is a boxplot 600 that summarizes the system performance over the different agent parameter-set values experimented according to some configurations. The gross performance score over different agent parameters charted in the boxplot 600 of FIG. 6 suggests that substantial systemic differences were created in the experiment through the manipulation of the agent parameter values.

Further, a linear analysis of the system performance using a statistical software package (Version 22.0, Minitab) revealed significance and importance for the set of experimental parameters tested (i.e., factors). At a 5% significance level, the analysis of variance ("ANOVA") table below (Table 3) confirms that 9 out of the 11 factors were statistically significant, and their linear model significantly accounted for 94.98% of the total variance (R-square: 97.38%, Adjusted R-square: 94.98%). No significant interaction among the factors were observed, implying that the parameters are likely to independently regulate the agent behaviors for overall systemic outcomes. On the other hand, the statistical insignificance of the blocking and birdContrast factors (p-values 0.722 and >0.05, respectively), along with the marginal significance of the shadow factor (F-value: 8.84, p-value: 0.012) suggests that environmental conditions have negligible influence on the system.

Figure 7:
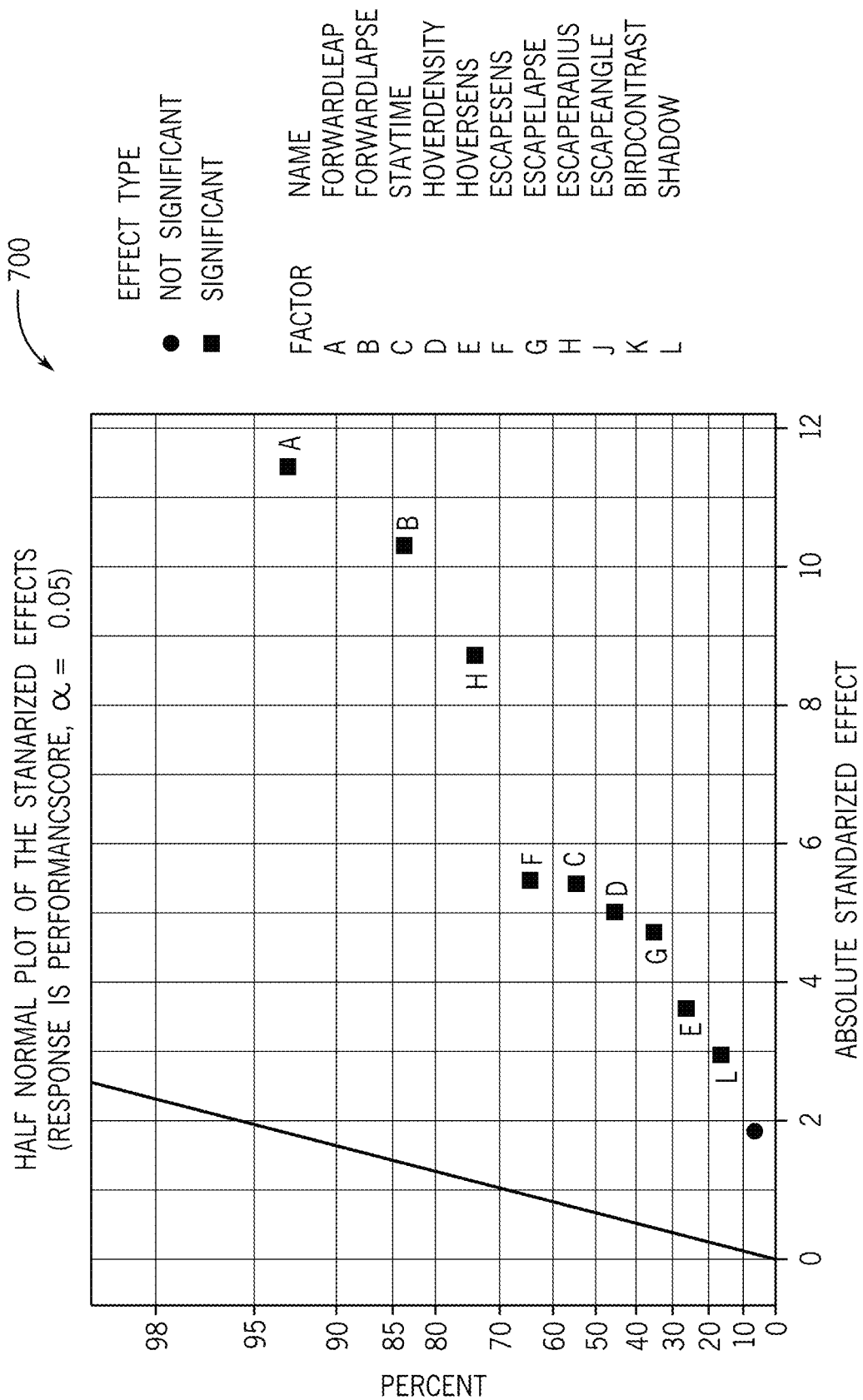
FIG. 7 illustrates a half-normal probability plot of the effect size for the parameters according to some configurations.

FIG. 7 illustrates a half-normal probability plot 700 of the effect size for the parameters according to some configurations. As illustrated in FIG. 7, the half-normal probability plot 700 of the absolute effect size for each factor provides a comparative measure of importance, suggesting that the factors A, B, and H are the top-three agent parameters that effectively shape the system performance.

TABLE 3

Analysis of Variance ("ANOVA") for the System Performance

| Source | DF | Adj SS | Adj MS | F-Value | P-Value |
|---|---|---|---|---|---|
| Overall Model | 11 | 1588.04 | 144.367 | 40.56 | 0.000** |
| Blocks | 1 | 0.47 | 0.473 | 0.13 | 0.722 |
| Linear Factors | | | | | |
| (A) forwardLeap | 1 | 465.81 | 465.811 | 130.87 | 0.000** |
| (B) forwardLapse | 1 | 379.19 | 379.191 | 106.53 | 0.000** |
| (C) stayTime | 1 | 104.29 | 104.288 | 29.30 | 0.000** |
| (D) hoverDensity | 1 | 90.26 | 90.260 | 25.36 | 0.000** |
| (E) hoverSens | 1 | 47.16 | 47.160 | 13.25 | 0.003** |
| (F) escapeSens | 1 | 107.67 | 107.675 | 30.25 | 0.000** |
| (G) escapeLapse | 1 | 78.94 | 78.942 | 22.18 | 0.001** |
| (H) escapeRadius | 1 | 270.42 | 270.420 | 75.97 | 0.000** |
| (J) escapeAngle | 1 | 12.35 | 12.345 | 3.47 | 0.087 |
| (L) shadow | 1 | 31.48 | 31.476 | 8.84 | 0.012* |
| Error | 12 | 42.71 | 3.559 | | |
| Total | 23 | 1630.76 | | | |

(**Significant,
*marginally significant)

The final step is to analyze non-linear dynamics using the timeseries data $U(t_i) - O(t_i)$ obtained from the two discrete sources of movement in the system, one from the user (i.e., the capture sphere location, $U(t_i)$, $i \in (1, \ldots, L)$), and the other from the agent (i.e., the hummingbird location, $O(t_i)$, $i \in (1, \ldots, L)$). The previous step demonstrated how a set of distinct behavioral modalities for the agent (i.e., the hummingbird's flight and interaction patterns in the face of the user and environment) can be effectively created with the manipulation of the parameter set. It follows, then, that the agent's behavioral modalities created in simulation may also show a causal link to the underlying system dynamics in order for the behaviors to quality as self-organizing and adaptive, similar to those characterized in herein. Establishing such mapping will be the basis of adaptive agent behaviors in XR by maintaining the system at a desired status through the manipulation of the agent's parameter set.

Figure 8:
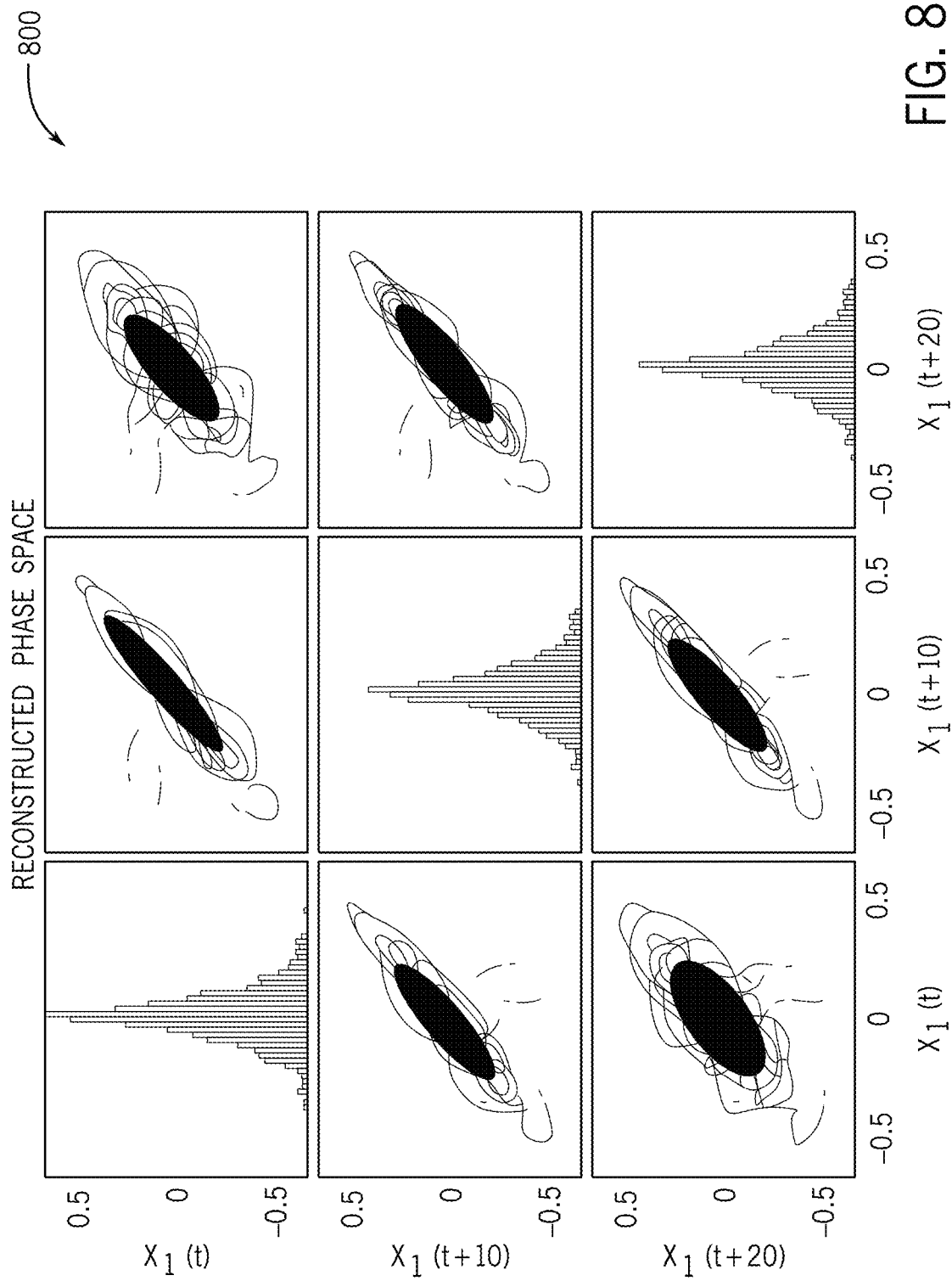
FIG. 8 illustrates a phase space reconstruction according to some configurations.

The dynamic analysis begins by reconstructing a phase space that preserves properties of original dynamic system. Embedding dimension and delay should be estimated for the phase space reconstruction. FIG. 8 illustrates a phase space reconstructed with an embedding dimension of 3 and a delay of 10 for the states $x_1(t)$, $x_1(t+10)$, and $x_1(t+20)$. FIG. 8 illustrates a phase space reconstruction 800 according to some configurations. In the example of FIG. 8, the phase space reconstruction 800 is displayed on the 3-by-3 matrix, where the three states of $x_1(t)$, $x_1(t+10)$, $x_1(t+20)$ were reconstructed with the estimated lag of 10; the diagonal elements depict the histogram of each state. The input timeseries was extracted from $U(t_i)-O(t_i)$ for the agent parameter set #7 in FIG. 6 because it demonstrated the best performance.

Figure 10:
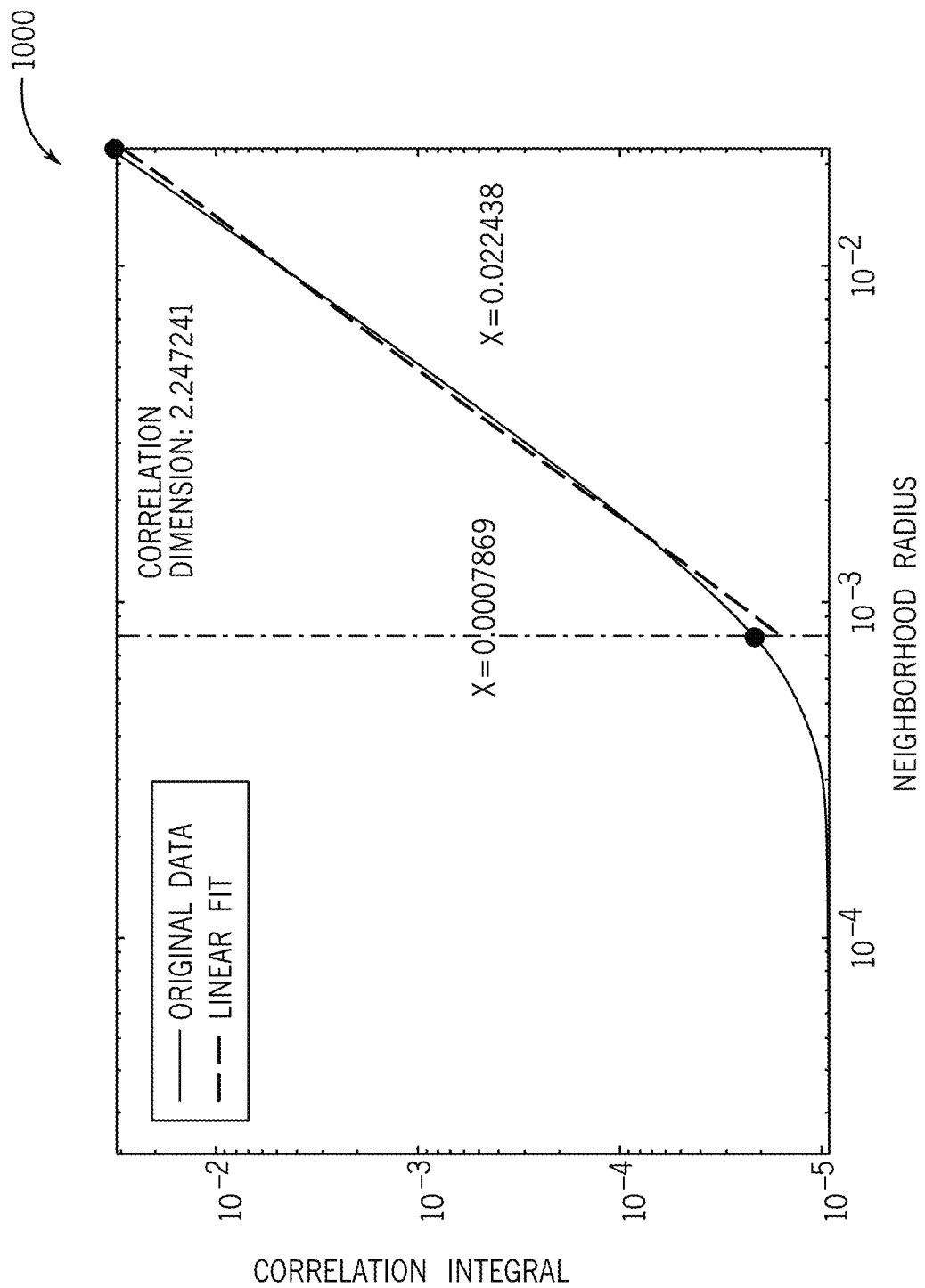
FIG. 10 is a graph illustrating the interactive estimation of the correlation dimension for the same timeseries as used for the phase space reconstruction according to some configurations.
Figure 11:
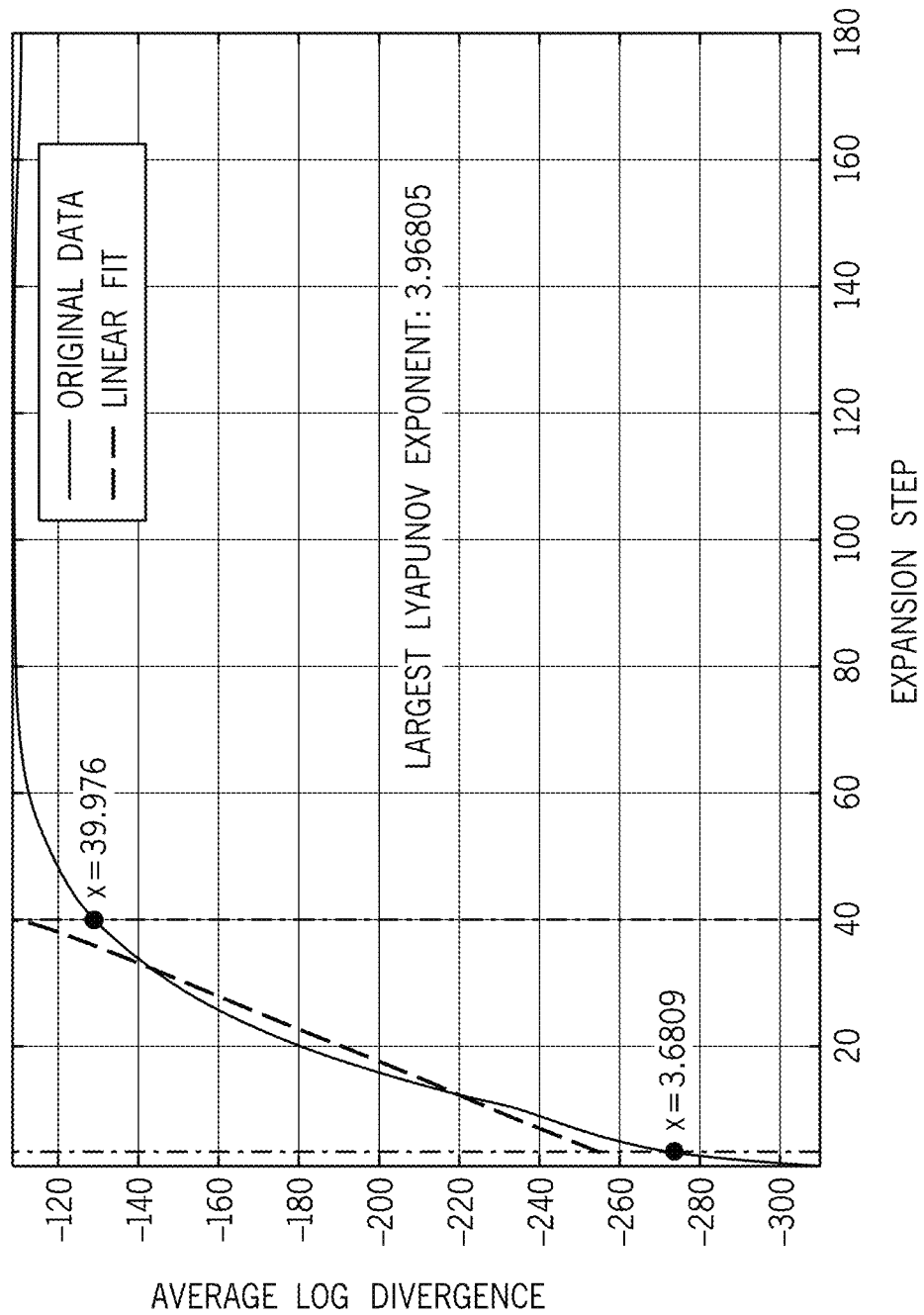
FIG. 11 is a graph illustrating the interaction estimation of the largest Lyapunov exponent for the same timeseries as used for the phase according to some configurations.

In addition, three other analyses of the timeseries—the correlation dimension, the approximated entropy, and the largest Lyapunov exponent—also characterize the nonlinear dynamics. FIG. 9 illustrates a table 900 summarizing nonlinear dynamic behaviors according to some configurations. The correlation dimension estimates the dimensionality of the space occupied by a set of random points, and the value provides the measure of chaotic signal complexity. Built on the phase space reconstruction, the approximated entropy measures regularity within the input timeseries. This entropy is unitless, so its value is interpreted with respect to a reference point. Finally, the largest Lyapunov exponent characterizes the rate of separation of infinitesimally close trajectories in the phase space. Matlab (R2022a, MathWorks) provides tools to interactively estimate those metrics, as illustrated in FIGS. 10-11. FIG. 10 is a graph 1000 illustrating the interactive estimation of the correlation dimension for the same timeseries as used for the phase space reconstruction according to some configurations. FIG. 11 is a graph 1100 illustrating the interaction estimation of the largest Lyapunov exponent for the same timeseries as used for the phase according to some configurations.

5—Discussion

This section discusses issues related to the choice of parameter set and values, as well as the interpretation of systemic behaviors in the current context of adaptive agent design in XR.

5.1—Choice of Parameter Set and Values for Effective Agent Adaptation

The ANOVA in Table 3 (above) shows that eight parameters are statistically significant at a risk level of 1%, and each has a substantial impact on the mean link length; hence, the feasibility test is passed. In addition, substantial differences in effectiveness exist among the parameters with respect to adaptive behavior. For example, if one selects the Factor A (forwardLeap: The distance the agent travels in one forward movement) over E (hoverSens: The radius of the sensitivity around a Hover Point) as a handle to control the agent adaptive behavior, this control is six-times more effective.

Figure 12:
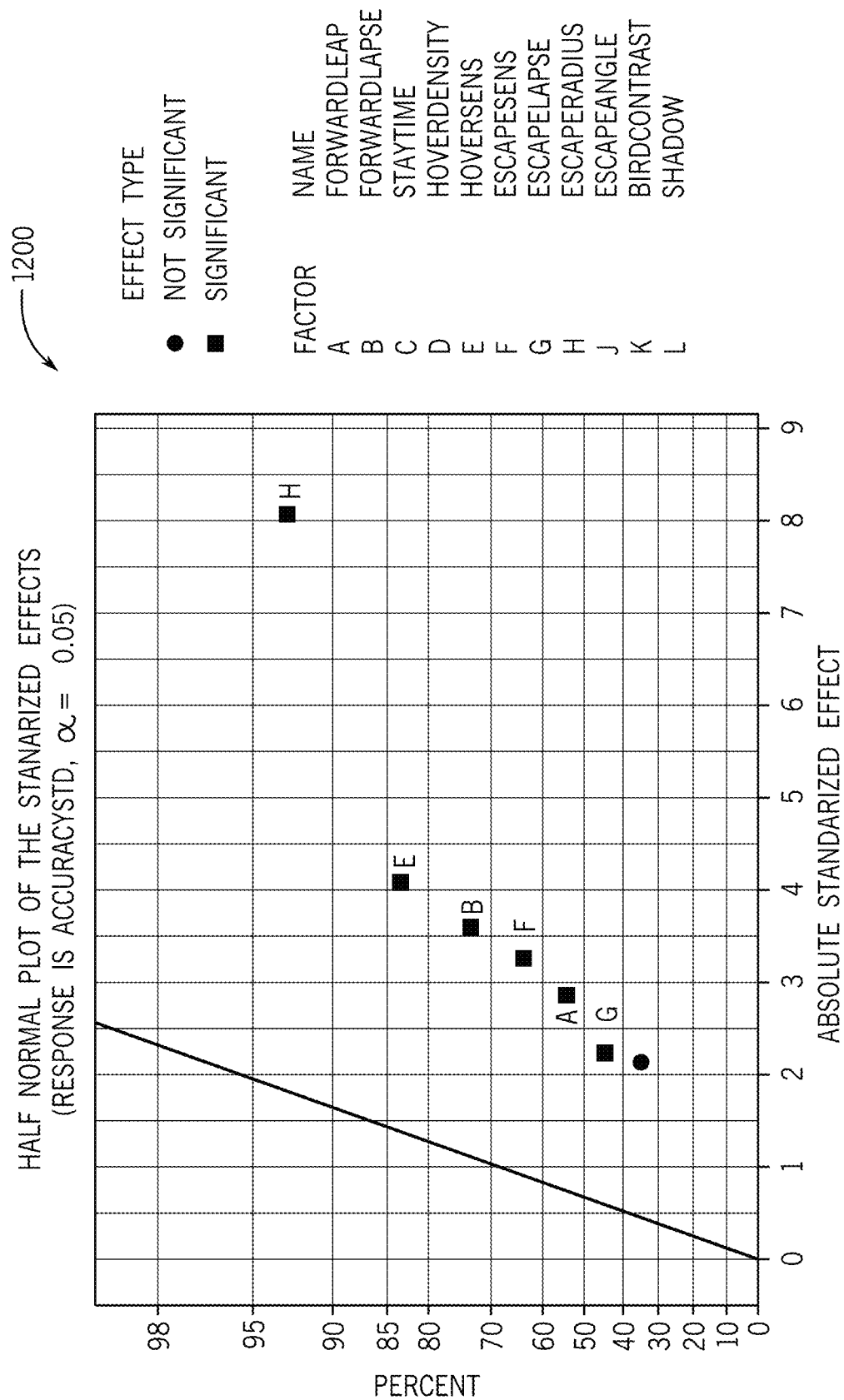
FIG. 12 illustrates a half-normal plot of the effect size for the parameters according to some configurations.

However, the mean link length may not be the only measure of systemic behaviors, so a selection of different measures could result in different control strategy recommendations. To confirm this idea, another ANOVA was performed to examine the effect size of the experimental factors on the standard deviation of the link length calculated over a different combination of values for the parameter set. At a 5% significance level, the ANOVA showed that 6 out of the 11 factors were statistically significant, and their linear model significantly accounted only for 12.60% of the total variance (R-square: 54.40%, Adjusted R-square: 12.60%). This measure indicates that the mean link length is a measure of stability rather than accuracy. The Half-normal plot 1200 of FIG. 12 confirms that a new parameter set and values, entirely different from the plot 700 of FIG. 7, can be obtained. This drastic change of outcomes advocates a multidimensional approach in the exploration of effective parameter set.

5.2—Nonlinear System Dynamics and Adaptive Agent Behaviors

Figure 13:
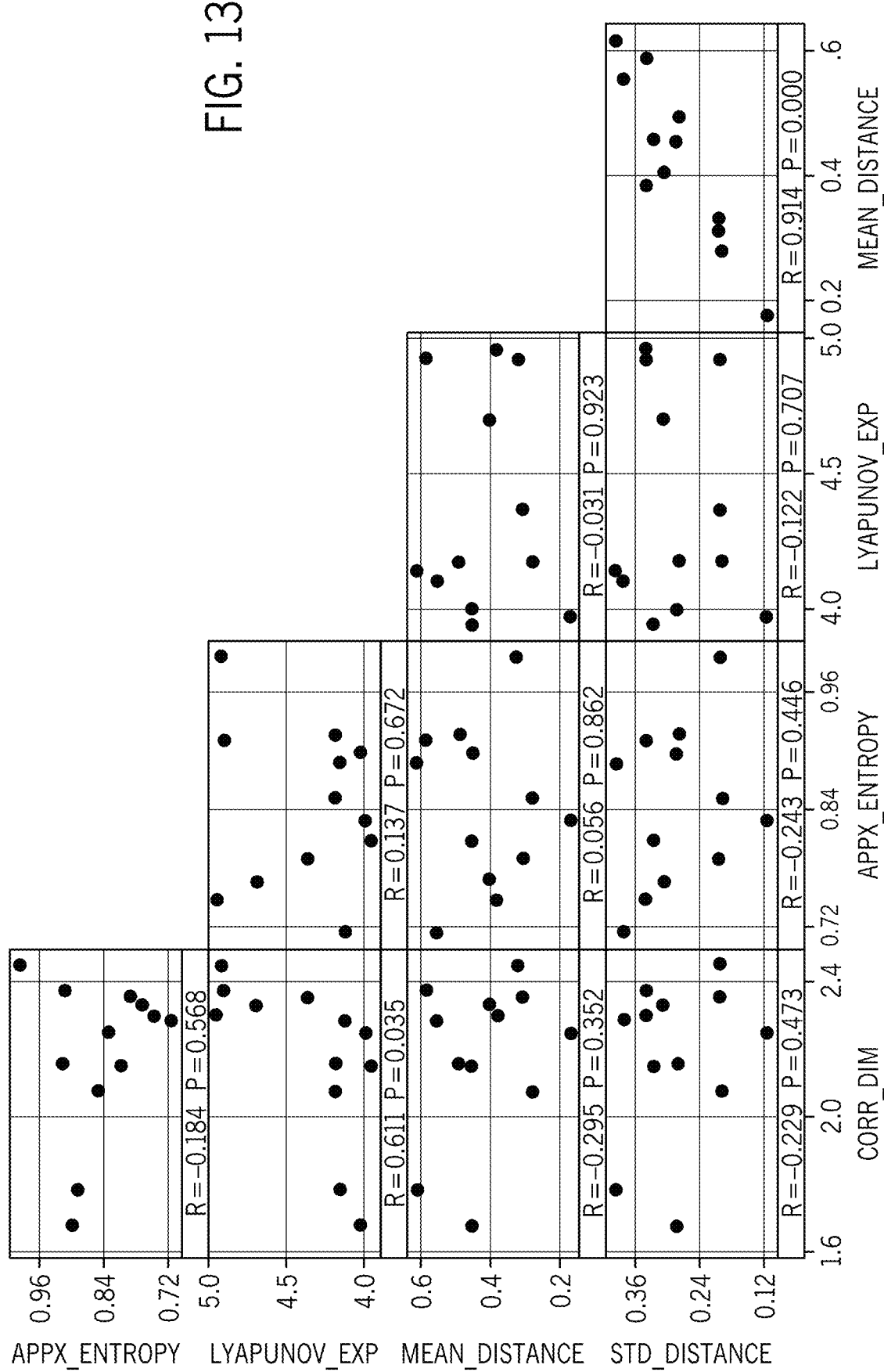
FIG. 13 illustrates correlation coefficients between the set of linear and nonlinear analysis measures according to some configurations.

Findings from the nonlinear dynamic analyses tell a different story about a desirable systems status. The linear models, both for the mean and standard deviations of the link length, supported that the parameter set value of #7 in FIG. 6 is desirable to yield the most accurate and stable system performance. However, the correlation dimension (2.24721) and approximated entropy (0.8237) for #7 were both fairly high as compared to other set values, indicating chaotic complexities inherent in this region of the system. To confirm the lack of correlation between the linear and nonlinear analyses on all the set value combinations, FIG. 13 demonstrates that the nonlinear dynamic analyses used (correlation dimension, approximated entropy, and Largest Lyapunov exponent) were not consistent with the findings from the ANOVA. FIG. 13 illustrates correlation coefficients between the set of linear and nonlinear analysis measures according to some configurations.

6—Conclusion

In XR, the user can interact with virtual agent(s) that adapt to the immediate needs of the user and their environment. A theoretical account of adaptation in nonlinear systems argues that, if an agent adapts to a new situation, it reorganizes its internal structure of feedback, communication, and/or workflow patterns. Self-organizing and learning process is a universal mechanism through which a system can shape its own structure without external aid. Hypothetically, just as in biological and organizational systems, an XR system may also be controlled by a small set of powerful parameters to shape adaptive agent behaviors. Most current adaptive agents focus on facilitating mutual feedback and communications with human users in which the agent behaviors are designed to react to the user rather than to proactively reorganize the system of user and agent toward a desirable goal. To establish a systems-oriented perspective and method to assist in the design of adaptive agents in XR, the technology disclosed herein develops a virtual hummingbird in XR as an adaptive agent and examines the agent-user interaction with human subjects. The analysis of variance found that substantial differences exist between control parameters in regards to the effectiveness of adaptive agent implementation. In addition, the nonlinear dynamic analyses indicated a chaotic complex systems dynamic that may underlie a seemingly favorable system status, a topic of further investigation. To our knowledge, this is the first in-depth study aimed at a systems-oriented design approach for adaptive agent in XR that integrates biomimetic design principles, experimental design, parametric systems control, and nonlinear dynamic analyses. In the long term, this study is expected to facilitate mutual feedback and communications between humans, between humans and agents, and between humans and their XR environment.

Figure 14:
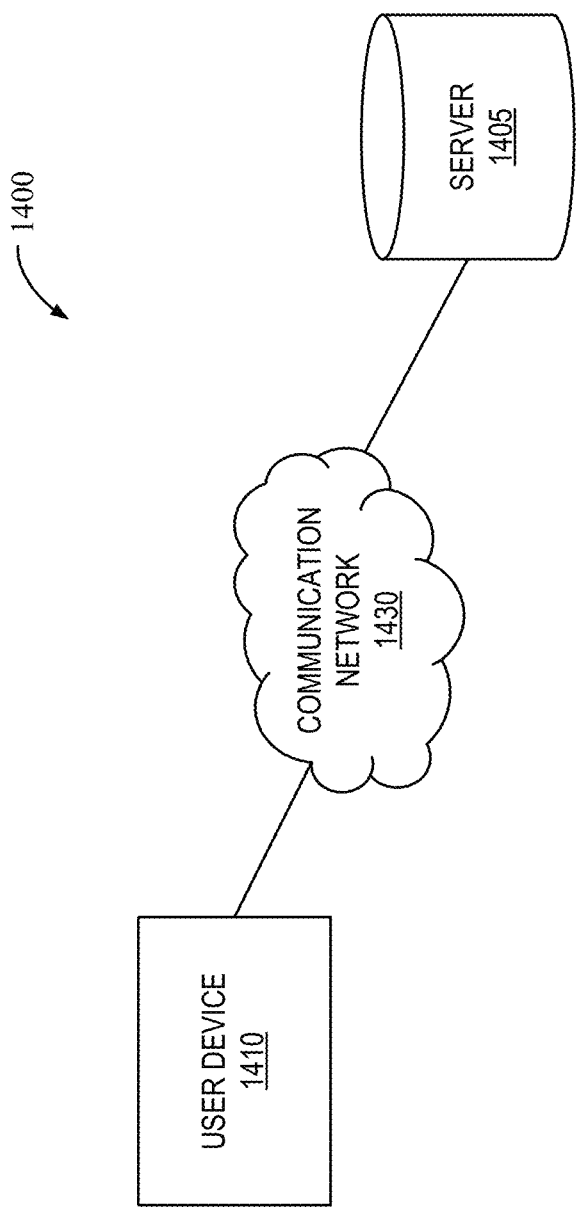
FIG. 14 illustrates a system for providing neurocognitive impairment evaluation using extended reality according to some configurations.

FIG. 14 illustrates a system 1400 for providing neurocognitive impairment evaluation using XR according to some configurations. In the illustrated example, the system 1400 includes a server 1405 and a user device 1410. In some configurations, the system 1400 includes fewer, additional, or different components than illustrated in FIG. 14. As one example, the system 1400 may include multiple servers 1405, multiple user devices 1410, or a combination thereof. As another example, one or more components of the system 1400 may be combined into a single device, such as, e.g., the server 1405 and the user device 1410. As one example, the functionality (or a portion thereof) described herein as being performed by the server 1405 may be performed by the user device 1410.

The server 1405 and the user device 1410 communicate over one or more wired or wireless communication networks 1430. Portions of the communication networks 1430 may be implemented using a wide area network, such as the Internet, a local area network, such as a Bluetooth™ network or Wi-Fi, and combinations or derivatives thereof. Alternatively, or in addition, in some configurations, components of the system 1400 communicate directly as compared to through the communication network 1430. Also, in some configurations, the components of the system 1400 communicate through one or more intermediary devices not illustrated in FIG. 14.

Figure 15:
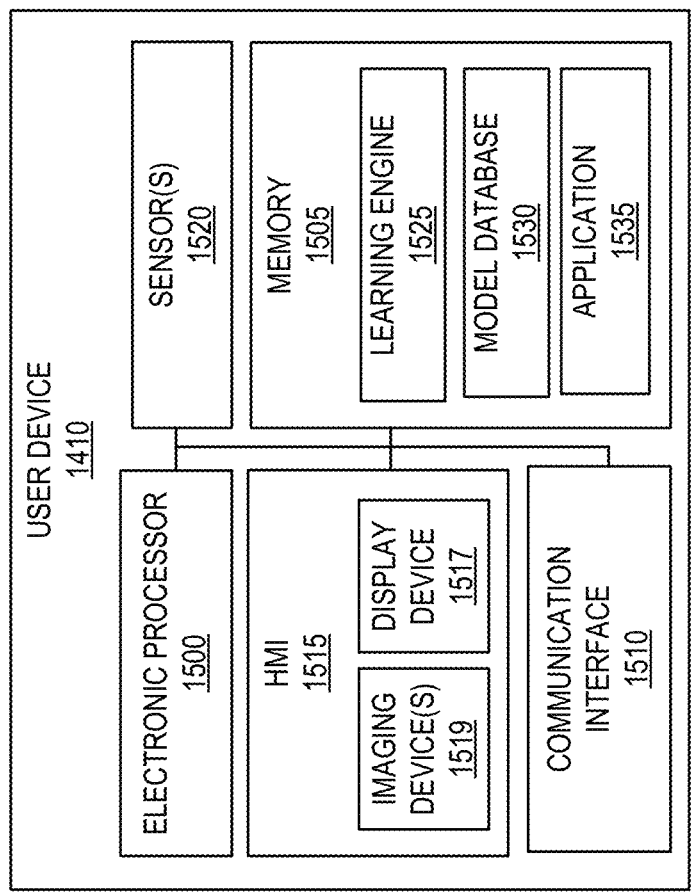
FIG. 15 schematically illustrates a user device included in the system of FIG. 14 according to some configurations.

The user device 1410 includes a computing device, such as a desktop computer, a laptop computer, a tablet computer, a terminal, a smart telephone, a smart television, a smart wearable, or another suitable computing device that interfaces with a user. FIG. 15 schematically illustrates an example user device 1410 according to some configurations. As illustrated in FIG. 15, the user device 1410 may include an electronic processor 1500, a memory 1505, a communication interface 1510, a human-machine interface ("HMI") 1515, and one or more sensors 1520. The electronic processor 1500, the memory 1505, the communication interface 1510, the HMI 1515, and the sensor(s) 1520 may communicate wirelessly, over one or more communication lines or buses, or a combination thereof. The user device 1410 may include additional, different, or fewer components than those illustrated in FIG. 15 in various configurations. The user device 1410 may perform additional functionality other than the functionality described herein. Also, the functionality (or a portion thereof) described herein as being performed by the user device 1410 may be performed by another component (e.g., the server 1405, another computing device, or a combination thereof), distributed among multiple computing devices (e.g., as part of a cloud service or cloud-computing environment), combined with another component (e.g., the server 1405, another computing device, or a combination thereof), or a combination thereof.

The communication interface 1510 may include a transceiver that communicates with the server 1405, another user device of the system 1400, or a combination thereof over the communication network 1430 and, optionally, one or more other communication networks or connections. The electronic processor 1500 includes a microprocessor, an application-specific integrated circuit ("ASIC"), or another suitable electronic device for processing data, and the memory 1505 includes a non-transitory, computer-readable storage medium. The electronic processor 1500 is configured to retrieve instructions and data from the memory 1505 and execute the instructions.

As illustrated in FIG. 15, the user device 1410 may also include the HMI 1515 for interacting with a user. The HMI 1515 may include one or more input devices, one or more output devices, or a combination thereof. Accordingly, in some configurations, the HMI 1515 allows a user to interact with (e.g., provide input to and receive output from) the user device 1410. For example, the HMI 1515 may include a keyboard, a cursor-control device (e.g., a mouse), a touch screen, a scroll ball, a mechanical button, a display device (e.g., a liquid crystal display ("LCD")), a printer, a speaker, a microphone, or a combination thereof.

In the illustrated example of FIG. 15, the HMI 1515 includes a display device 1517. The display device 1517 may be included in the same housing as the user device 1410 or may communicate with the user device 1410 over one or more wired or wireless connections. As one example, the display device 1517 may be a touchscreen included in, e.g., a laptop computer, a tablet computer, a smart telephone, or the like. As another example, the display device 1517 may be, e.g., a monitor, a television, a projector, or the like coupled to a terminal, desktop computer, or the like via one or more cables.

The HMI 1515 may also include at least one imaging device 1519 (referred to herein collectively as "the imaging devices 1519" and individually as "the imaging device 1519"). The imaging device 1519 may be a physical or hardware component associated with the user device 1410 (e.g., included in the user device 1410 or otherwise communicatively coupled with the user device 1410). The imaging device 1519 may electronically capture or detect a visual image (as an image data signal or data stream). A visual image may include, e.g., a still image, a moving-image, a video stream, other data associated with providing a visual output, or the like. The imaging device 1519 may include a camera, such as, e.g., a webcam, an image sensor, or the like.

In some configurations, the user device 1410 includes multiple imaging devices 1519 positioned on different sides or portions of the user device 1410. As one example, when the user device 1410 is a smart telephone (cellphone), the user device 1410 may include a front camera (as a first imaging device) positioned on a similar side as the display device 1517 with a field of view directed towards a user (when the display device 1517 is facing towards the user) and a back camera (as a second imaging device) positioned on an opposite side as the display device 1517 (and the front camera) with a field of view directed away from the user (when the display device 1517 is facing towards the user).

In the illustrated example of FIG. 15, in some configurations, the user device 1410 may include one or more sensors 1520 (referred to herein collectively as "the sensors 1520" and individually as "the sensor 1520"). In some configurations, the sensors 1520 may be included as part of the HMI 1515. The sensor(s) 1520 may receive or collect data associated with an external environment of the user device 1410 (as environment data). A sensor 1520 may include, e.g., an image sensor, a motion sensor (e.g., a passive infrared ("PIR") sensor, an ultrasonic sensor, a microwave sensor, a tomographic sensor, etc.), a temperature sensor, a radio-frequency identification ("RFID") sensor, a proximity sensor, an accelerometer, or the like. An image sensor may include, e.g., a thermal image sensor, a radar sensor, a light detection and ranging ("LIDAR") sensor, a sonar sensor, a near infrared ("NIR") sensor, etc. The image sensor may convert an optical image into an electronic signal. As one example, the sensor 1520 may be a lidar sensor used for determining ranges of an object or surface (e.g., an input source).

In some configurations, the functionality (or a portion thereof) described herein as being performed by the sensor(s) 1520 may be performed by another component (e.g., the display device(s) 1517, the imaging device(s) 1519, another component of the user device 1410, or a combination thereof), distributed among multiple components, combined with another component, or a combination thereof. As one example, when the sensor 1520 includes an image sensor, the imaging device 1519 may perform the functionality (or a portion thereof) of the sensor 1520. In some configurations, the imaging device 1519 may be an image sensor.

As illustrated in FIG. 15, the memory 1505 may store a learning engine 1525 and a model database 1530. In some configurations, the learning engine 1525 develops one or more models using one or more machine learning functions. Machine learning functions are generally functions that allow a computer application to learn without being explicitly programmed. In particular, the learning engine 1525 is configured to develop an algorithm or model based on training data. As one example, to perform supervised learning, the training data includes example inputs and corresponding desired (for example, actual) outputs, and the learning engine 1525 progressively develops a model that maps inputs to the outputs included in the training data. Machine learning performed by the learning engine 1525 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 1525 to ingest, parse, and understand data and progressively refine models.

As described in greater detail herein, in some configurations, the technology disclosed herein may utilize or implement one or more models or algorithms as part of providing neurocognitive impairment evaluation using XR, such as, e.g., an adaptive motion model, an object tracking model, a classification model, etc. Accordingly, in some configurations, the learning engine 1525 may be used to train one or more of those models or algorithms.

The model(s) generated by the learning engine 1525 can be stored in the model database 1530. As illustrated in FIG. 15, the model database 1530 is included in the memory 1505 of the user device 1410. It should be understood, however, that, in some configurations, the model database 1530 is included in a separate device accessible by the user device 1410 of FIG. 14 (including a remote database, the server 1405, or the like).

As illustrated in FIG. 15, the memory 1505 may include an application 1535 (e.g., a "FlightPlan" application, as described herein). The application 1535 is a software application executable by the electronic processor 1500 in the example illustrated and as specifically discussed below, although a similarly purposed module can be implemented in other ways in other examples. In some configurations, the application 1535 may be a dedicated software application locally stored in the memory 1505 of the user device 1410. Alternatively, or in addition, the application 1535 may be remotely hosted and accessible from the server 1405 (e.g., separate from the user device 1410 of FIG. 14), such as where the application 1535 is (or enables) a web-based service or functionality. As described in greater detail herein, the application 1535 (when executed by the electronic processor 1500) may enable or facilitate providing neurocognitive impairment simulation or evaluation using XR. As one example, the application 1535 (when executed by the electronic processor 1500) may access one or more models or algorithms stored in the model database 1530 and facilitate a neurocognitive impairment simulation or evaluation using the one or more models or algorithms such that the application 1535 provides a deep learning based neurocognitive impairment simulation or evaluation using XR.

The memory 1505 may include additional, different, or fewer components in different configurations. Alternatively, or in addition, in some configurations, one or more components of the memory 1505 may be combined into a single component, distributed among multiple components, or the like. Alternatively, or in addition, in some configurations, one or more components of the memory 1505 may be stored remotely from the user device 1410, or, in a remote database, a remote server, another user device, an external storage device, or the like.

Returning to FIG. 14, the system 1400 may also include at least one server 1405. The server 1405 may include a computing device, such as a server, a database, or the like. The server 1405 may host or otherwise provide a service or platform associated with the application 1535. In some examples, the server 1405 may host a service for generating a neurocognitive impairment simulation within an XR environment. Accordingly, in some configurations, the server 1405 is associated with the application 1535.

Although not illustrated in FIG. 14, the server 1405 may include similar components as the user device 1410, such as electronic processor (for example, a microprocessor, an ASIC, or another suitable electronic device), a memory (for example, a non-transitory, computer-readable storage medium), a communication interface, such as a transceiver, for communicating over the communication network 1430 and, optionally, one or more additional communication networks or connections, and one or more human machine interfaces. In some configurations, the functionality (or a portion thereof) as described as being performed by the server 1405 may be locally performed by the user device 1410. As one example, in some configurations, the user device 1410 may host or provide at least one application platform. In such configurations, the server 1405 may be eliminated from the system 1400. Alternatively, or in addition, in some configurations, the server 1405 may perform additional or different functionality than described herein. As one example, in some configurations, the functionality (or a portion thereof) as being performed by the user device 1410 may be performed by the server 1405. In such configurations, the server 1405 may store at least one of, e.g., the application 1535, the learning engine 1525, the model database 1530, or the like.

Figure 16:
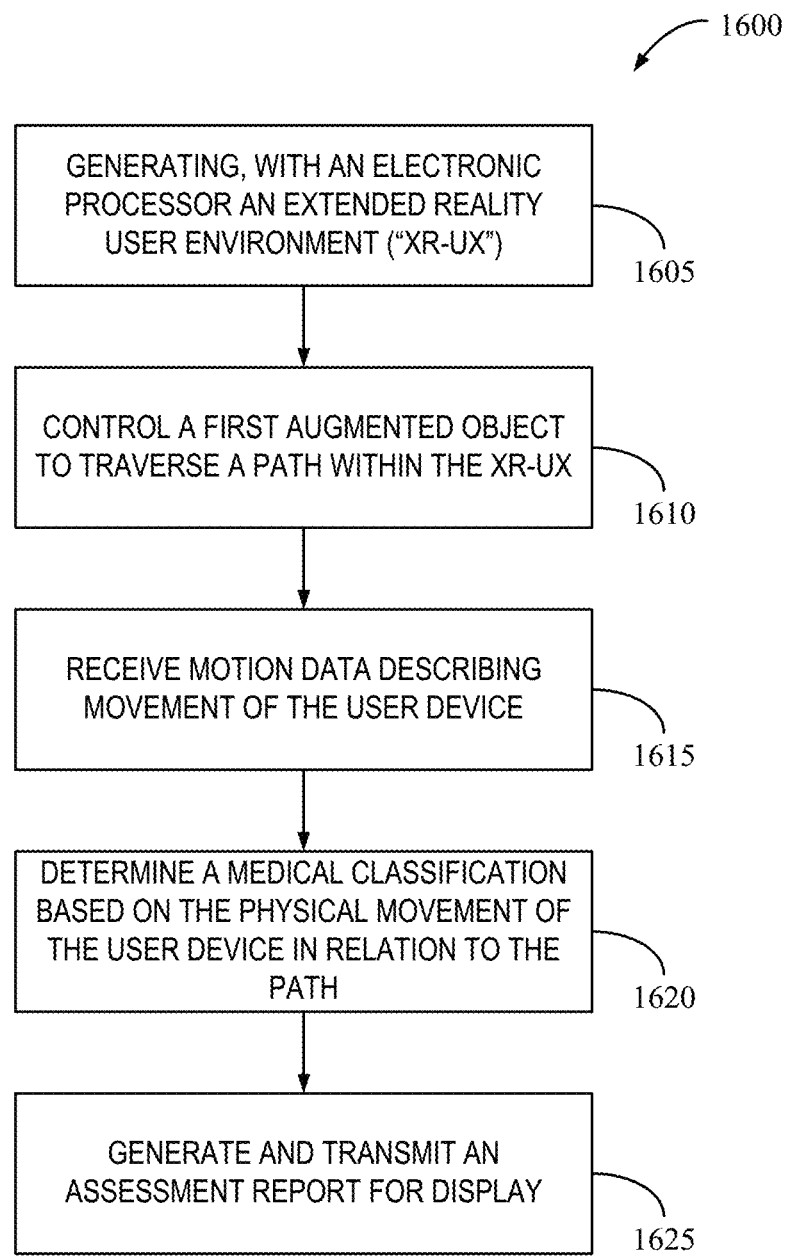
FIG. 16 is a flowchart illustrating a method for providing neurocognitive impairment evaluation using extended reality according to some configurations.

FIG. 16 is a flowchart illustrating a method 1600 for providing neurocognitive impairment simulation using XR according to some configurations. The method 1600 is described as being performed by the user device 1410 and, in particular, the application 1535 as executed by the electronic processor 1500. However, as noted above, the functionality (or a portion thereof) described with respect to the method 1600 may be performed by other devices, such as the server 1405, or distributed among a plurality of devices (e.g., distributed among the user device 14010 and the server 1405), such as a plurality of servers included in a cloud service.

Figure 17:
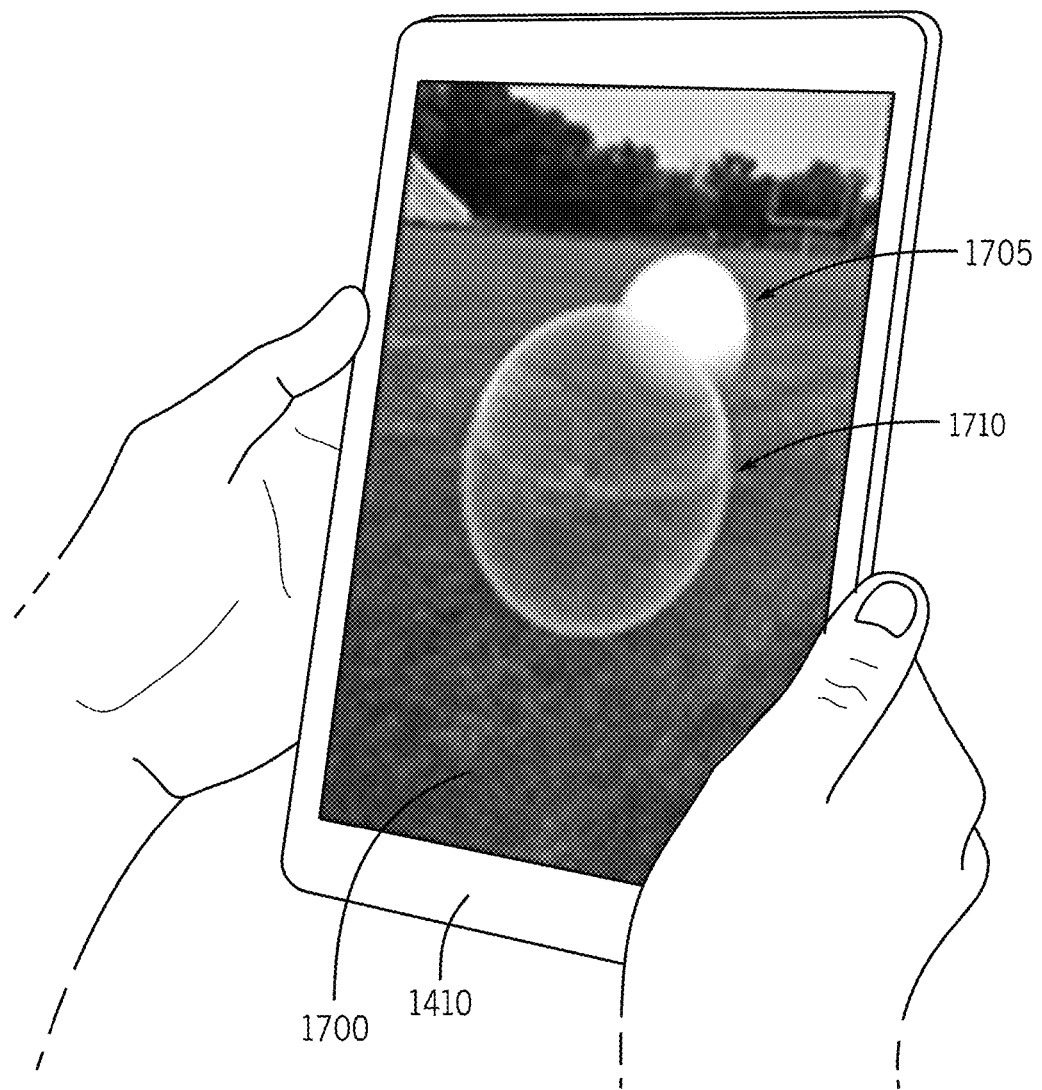
FIG. 17 illustrates a user device displaying an example extended reality user experience according to some configurations.

As illustrated in FIG. 16, the method 1600 may include generating, with the electronic processor 1500, an extended reality user environment ("XR-UX") (at block 1605). The electronic processor 1500 may generate the XR-UX and display the XR-UX via the display device 1517 of the user device 1410. In some configurations, the XR-UX includes a first augmented object configured to change position within the XR-UX. The first augmented object may be, e.g., an adaptive agent, such as the virtual hummingbird (as described in greater detail herein). Alternatively, or in addition, in some configurations, the XR-UX includes a second augmented object configured to dynamically change position within the XR-UX based on a position of the user device 1410. The second augmented object may be, e.g., another adaptive agent, such as the virtual capture sphere (as described in greater detail herein). As one example, FIG. 17 illustrates the user device 1410 displaying an example XR-UX 1700 according to some configurations. As illustrated in FIG. 17, the XR-UX 1700 includes a first augmented object 1705 illustrated as a sphere and a second augmented object 1710 illustrated as another sphere.

The electronic processor 1500 may control the first augmented object to traverse a path within the XR-UX (at block 1610) and the electronic processor 1500 may also receive motion data describing movement of the user device 1410 (at block 1615). The electronic processor 1500 may determine the path for the first augmented object using one or more techniques as described in greater detail herein.

Figure 18A:
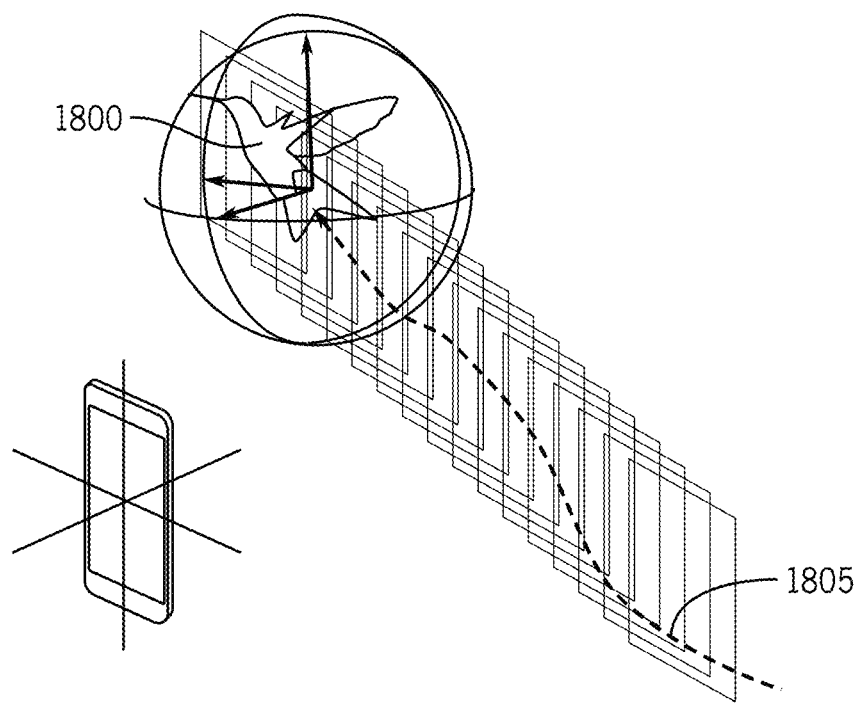
FIG. 18A illustrates a simple path for an augmented object according to some configurations.
Figure 18B:
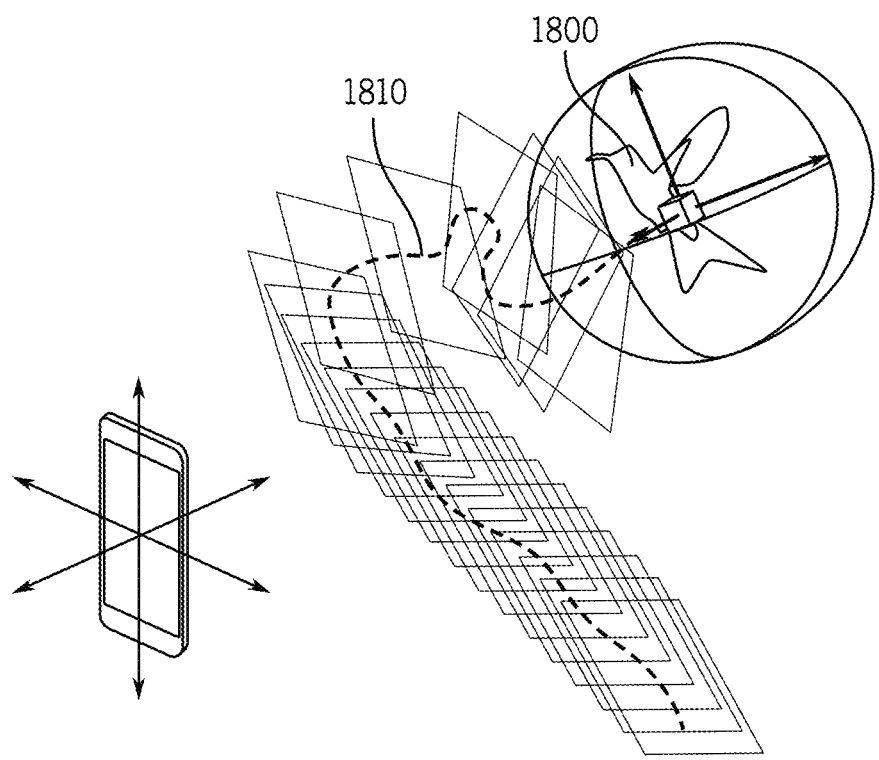
FIG. 18B illustrates a complex path for an augmented object according to some configurations.

As one example, FIGS. 18A-18B illustrate example paths for the first augmented object (represented by reference numeral 1800 in FIGS. 18A-18B) according to some configurations. FIG. 18A illustrates a simple path 1805 for the first augmented object 1800 according to some configurations. FIG. 18B illustrates a complex path 1810 for the first augmented object 1800 according to some configurations. As described herein, the hummingbird's (e.g., the first augmented object) flight path may be adaptive. For instance, the hummingbird may first travel in a simple linear trajectory (e.g., the simple path 1805 of FIG. 18A) and progressively become more challenging as the user continues to perform well (e.g., the complex path 1810 of FIG. 18B). Creating an adaptive algorithm may allow an empirical examination of how a user's tracking performance varies in response to different degrees of bird reactivity, both in normal and concussed states.

In some configurations, at regular time intervals, the electronic processor 1500 may analyze the user's tracking accuracy, which may be calculated from the average distance between the center of the first augmented object 1705 (e.g., the hummingbird) and the center of the second augmented object 1710 (e.g., the capture sphere). When the user is unable to track the first augmented object 1705 to a certain degree of accuracy for a set amount of time, arrows may appear on the edges of the display device 1517 to guide the user to the appropriate frustum. Once the first augmented object 1705 is re-visualized, first augmented object 1705 may resume flying in a simple lateral motion (e.g., the simple path 1805 of FIG. 18A) and then progressively increase the tracking difficulties as adequate tracking is re-established (e.g., the complex path 1810 of FIG. 18B).

In some configurations, the electronic processor 1500 may determine (or define) the complexity of the trajectory as a function of linear velocity, rotational velocity, frequency of trajectory change, magnitude of trajectory change, or the like. In some configurations, the electronic processor 500 may determine (or create) non-linear paths using semi-randomized interpolated polynomials (splines). In some configurations, at regular time intervals during the simulation (or testing) process, the electronic processor 1500 may record the Cartesian coordinates of both the center of the first augmented object 1705 (e.g., the hummingbird or sphere) and the center of the second augmented object 1710 (e.g., the capture sphere), as well as rotational components of each augmented object 1705, 1710, into a JavaScript Object Notation ("JSON") file. The electronic processor 1500 (or another component of the system 1400) may convert the dataset included in the JSON file to a Comma Separated Values ("CSV") file format to facilitate readability by commonly available analytics tools and to prepare the dataset for transformation into a three-dimensional object dubbed "NeuroDNA" (due to the manifested object's DNA-strand-like appearance). NeuroDNA Data Processing is described in greater detail herein, e.g., with respect to FIGS. 5A-5C.

Returning to FIG. 16, the electronic processor 1500 may determine a medical classification based on the physical movement of the user device 1410 in relation to the path of the first augmented object 1705 (at block 1620) and the electronic processor 1500 may generate and transmit an assessment report for display (at block 1625), where the assessment report may include the medical classification. In some configurations, the electronic processor 1500 may implement classification and feature extraction using deep-learning methods (e.g., one or more of the models stored in the model database 1530).

Figure 19:
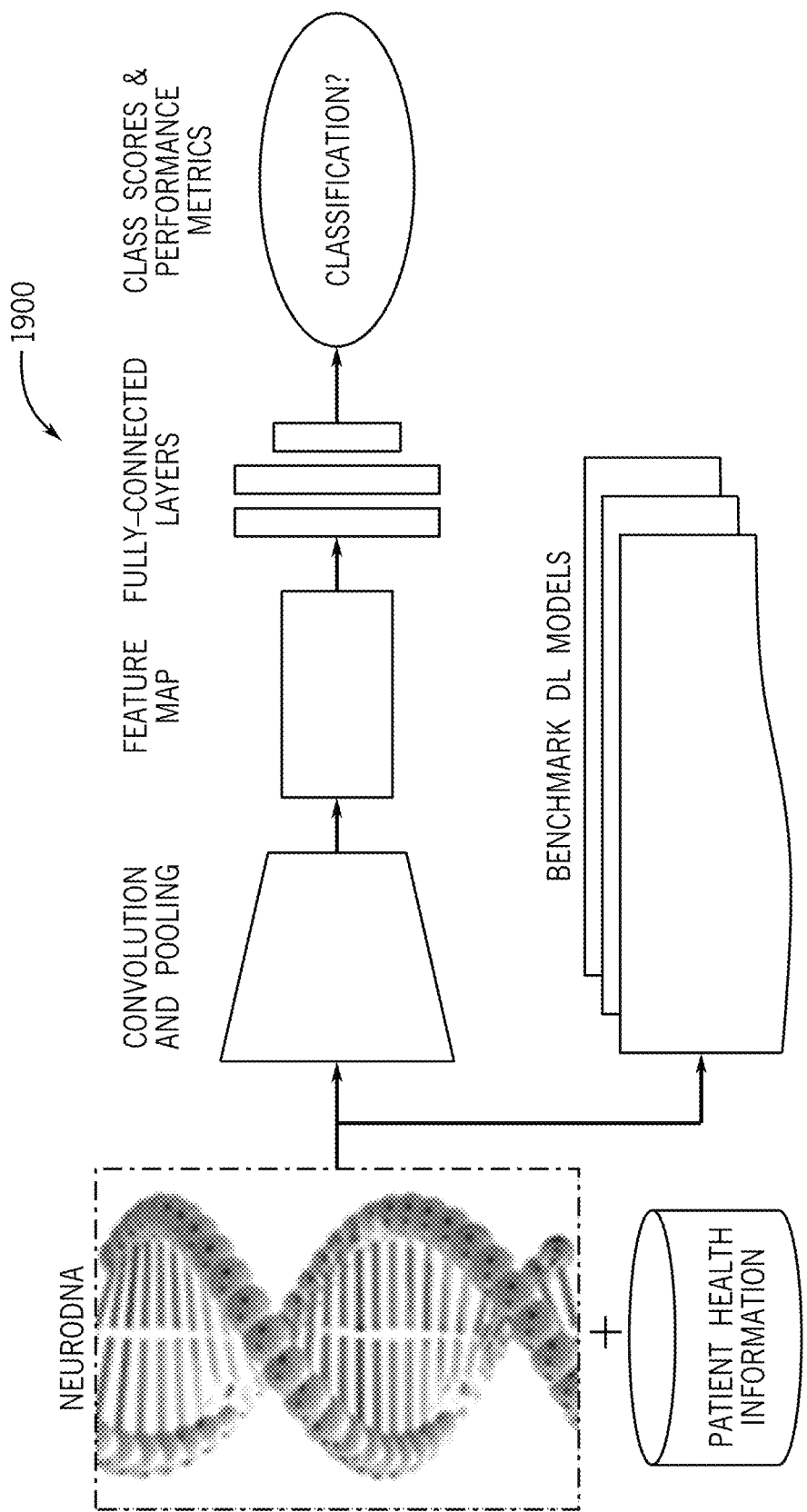
FIG. 19 illustrates a deep learning pipeline for classification according to some configurations.

Numerous investigators are advancing deep learning ("DL") methods to improve the binary decision-making process of models that leverage visual features spanning large dimensions. Compared with traditional machine-learning techniques (forest plots, decision trees, etc.), DL methods perform better for big data consisting of heterogeneous formats (e.g., time series and trajectories, events and raster data, images and videos, and spatial maps). In addition, DL methods require little manual effort for feature learning and interpretation. A wide variety of convolutional neural network ("CNN") and variant models (including restricted Boltzmann machines, Graph CNNs, recurrent neural networks, long short-term memory, sequence to sequence models, and autoencoders) have been extensively used in various applications. The implementation strategy shown in FIG. 19 outlines the structure of the data pipeline. For instance, FIG. 19 illustrates a deep learning pipeline 1900 for classification according to some configurations. Some technical details of this pipeline are intentionally omitted for brevity, including CNN and pooling specifications, network parameters (e.g., temporal depth), training strategies, classification result metrics (such as the area under the curve ("AUC")), and baseline performance evaluative algorithms.

In some configurations, the neural network for FlightPath (e.g., the application 1535) may be created using the transfer learning method, which involves appropriating a pre-existing model and re-training the pre-existing model with specific data and classifiers. This dramatically reduces the time and computational power for creating new models and allows for more flexibility in how the base network structure may be applied. Pre-trained models with a similar data structure and desired output to the desired new model are more likely to provide accurate results with less modification.

With rapidly advancing CNN algorithms for image classification, two remaining primary challenges may be identified. First, the 3D structure of NeuroDNA may be prepared and processed with minimal information loss in the DL pipeline 1900. Typically, 3D objects in CNN applications have been represented as volumetric grids, 2D projections, point clouds, or meshes. The technology disclosed herein may use a mesh-and-polygon structure to represent the NeuroDNA to represent irregular, non-uniform, and sparse shapes via vertices, edges, and faces. More recent mesh-based CNN algorithms, such as MeshNet and MeshCNN, show that meshes are superior to other representations in capturing local surface properties and learning geometrical connectivity. Specifically, mesh convolution and pooling enable the technology disclosed herein to collapse edges and aggregate features for simplification while retaining key geometric relations among faces, which allows for a reduced computational workload and more flexible input tailored to the classification purpose (as illustrated in FIG. 19).

A second challenge may involve the multi-label classification ("MLC") of NeuroDNA features that are relevant to post-concussion symptoms. Contrary to binary or multi-class classification problems, MLC deals with an advanced classification problem in which more than one class label is simultaneously permitted for a given instance. The diagnostic decision of concussion is essentially MLC because a concussed patient may present with one or many varying clinical presentations, some of which are exampled in Table 4 (below).

TABLE 4

Hypothetical Relationship between NeuroDNA and Impairments

| NeuroDNA Finding | Related Condition |
|---|---|
| Rapid increases in inter-object distance when FlightPath trajectory is directly towards or away from user's point of view (Z-axis) | Impaired Depth Perception |
| Frequent lateral inter-object distance fluctuations up to a certain distance, not exhibited in the vertical plane | Diplopia |
| Increased inter-object distance after rapid or prolonged device rotation about the vertical Y-axis | Dizziness/Vertigo |
| Repeatable sudden rapid increase in inter-object distance within a particular quadrant or half of the view frustum, followed by rapid correction once out of the region of the view frustum | Hemianopsia or Visual Neglect |
| Slow course correction in response to rapid changes in tracked object's direction of movement | Cognitive Processing Delay |
| Device does not extend above a certain point on the vertical Y-axis despite appropriate calibration period adjusting for height | Weakness in Shoulder Flexors |
| Total drop in depth (Z-axis) tracking after a certain distance away from the device | Mobility Impairment |
| Rapid, chaotic movement unrelated to FlightPath and followed by a correction | Imbalance |

Specifically, MLC involves learning a predictor f: $\mathcal{H} \rightarrow 2^{\mathcal{L}}$ that maps an instance x of the NeuroDNA feature space $\mathcal{H}$ ($x \in \mathcal{H}$) to subsets of the finite symptom label space $\mathcal{L} = \{\lambda_1, \ldots, \lambda_p\}$. According to this predictive mapping, prediction will generate a binary vector $y = f(x) = (y_1, \ldots, y_p) \in \{0, 1\}^p$, where each diagnostic condition $y_i$ encodes the presence (=1) or absence (=0) of the corresponding label $\lambda_i$. The key to accurate classification in MLC is to capture underlying dependencies between the NeuroDNA feature set x and each target condition $y_i$, as well as between the conditions $y_1, \ldots, y_p$ themselves (36). A viable approach to resolving complex dependencies is to discover and exploit a set of ad-hoc rules that govern each target condition $y_i$, given specific feature patterns and other conditions $y_j$ ($j \neq i$) (37). Empirical data collection from human subjects combined with medical insights will inform the rule discovery which improves the CNN model's interpretive ability. The result is a true blending of medical knowledge and AI that creates a powerful and informed clinical tool.

Figure 20:
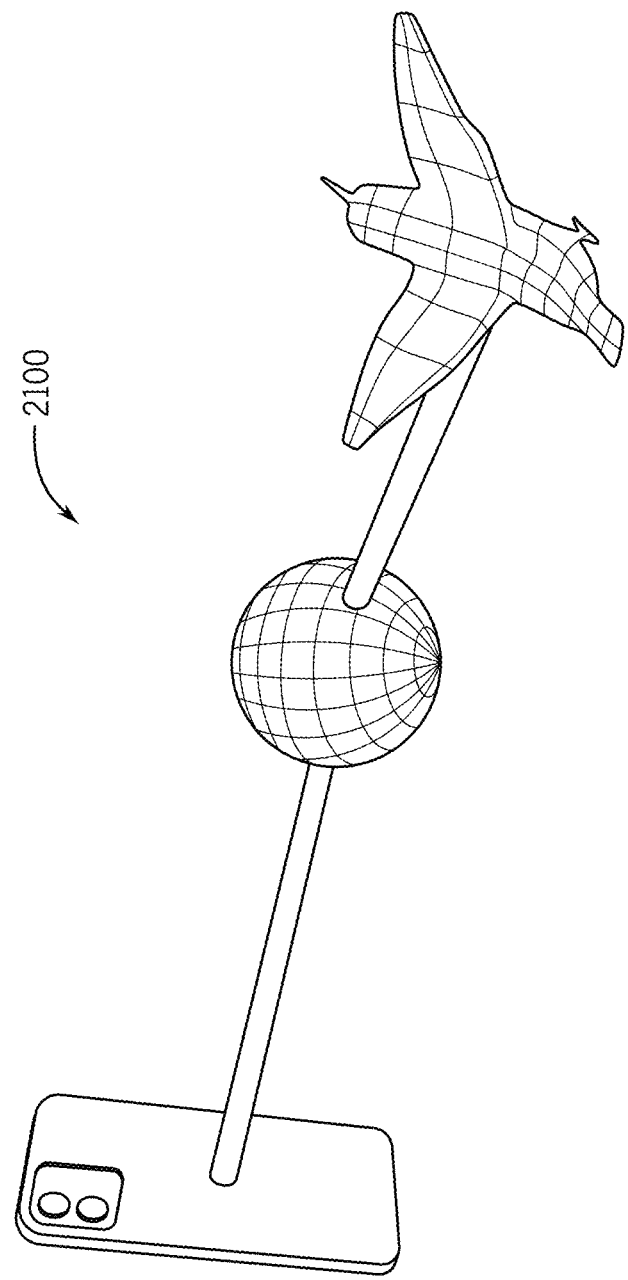
FIG. 20 illustrates a mesh representation of the link connecting two augmented objects according to some configurations.

The training data for the MLC problem will be a sequence of tuples $\mathcal{T} := \langle (x_1, y_1), \ldots, (x_m, y_m) \rangle \subseteq \mathcal{H} \times \mathcal{L}$. For illustrative purposes, a Recurrent Neural Network (RNN) algorithm from MeshWalker[42] was applied to the classification of the three mesh elements, i.e., the links, the spheres, and the birds, as depicted in FIG. 20. FIG. 20 illustrates a mesh representation 2000 of the link connecting the two objects (bird and user sphere), along with the additional link representing viewing direction according to some configurations. The MeshWalker model consists of two fully connected (FC) layers with output dimension 256, three RNN layers with output dimension 512, and one FC layer for the three classes. The mesh model was trained on ModelNet40 objects and tested with 30 basic prototype NeuroDNA samples taken at a different instance in time. At the end of the training, 12,637,706 parameters were trained, and the classification accuracy reached 82.45%. It is an assuring result for the future MLC of more complex NeuroDNA features that consider dynamic changes.

Ultimately, the MLC performance outcomes will be measured by using four metrics: a) precision, i.e., the percentage of correct predictions among all predicted labels; b) hamming accuracy, i.e., percentage of correctly predicted present and absent labels among all labels; c) F-measure, i.e., weighted harmonic mean of precision and recall; and d) subset accuracy, i.e., percentage of perfectly predicted label vectors among all samples.

It is possible that a classification neural network developed directly from the tabular position data generated by, e.g., the application 1535 (e.g., FlightPath) could be more accurate and less resource-intensive than one based on a 3D representation of that data. When, for example, it is true that concussed individuals always have a significantly greater average tracking distance from the hummingbird than their non-concussed cohorts, this approach would likely be superior. Accordingly, in some configurations, a tabular data model may be developed for comparative purposes. However, this model is likely to fail when the relationship between concussion and tracking pattern proves to be more complex or abstract. Additionally, the purpose of the proposed model is to not only detect concussion, but to further understanding of how it relates to tracking patterns. Structuring data to make features more evident (i.e., feature engineering) is a component of machine learning, especially when attempting to facilitate more complex feature extractions from data. NeuroDNA exemplifies this approach by presenting the spatial and temporal relationships within a 3D environment that is far less abstract than spreadsheet data and therefore more interpretable by clinicians. By creating a model that analyzes this visual representation, the model's determination mechanics can be dissected to both provide a more understandable explanation to clinicians as to why the determination was made (addressing the "black box" conundrum of machine learning) as well as identify previously unknown features of concussion manifestation that may further understanding of this complex and multi-faceted condition.

Accordingly, the technology disclosed herein provides new visual techniques and workflows to support diagnosis, sub-classification, and prognostication of NCI. For instance, the technology disclosed herein provides new interactive visualization paradigms for studying vector mapping data, an easy-to-use workflow that facilitates collecting and interpreting vector mapping data, and eventually exporting relevant data for integration into the electronic health record. The technology disclosed herein may provide investigators with novel interactive visualization tools and the ability to fluidly use these novel techniques to support diagnosis, sub-classification, and prognostication of NCI.

Maximizing the Diagnostic Confidence

Inaccurate classification could stem from the inefficiency of data acquisition, during which the combination of flight parameters presented to the user did not help discover the underlying neurocognitive impairment. A feedback mechanism may be implemented to ensure that the proposed application will capture a sample of task performance that yields high diagnostic confidence. The technology disclosed herein may use Bayesian optimization, a sequential optimization scheme that will efficiently search for a next set of parameters that is most likely to increase a value in a black-box function, based on the current posterior estimation of the value, so the diagnostic confidence will increase.

Enhancing Specificity

The proposed data acquisition process makes for a highly sensitive system, as deficits in any area of perception, cognition, and motor control may affect performance. However, high sensitivity in tests could suffer from a decline in specificity. For example, it is possible that an individual with poor vision may demonstrate a tracking pattern that is indistinguishable from that of someone with dementia. Incorporating eye-tracking technology could aid in specifically identifying visual impairments. Accordingly, in some configurations, the technology disclosed herein may monitor front and rear cameras simultaneously, which is a recently enabled function for AR-based applications, to record head-tracking data during sessions and computationally estimate a gaze vector in real time (or near real-time). This method may enable the monitoring of head position and rotation without restricting usable devices.

Handling Sensor Failures

Errors in spatial detection and device orientation occur most often in spaces with few planes to detect (such as outdoors), spots with poor lighting, or during movements that are too rapid for the sensors to track. An augmented reality software development system may contain features (e.g., pre-built features) that can be programmed to halt and/or restart tasks as necessary if the application is unable to maintain confidence in its orientation. The user may be made aware of the most likely solution for the orientation error, such as moving indoors, turning lights on, or moving smoothly throughout the space. Data corrupted by poor system tracking may not be recorded and, if comprising a significant portion of the testing phase, may terminate the session early to prevent erroneous interpretation.

Augmenting the Training Data

Input data that is highly skewed or imbalanced could impede the DL model's achievement of high sensitivity. To address this issue, a combination of data augmentation strategies may be used to balance the data by increasing the amount of training data for rare classes. In some configurations, meta-learning may be adopted to help re-weight the importance of training data.

Figure 21:
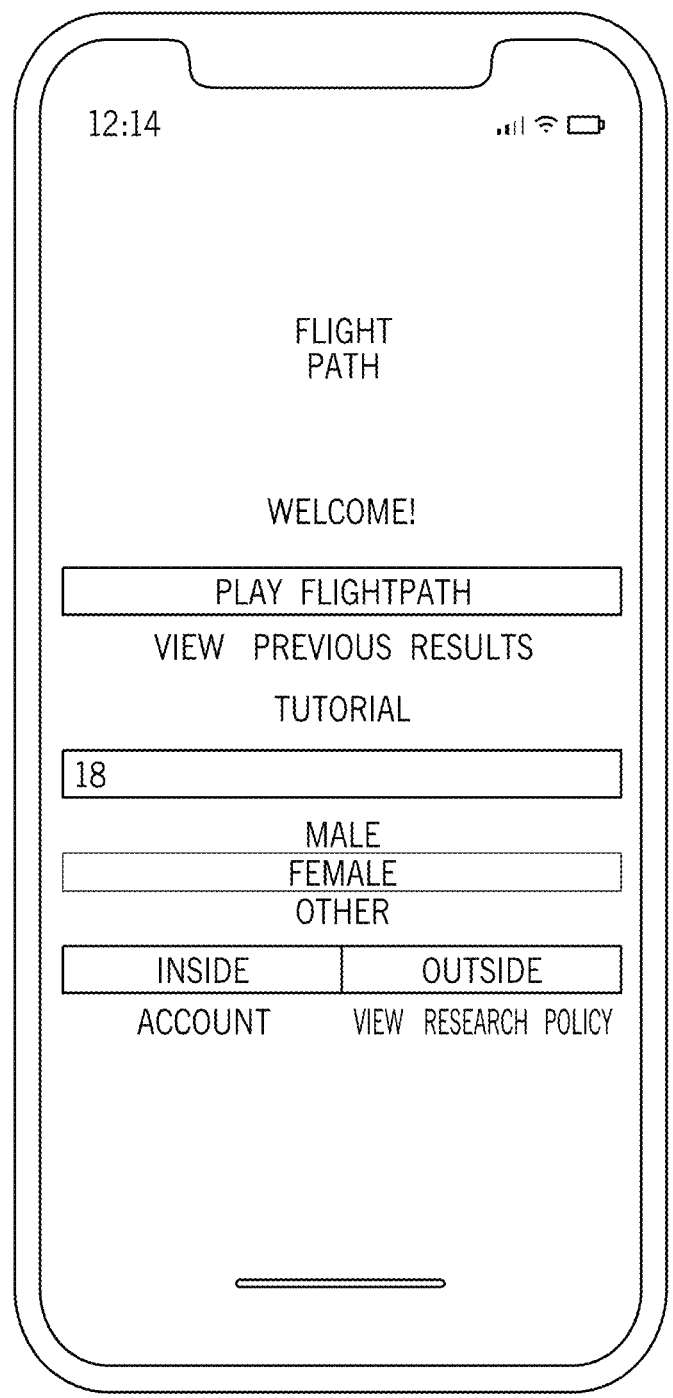
FIG. 21 illustrates an example user interface of the application according to some configurations.
Figure 22A:
FIGS. 22A-22D illustrate example screenshots of the user interface according to some configurations.
Figure 22B:
Figure 22C:
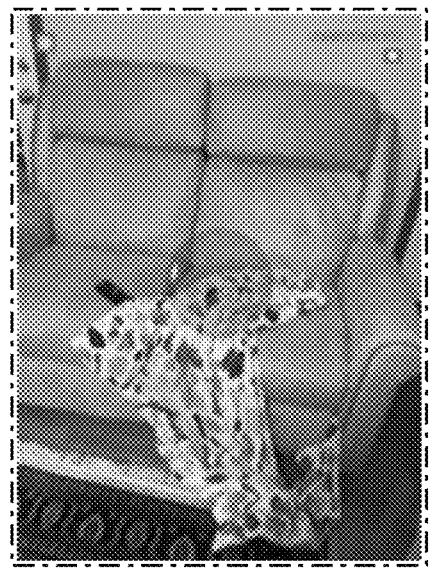
Figure 22D:
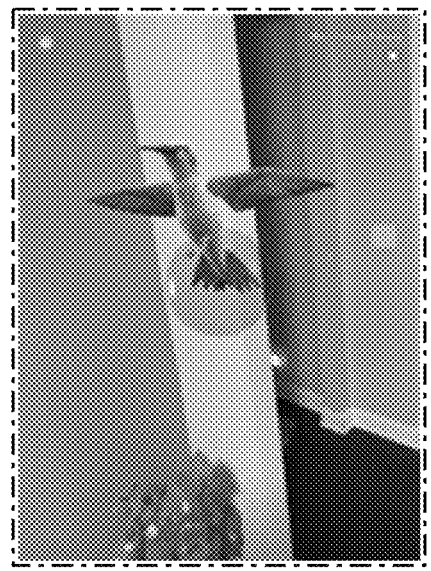

FIG. 21 illustrates an example user interface of the application 1535 according to some configurations. FIGS. 22A-22D illustrate example screenshots of the user interface according to some configurations. FIGS. 22A-22B illustrate example screenshots taken in an outdoor environment and an indoor environment, respectively. FIGS. 22C-22D illustrate example screenshots taken in a low contrast environment and a high contrast environment, respectively.

In some configurations, the application 1535 collects application data in the cloud storage, including user demographics (e.g., age, gender, or the like), test environment (e.g., date, time, the space being either inside or outside, or the like), and user performance data at 60 Hz (spatial locations of the hummingbird and capture sphere, and the orientation of the user device 1410). When the user device 1410 incorporates a built-in LiDAR sensor and front and rear cameras, the spatial tracking of the user's eyes generates additional usable data, including, e.g., the user's face plane, the distance between the eyes and the user device 1410, the user's eye level, or the like.

Task-difficulty configuration and process validation strategies have been evaluated using two replicates of test sessions, each from up to ten participants who do not have clinically diagnosed impairments. To ensure testing quality, eleven flight parameters and environmental variables potentially related to task difficulty (i.e., experimental factors) were defined and systematically varied, and deviations in performance were analyzed. For efficient testing strategy, the Plackett-Burman design was deployed. To quantify and track a user performance, we adopted the concept of speed (defined as a statistical mean of the short period of time to complete a "coherent" capture sphere movement in response to the bird location changes in space) and accuracy (a standard deviation from the sample of the instantaneous distance between the bird and the capture sphere in space), and its tradeoff, which is a universally accepted framework to characterize human performance in rapid aimed movements. For automated segmentation of the time-dependent user performance data into coherent samples of capture sphere movement, the Greedy Gaussian algorithm was used. The initial analysis of the variation satisfied the acceptability criteria (the proportion of variation due to the experimental factors: 29%, reproducibility: 57%, repeatability: 11%, and measurement/encoding errors: 3%), implying that the data collected has potential to measure between-subject performance differences. More data collection of users with and without neurocognitive impairments may improve the validation accuracy.

Figure 23:
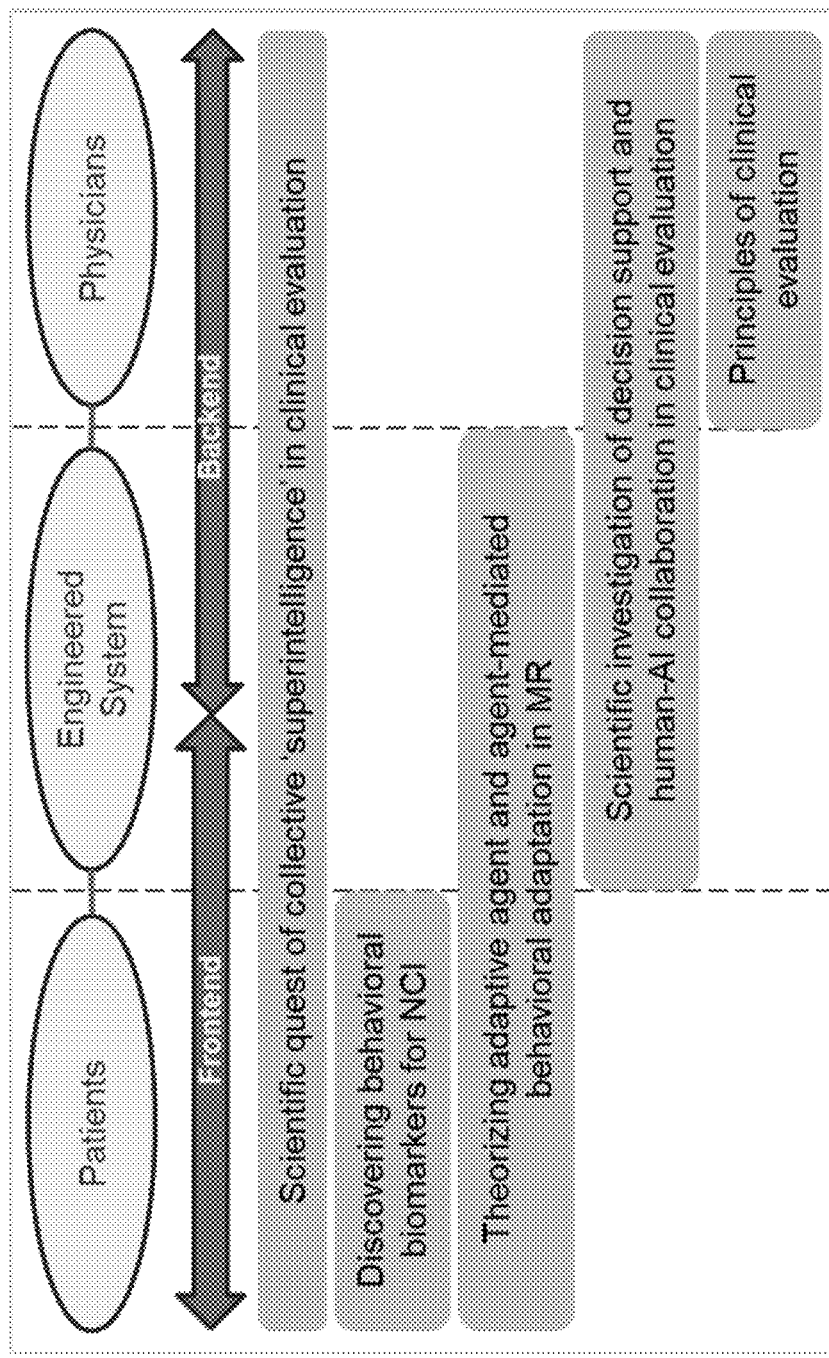
FIG. 23 illustrates an example workflow according to some configurations.

The technology disclosed herein seeks an interdisciplinary approach to holistically address a broad range of technical problems associated with NCI evaluation, particularly in the context of AI-assisted decision support. In some instances, the technology disclosed herein may establish an interoperable clinical workflow for diagnosis, prognostication, and serial evaluation of NCI, which will further enable the scientific quest for a new type of system-wide intelligence specializing in clinical evaluation, as illustrated in FIG. 23. Contrary to current AI-assisted clinical-decision support, which is applicable primarily to identification of well-defined, narrowly-scoped cases with unambiguous signs and symptoms, the technology disclosed herein may provide a collective superintelligence that ensures objective and robust evaluation across multiple time points in multiple manifestations of NCIs. This superintelligence will hinge on interoperable exchange of data, information, and knowledge among humans and AI through the new clinical workflow that will particularly bring together a patient's self-administered sampling of behavioral biomarkers, data-driven inference and AI, and diagnostic knowledge from a group of remote physicians.

In addition, the front-end of the workflow through which patients and the system interact will stimulate discovery of now-unknown behavioral biomarkers for NCIs, as well as theorization of agent-mediated adaptation to ensure robust sampling of the biomarkers. The back-end, on the other hand, will spur scientific investigation of human-AI collaboration, as well as principles for diagnosis, prognostication, and serial evaluation.

Research Objectives

Research Objective 1—Establishing the Front-End Workflow in MR to Facilitate Behavioral Sampling for Concussion Evaluation In some configurations, the technology disclosed herein may facilitate establishment of a front-end of a clinical evaluation workflow that facilitates patient access and ensures effective, efficient, and robust sampling of the most likely behavioral biomarkers for NCI, via user interactions with an agent in MR. Multi-modal onboard sensing data on smart devices can enable collection of a large stockpile of spatiotemporal data at a frame rate representing user interaction with the device. For sensitive detection of subtle NCI signs and symptoms over realistic noises (e.g., motion artifacts), this data collection may concentrate on the behavioral cues most likely related to NCI, whereas for specificity, the data may cover all manifestations of NCIs (e.g., disorientation, dizziness, imbalance, impaired cognition and level of consciousness, nausea, visual disturbances, and motor impairment). A key methodological challenge is thus how to sample effectively, efficiently, and robustly in the data rich mobile setting, in which only a small fraction of behavioral features are potentially associated with NCI, without knowing in advance whether or not the user has NCI. Establishing the front-end workflow may involve not just development of methods and tools, but also proof of clinical utility in terms of accessibility and usability, and validity (e.g., when the sampled biomarkers are compared against the gold-standard concussion diagnosis).

Issues of Mobile Technology and Big-Data Approach for Concussion Evaluation

While recent mobile technologies show promise in detecting concussion-related impairments, technical problems still exist. Objective and reliable measurement of NCIs with low-cost technology platforms may be feasible; the demonstrated accuracy in detecting mTBIs is comparable to, or even outperforms, the gold-standard tools; in particular, dynamic visuomotor tracking with the aid of sensors and/or graphical cues can be highly effective in identifying subtle impairments. Despite positive prospects, most solutions suffer from limited quality and size of data, because these technical solutions have never been incorporated into clinical practice. In the meantime, numerous global research collaborations have pursued big-data approaches to mTBI; to improve diagnostic accuracy, they accumulated patient health records and culminated in large-scale clinical trials. While such endeavors are laudable, longitudinal evaluation can suffer from inconsistencies and biases when heterogeneous studies are synthesized for knowledge discovery or to draw a general conclusion, calling for a united interoperability standard.

Rationales for Mobile-Based Sampling of Behavioral Biomarkers in MR

For a representation of NCI signs and symptoms, the FlightPath uses object-following task performance, which demands a keen sense of perception, agility in motor control, and cognitive abilities to anticipate the imminent object trajectories. This simple task is an extremely powerful experimental paradigm, shown to represent internal abilities, since it robustly conforms to a functional relationship between task conditions and explicit performance. Following an object that moves along a complex trajectory at a variable speed, including frequent stop-and-go, could enable to capture a comprehensive set of neurocognitive abilities, including focused attention, reaction time, control accuracy, and whole-body balance, all of which are related NCI signs and symptoms.

More than 90% of Americans have mobile phones, more than half of which are smartphones. The precision sensing and computing, and augmented reality (AR) technology on mobile devices will enable to access a large number of NCI patients worldwide without the presence of trained medical staff while maintaining consistent data collection and management protocols. Under the traditional paradigm, anything less than a direct and formal evaluation was disregarded as having insufficient diagnostic quality. However, the COVID-19 pandemic has disrupted that paradigm and stimulated new forms of remote TBI evaluations via telehealth technology implemented first in military settings and then in rural areas, successfully yielding high accuracy comparable with that of direct evaluation.

User-Performance Representation

Figure 25A:
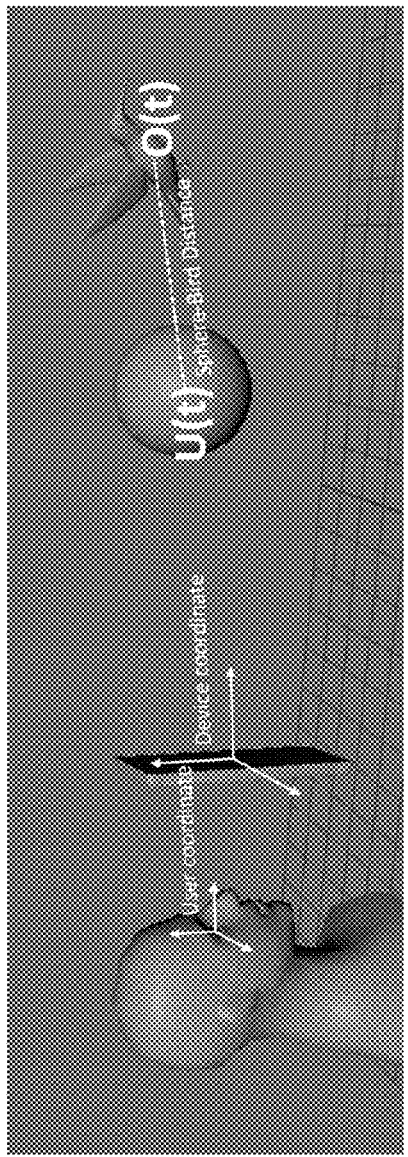
FIGS. 25A-25B illustrate dynamic locations of the hummingbird and capture sphere according to some configurations.
Figure 25B:
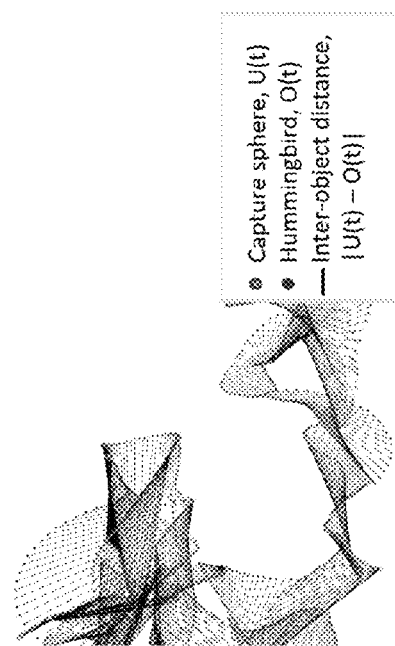

One way to encode user performance is by using a connected pair of time series vectors, O(t) and U(t), where O(t) indicates the center point of the hummingbird location in a 3-dimensional space and U(t) indicates the corresponding user responses with the capture sphere. That inter-object distance between O(t) and U(t) indicates instantaneous tracking performance whereby a relatively short distance is an outcome of user tracking accuracy in response to bird reactivity (as illustrated in FIGS. 25A-25B). FIGS. 25A-25B illustrate dynamic locations of the hummingbird and capture sphere, along with the user and device coordinates in 3D (FIG. 25A), which can be formed into a spatiotemporal, NeuroDNA (FIG. 25B). Over time, temporally sequential O(t)–U(t) vectors can form a DNA-strand-like visual representation (dubbed "NeuroDNA"). In addition to the spatiotemporal relationships between the hummingbird and tracking sphere, the device's location and orientation are also tracked using the built-in gyroscope sensor, while the user's two eye locations and gaze direction in the space are estimated using the rear-facing camera; this enables formation of device- and user-view coordinate systems for further analysis.

Dynamic Modeling of NCI for Mobile Computation

Based on the NeuroDNA collected, the mobile computing may update its own, quick estimation of impairments, so the hummingbird in the next frame rate may choose a particular flight pattern that favors exploitation of suboptimal functions most likely to be associated with NCIs, over exploration. This choice of search preference to be implemented in the hummingbird may serve as an adaptive strategy to ensure effective sampling of biomarkers under uncertainty.

For this model-based probabilistic NCI estimation, we will use a dynamic Bayesian network (DBN), which may enable us to empirically update the probabilities of suboptimal performance observed given specific NCIs, while dynamically modeling the temporal relations of selected performance-related variables parsed out from the NeuroDNA. To characterize those variables, it may be presumed to be a sequential two-player game between the hummingbird and the user; at every point of maneuver change, the hummingbird may deliberately impose a new demand to maximize the probabilities, and in responding to that demand, the user is likely to uncover suboptimal performance. In a dynamic term, the inter-object distance at a discrete time point $T_i$, $O(T_i)$, $U(T_i)$, is a combined result of the previous demand set forth at $T_{i-1}$ by the hummingbird, followed by the user responses executed between $T_{i-1}$ and $T_i$.

Additional strategy to ensure effective, efficient, and robust sampling: In addition to the adaptive sampling induced by the hummingbird based on the DBN modeling of NCIs, agent-mediated nudging offers the theoretical framework to devise various secondary strategies to ensure that the sample serves the purpose of quality evaluation later in the back-end. Much as in the controlled experiment discussed in herein, the most effective nudging strategies may be determined and incorporated into the hummingbird flight pattern.

In some configurations, instead of filling the entire session with the adaptive flight algorithm, the session may be divided into small segments of simple standard tasks, including forward-moving three steps, turning in a full circle, bending over, and switching attention to different points within an arm's reach; then an adaptive algorithm may be activated in a complimentary manner for free object-following tasks. This combination of standard and free tasks may help separately measuring the effects of motor control, perception, and cognitive information processing, and thus enable to disentangle the complexity of NCI signs.

Research Objective 2—Establishing the Back-End Workflow to Facilitate a Visual Interface for Clinicians, as Well as Predictive AI to Augment Human Decisions In some configurations, the technology disclosed herein may facilitate establishment of a back-end of a clinical-evaluation workflow that assembles dispersed intellects of physicians via a visually mediated assessment interface, while advanced data analytics and AI effectively augment that assessment, so the overall quality of the collective superintelligence may surpass that of single-physician-administered evaluation. This may help logically prove the condition of a diagnostic superintelligence: that the quality of diagnosis it produces, embedded in the proposed workflow back-end, surpasses that of human-only or AI-exclusive clinical evaluation. This condition may be achievable when synergistic effects occur between physician(s) and AI such that they complement each other's diagnostic strengths, and one does not replace or become subordinated to the other. Success, therefore, may depend on the design, implementation, and empirical proof of the specific conditions within the back-end workflow that supports (or guarantees) synergistic collaborations between AI and physicians. Hypothetically, it is proposed that a visually mediated evaluation leveraging immersive analytics may offer a unified setting to stimulate collaborative synergies, because physicians can exploit human strengths of visual analytics to augment decision-making, whereas AI can visually express its computational outcomes on the same visual representation for enhanced interpretability.

Limitations in the Quality of Mobile-Based Diagnostic Evaluation

A recent review of 29 studies that developed smartphone applications for measuring functional impairments concluded that, despite the technologies' superior ability (relative to human observation) to detect impairments, they cannot be used as standalone tools to replace the gold-standard evaluation because their false-positive and false-negative rates are too high, with each at 13-19%. In fact, high false-positive and false-negative rates are also a chronic problem with subjective observation; a recent meta-analysis reveals 32% false-positive and 23% false-negative rates. Those limitations call for the incorporation of AI assistance to improve the quality, as discussed herein.

Issues with AI-Assisted Clinical Decision Support Tools (CDSTs)

Despite their potential for aid in various clinical evaluation, previous research have also identified significant obstacles to the adoption of CDSTs. One of the prominent barriers is interpretability, and subsequent trust in the tool. If a physician is unsure about whether the tool can provide accurate and actionable information that can help with patient care, a physician will likely not adopt it. As an alternative, the use of intuitive visualization tools that help them better understand the outputs of CDSTs may make these tools easier to trust. Another significant barrier to CDST adoption by physicians is the lack of considering how these tools may fit into clinical workflows. Previous research has surfaced questions about whether AI/ML can fit into clinical workflows as either a tool, a member of the team, or both; the design of CDSTs can vary significantly based on the AI's role with respect to clinicians in the workflows.

AI/ML-Enabled Predictive Analytic for Enhanced Interpretability

Existing ML models built on structured data, tend to produce limited interpretability and generalization, because they do not incorporate domain-expert knowledge. On the other hand, structured modeling tools can encode medical experts' insights for integration into an automated diagnosis process, while those structural tools may lack the flexibility to learn from data. Alternatively, the recently developing transformer architecture has potential for enhancing diagnostic observation and reasoning, by overcoming many obstacles of rigid structured models; applying this model to predicting cancer survival from genomic data and other clinical inputs, has shown significantly better accuracy and interpretability than traditional models.

Visually-Mediated Enhancement of Human Diagnosis

The proposed concept for enhancing diagnostic perception and reasoning is for clinicians to actively use immersive analytics, so that situated visualization (i.e., playback of a patient's object-following as seen from the patient's own viewpoint for in situ analysis), intuitive spatial interactions, and team analysis can be maximally used. Immersive analytics have demonstrated advantages in perceptual and cognitive aspects of diagnosis, such as spatial perception, absolute value estimation, and memorization. In addition, our visualization of the NeuroDNA will focus on the transforming the NeuroDNA features in line with clinicians' evaluation needs, so that all visual features will deliver meaningful analytic information about particular impairment of interest. This performance-analytic framework is beneficial to promote cognitively driven analysis, so clinicians can better observe and make sense of related visual features in the NeuroDNA.

Interpretable, Interactive, and Data-Efficient DL Pipeline

Figure 26:
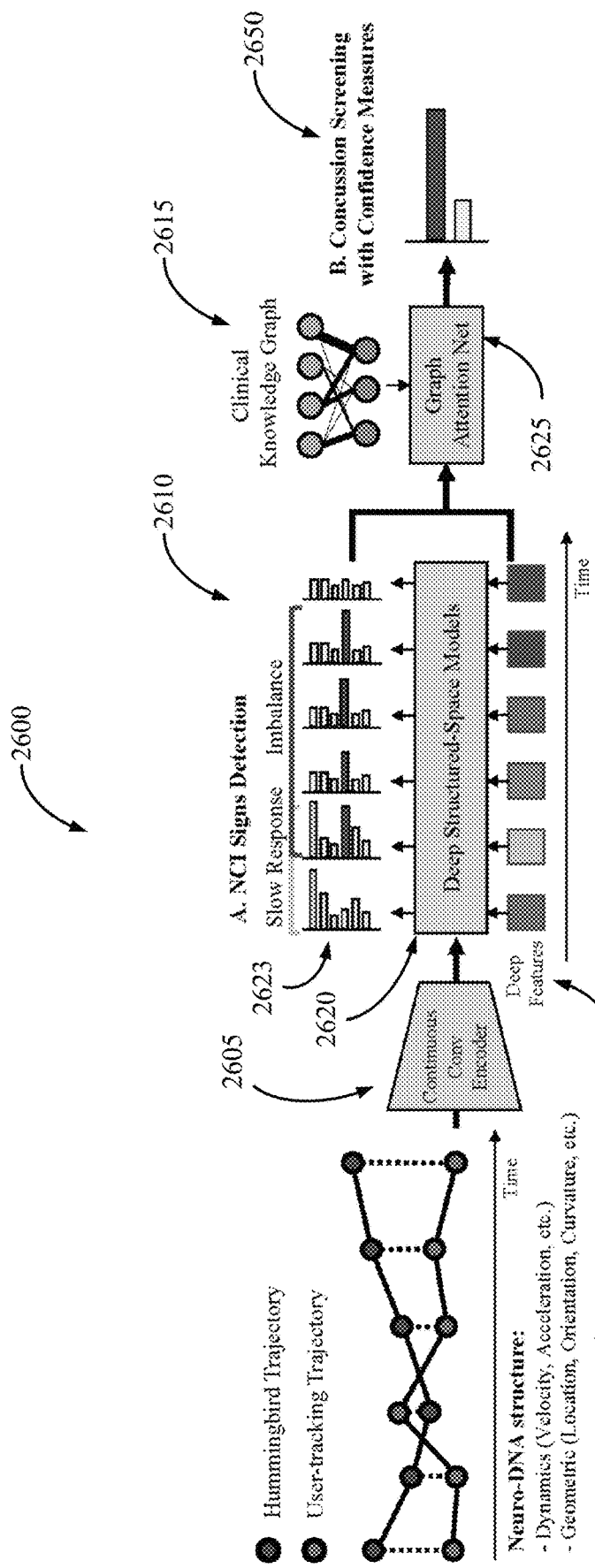
FIG. 26 illustrates an example predictive DL pipeline 2600 according to some configurations.

The technology disclosed herein may combine predictive deep learning (DL) with knowledge graph reasoning to provide an interpretable, interactive, and data-efficient NCI detection. For example, FIG. 26 illustrates an example predictive DL pipeline 2600 according to some configurations. Using the NeuroDNA as an input (represented in FIG. 26 by reference numeral 2602), the pipeline 2600 consists of three main components: a continuous CNN-based encoder 2605 as a backbone for ML conducive feature representations; a time series transformer classifier 2610 to identify NCI features; and a clinical knowledge graph 2615 to weight attention with physician-sourced weightings. As illustrated in FIG. 26, the pipeline 2600 begins by encoding the NeuroDNA 2602 into deep sequential representations to enhance its representational strength using a structured state-space model 2620. This representation is then channeled into a discriminative header to detect and localize the NCI signs over time (e.g., via the time series transformer classifier 2610). Subsequently, both the deep features 2621 and intermediate NCI signs 2623 are integrated into a graph attention network 2625. Its topology and weight are determined by expert knowledge, encapsulating how specific NCI signs correlate with the final concussion evaluation (represented in FIG. 26 by reference numeral 2650).

Design and Develop a Novel Visual User Interface for Immersive Analytics

In some configurations, the technology disclosed herein may provide a visual interface that may facilitate situated analysis, interactive annotation, and team discussion. In some instances, a clinician may choose to playback a patient's object-following as seen from the patient's own viewpoint (i.e., situated analysis), so that subtle signs of impairment could be easily perceived with reference to the clinician him/herself. In addition, a clinician's annotations, designed to manually mark features related to NCIs on the visual representation, may be used to register his/her own perception. The annotation may also facilitate visual communications among clinicians with different medical expertise, to form team cognition about difficult patient cases, and foster critical reasoning for clinical education.

Figure 27A:
FIG. 27A illustrates a screenshot of an interface including a third-person view of NeuroDNA according to some configurations.
Figure 27B:
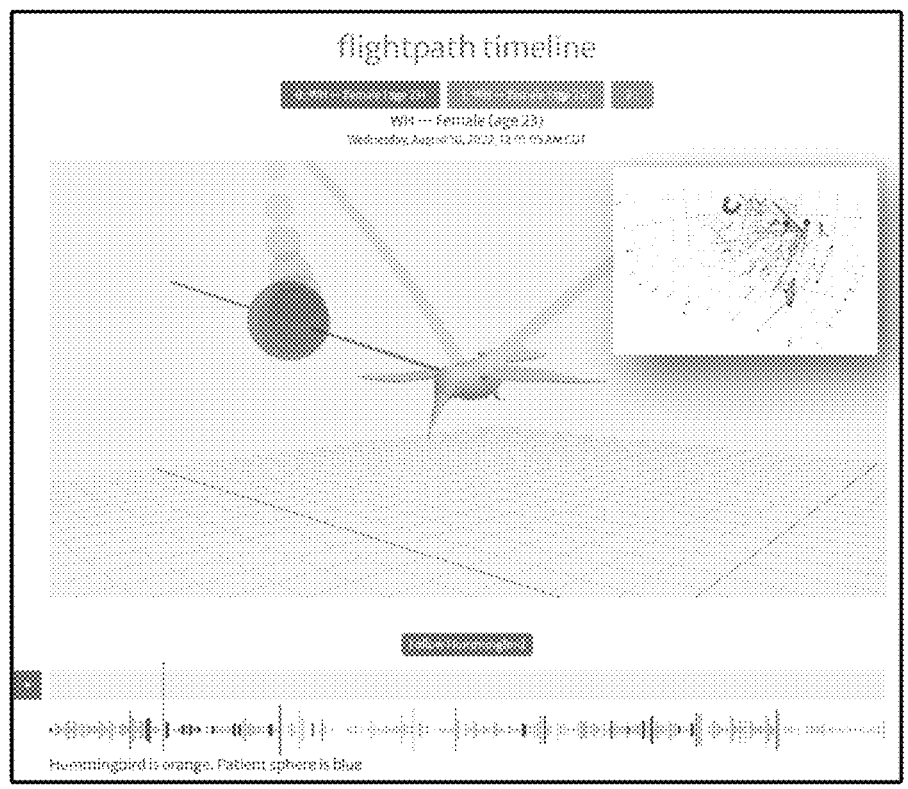
FIG. 27B illustrates a screenshot of a time-lined visual interface according to some configurations.

FIGS. 27A-27B illustrate example screenshots of interfaces according to some configurations. The example screenshots of FIGS. 27A-27B may use a NeuroDNA as input to support immersive analytics in 3D (FIG. 27A) and cognitively driven performance analysis (FIG. 27B). For example, FIG. 27A illustrates a third-person view of NeuroDNA tracking the locations/orientations of user, device, and hummingbird, overlaid to the MR cloud points captured using the smart device. FIG. 27B illustrates a time-lined visual interface designed to support performance analytic over varying level of details.

Innovative Backbone Module for Predictive DL Pipeline

This module is designed to encode NeuroDNA to enhance its representational capacity, over the 3D spatial, as well as its temporal context. In some configurations, the technology disclosed herein may be implemented using a 4-dimensional spatial-temporal backbone module that includes multiple continuous convolution layers paired with a structured space prediction submodule; having a stack of continuous convolutional layers. What sets continuous convolution apart is its ability to capture and disseminate local spatial context information; its unique use of a parameterized kernel function that engulfs the full continuous vector space, freeing it from the constraints of grid structures. This facilitates direct data input management and encodes fine-grained geometric relationships into the representation, which provides a balance between expressiveness and memory efficiency. The technology disclosed herein may also implement structured state spaces for sequence modeling (S4). S4 provides efficiency in long-term sequential modeling (including sequences spanning over 1000 timesteps). S4 is a deep sequence model, with its foundation built on a dynamic model in the latent space coupled with an observation function. The technology disclosed herein may integrate multiple S4 layers over the continuous convolution described herein. This strategic layering ensures that the model's receptive field remains unbounded across both spatial and temporal dimensions.

Predictive NCI Detection for DL Pipeline

This prediction model employs the S4 in the backbone network. Transformers may use a self-attention mechanism to comprehensively determine the pairwise relationships among input elements and subsequently aggregate these determinations based on attention scores or metrics. Once the prediction model is executed, it returns a score or metric for each impairment type at one or more timestamps. Unlike traditional detectors that depend on local grouping and non-maximum suppression, a DETR-like structure enables direct presentation of the detection results without any post-processing.

Knowledge-Grounded Screening Module for DL Pipeline

In some instances, the final stage of the DL pipeline consolidates a comprehensive list of all detected NCI signs into a machine-generated binary diagnostic decision: concussion or no concussion. The diagnostic model disclosed herein may be interpretable, because the decision can be analytically reduced back to each detected impairment sign and the weight values of those signs in attention scores or metrics. Additionally, referencing a clinical knowledge base centered on signs and symptoms associated with mTBI may also provide explainability to the reasoning process. To achieve this, the technology disclosed herein may encode the pairwise relationships between a collection of related signs and a group of symptoms into a bipartite knowledge graph. The connections between each pair of nodes may denote sign-symptom relationships, with their weights determined by expert physician evaluations. For decision-theoretical evaluations, the technology disclosed herein may archive all individual graphs and use them to complement the ultimate concussion appraisal.

The graph attention neural networks (GATs) may function as the concluding prediction header. GATs process graph-structured data, employing self-attentional layers to assign distinct weights to different connections. To tailor GATs to the pipeline(s) disclosed herein, one or more identified impairment signs may be represented as an input node, while features discerned via a global pooling layer may be combined to offer a global context. Through iterative execution of the GAT layers, the technology disclosed herein may obtain an attention weight for each link, bolstering interpretability. Such weights can either be learned from the training data, or manually specified by domain experts according to historical correlations between signs and symptoms.

Research Objective 3: Integrating the Front- and Back-End to Mobilize a Self-Evolving Workflow In some configurations, the technology disclosed herein may facilitate integration of the front- and back-end to mobilize a close-looped, self-evolving workflow for clinical evaluation of TBI-induced NCI. The key challenge to this objective is in creating and optimizing self-corrective feedback loops between the front- and back-end, so the major system components (including mobile MR computation for sampling, and data analytics/AI for predictive evaluation) will robustly carry out intended functions regardless of their encounters with sources of realistic variability, such as unknown, subtle, or complex-coupled NCI signs, and individual variations in sampling or clinical interpretation. Acquiring a self-evolving capability through the feedback loops may prove the sufficient condition for the proposed superintelligence.

Theories on Self-Evolving Capabilities and Superintelligence

Descriptive accounts of intellectual growth point out the importance of a system's degree of self-adaptive responsiveness to a given amount of optimization power. In that regard, acquiring a self-evolving capability may prove the sufficient condition for the superintelligence described herein, in that it may ensure continued excellence in clinical evaluation regardless of any possible "human-side" variations with either patients or physicians. For example, in sports-related concussion (SRC), an athlete's "sandbagging" (i.e., purposeful underperformance on baseline tests in an attempt to keep playing after injury), used to be an uncontrollable source of human variability. However, looping agent-mediated adaptive nudging in MR to the back-end data processing may allow the front-end to optimize the effect of nudging, gaining better control over such manipulative behaviors.

Rationale for Research Objective 3

One rationale for research objective 3 is creating and optimizing self-corrective feedback loops between the front- and back-end, so the mobile MR computation for sampling and data analytics/AI for predictive computing may be integrated and robustly carry out collaborative evaluation, regardless of their encounters with realistic variability in unknown, subtle, or complex-coupled NCI signs, and individual variations in sampling or clinical interpretation.

Proposed Approaches and Methods for Research Objective 3

Model Training: Data from clinical validation tests may be employed for training, as the ground truth of both concussion screening and sign detection. The two primary criteria for training evaluation include the highly accurate detection of NCI-related signs and an extremely sensitive concussion screening test.

Supervised loss: The technology disclosed herein may co-train the model using both cross-entropy loss and regression loss to achieve precise NCI sign detection. The technology disclosed herein may implement cross-entropy loss for the ultimate concussion screening decision.

Self-supervised loss: Annotated patient data, especially positive samples, are notably scarce in clinical settings, posing challenges for end-to-end learning. To address this issue, the technology disclosed herein may employ a self-supervised loss, designed to predict future trajectories within the subsequent n seconds based on current trajectories. Such a prediction task may be self-labeled, provided that subjects utilize the application to monitor the hummingbird. In summary, the self-supervision loss, detection loss, and screening loss can be delineated as:

$$\mathcal{L}_{total} = \sum_{(x,y)\in \mathcal{D}_{label}} \{\mathcal{L}_{screen} + \mathcal{L}_{signreg} + \mathcal{L}_{signclass}\} + \sum_{x\in \mathcal{D}_{unlabel}} \mathcal{L}_{selfeg}$$

where $\mathcal{L}_{screen}$ is the cross-entropy loss between the true concussion screening label and the predicted concussion screening result; $\mathcal{L}_{signreg}$ and $\mathcal{L}_{signclass}$ are interval regression loss (L2-Loss) and sign classification loss (cross-entropy) respectively; $\mathcal{L}_{selfeg}$ is the self-supervised future prediction 12-loss.

Closed-Loop Flight Parameter Adaptation

Figure 28:
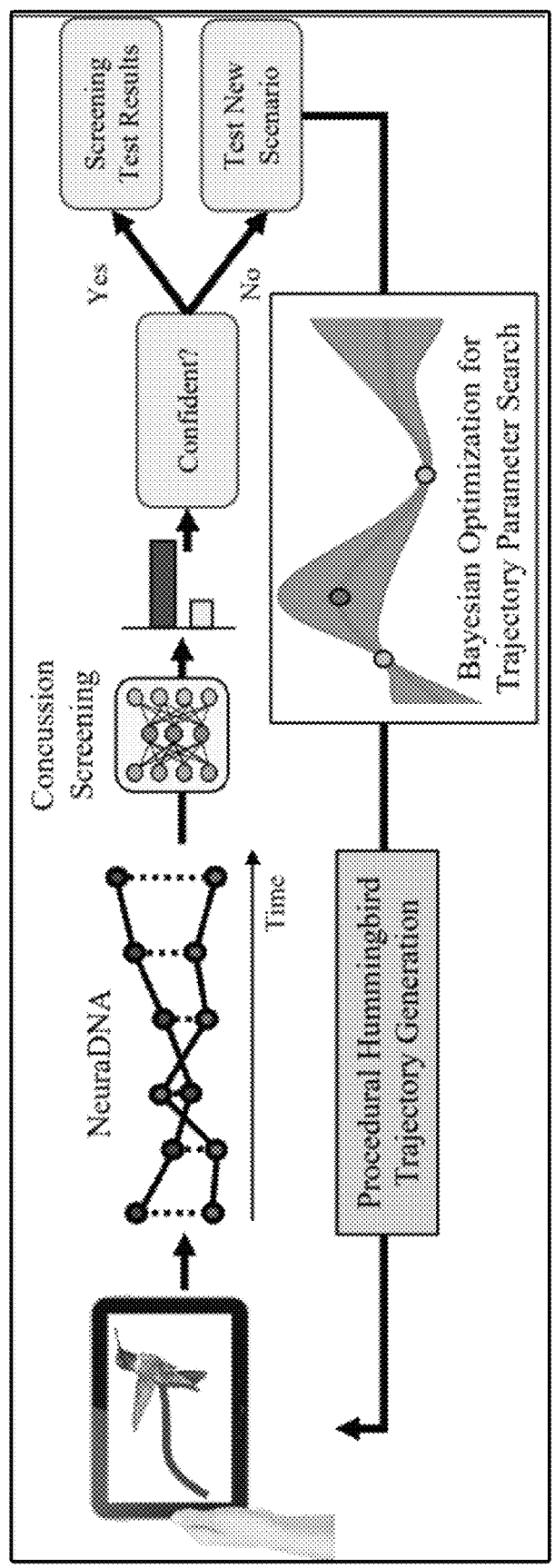
FIG. 28 illustrates a closed-loop optimization for adaptive parameters according to some configurations.

In practice, a fixed set of simulation parameters may not possibly yield a confident concussion screening. To mitigate this, an integrated feedback mechanism may be developed to ensure that the proposed application can (re)capture a sample of task performance that leads to high diagnostic confidence. In some configurations, the technology disclosed herein may employ Bayesian optimization (BO), which is a sequential optimization approach for black-box functions. Within the DL pipeline disclosed herein, BO may aid in the automatic adjustment of key parameters related to the hummingbird's flight pattern, as illustrated in FIG. 28. FIG. 28 illustrates a closed-loop optimization for adaptive parameters according to some configurations. Adjusting these parameters may allow for the sampling of various facets of NCI, thereby enhancing diagnostic confidence. BO is especially apt for parameter optimization in a real-time, proactive process, where minimal function calls are desired. The BO-driven updates may reach the desired confidence level more efficiently than a random exploration of the parameter space would.

Input data for the DL model that is imbalanced or heavily skewed could hinder the achievement of optimal sensitivity. To counteract this technical problem, the technology disclosed herein may employ an array of data augmentation strategies (such as, e.g., mix-up, cut-and-paste, random drop, and random crop) to enhance the training data volume for underrepresented classes, aiming to achieve data balance. Furthermore, self-supervised learning objectives, including context prediction and in-painting, may be implemented to aid in developing more resilient backbone models. In some configurations, meta-learning may be utilized to recalibrate the significance of training data.

Another technical challenge may include the potential biases in the knowledge graph sourced from individual experts. Clinicians may vary in their diagnostic preferences, responses to ambiguous data, and personal heuristics, which could be mirrored in the encoding of the sign-symptom relationships (see FIG. 28). In some configurations, the technology disclosed herein may consolidate weightings from all experts regarding sign-symptom pairs into a unified knowledge graph, mitigating biases arising from singular expert opinions. Proven analytical methods, e.g., for merging multiple decision weights and measuring inter-individual consistency may be leveraged to address disparities in the knowledge graph.

Research Objective 4: Extending the Evaluation Scope and Workflow to a Broader Spectrum of NCIs for Continuum of Care In some configurations, the technology disclosed herein may facilitate extension of the evaluation scope to HIV-induced NCI and an even broader spectrum of NCIs, and also scale up the workflow's time horizon to a longer period along the entire continuum of care for NCIs to support serial evaluation and palliative prognostication. Fulfilling this objective may help produce a holistic framework to help plan, develop, and deploy an interoperable standard for next-generation NCI evaluation and management. This standard also includes new forms of digitally encoded behavioral data and visualization scheme to be used for NCI evaluation, potentially as patient health information (PHI). For a part of this framework, comprehensive system-wide measurement scheme may be defined and executed to assess the entire clinical workflow, in terms of decision quality, usability, accessibility, interpretability and trust on AI, and continuity of care.

Interoperability standard for diagnosis of various NCI signs and symptoms, as well as for prognostication tool and research platform.

While challenging, the development of an interoperability standard for NCI that accounts for its numerous and heterogenous clinical manifestations would extend its clinical utility to conditions across all age groups. In childhood, over one hundred genetic conditions are associated with neurocognitive impairment. Many of these conditions, such as Rett syndrome, metachromatic leukodystrophy, and Navajo neurohepatopathy, are progressive and variable in their timelines of manifestation and deterioration. By implementing a new NCI standard (via the technology disclosed herein), such patients might be detected earlier in life. Some therapies are more effective in the earlier phases of a disease process, as is the case with gene therapy in metachromatic leukodystrophy, so early diagnosis is critical. In other instances, such as that of Navajo neurohepatopathy and other mitochondrial depletion syndromes, the proposed research tool may serve as a palliative prognostication tool to empower families to make informed care and quality-of-life decisions based on predicted levels of neurocognitive function. This palliative prognostication functionality may also benefit older patients with major and/or minor neurocognitive disorders (NCDs) such as Alzheimer's, vascular dementia, and dementia with Lewy bodies, among others. Many NCDs are associated with a component of physical impairment as well; while numerous established and emerging cognitive examinations exist for the diagnosis and prognostication of dementia, no standardized tool exists to simultaneously evaluate both neurocognitive and physical impairments. A unified testing environment could further serve to catalyze research on the complex interplay between these two types of impairments in such individuals.

New Clinical Workflow to Ensure Continuum of Care

While ImPACT and SCAT tests are widely accepted diagnostic tools, no such standard exists for the serial examination of concussed patients, which the technology disclosed herein provides for. As a common clinical example, sports-related mTBIs are often diagnosed by an athletic trainer on-site at time of injury. Advanced practice providers (e.g., neurologists) usually do not evaluate a patient until days or weeks after injury, if at all, due to delays in referral and scheduling. Unlike the initial sideline assessment, a clinic-based evaluation commonly involves a detailed neurological exam that can only be performed and interpreted by clinical experts. However, lacking detailed first-hand knowledge of the patient's clinical presentation at time of injury impedes a subspecialist's ability to determine whether these neurological exam findings convey an improvement, progression, or continuation of a patient's condition. Any subsequent evaluations by other clinical providers further introduces subjectivity in examination practices, individual interpretive biases, and reliance on detailed and accurate documentation of findings. Through the development and implementation of the technology disclosed herein, NCI evaluation and data recording may become standardized across the continuum of care, enhancing medical decision-making through the provision of longitudinal, comparative performance metrics.

HIV-Induced NCI

Among the myriad conditions associated with NCI, HIV is unusual (though not unique) in that its related impairments may be ameliorated with pharmacotherapy. While rates of NCI have decreased significantly since the advent of antiretroviral therapies, HIV-associated neurocognitive impairment continues to impact approximately 47% of patients with HIV. As with TBI-induced NCI, HIV-induced NCI can manifest heterogeneously, including attention-concentration impairment, tremors, hyperreflexia, psychomotor slowing, and even Parkinsonian-like features. The International HIV Dementia Scale is a common-practice tool to test memory, motor speed, and psychomotor speed. However, the test is rudimentary; motor speed is evaluated by asking the patient to tap the first and second fingers of his/her dominant hand as quickly as possible for five seconds, and the resultant value is recorded. Psychomotor testing is evaluated by asking the patient to clench his/her non-dominant hand into a fist on a flat surface, then flatten his/her palm on the same surface, and then place his/her hand perpendicular to the surface, thumb facing upwards. There is currently no research to suggest that HIV-induced NCI affects only the non-dominant upper extremity; given the global brain atrophy historically observed in this condition, other motor and psychomotor manifestations are likely to occur as well. The technology disclosed herein may help such patients by detecting physical manifestations of HIV-induced NCI in a more comprehensive manner.

Figure 24:
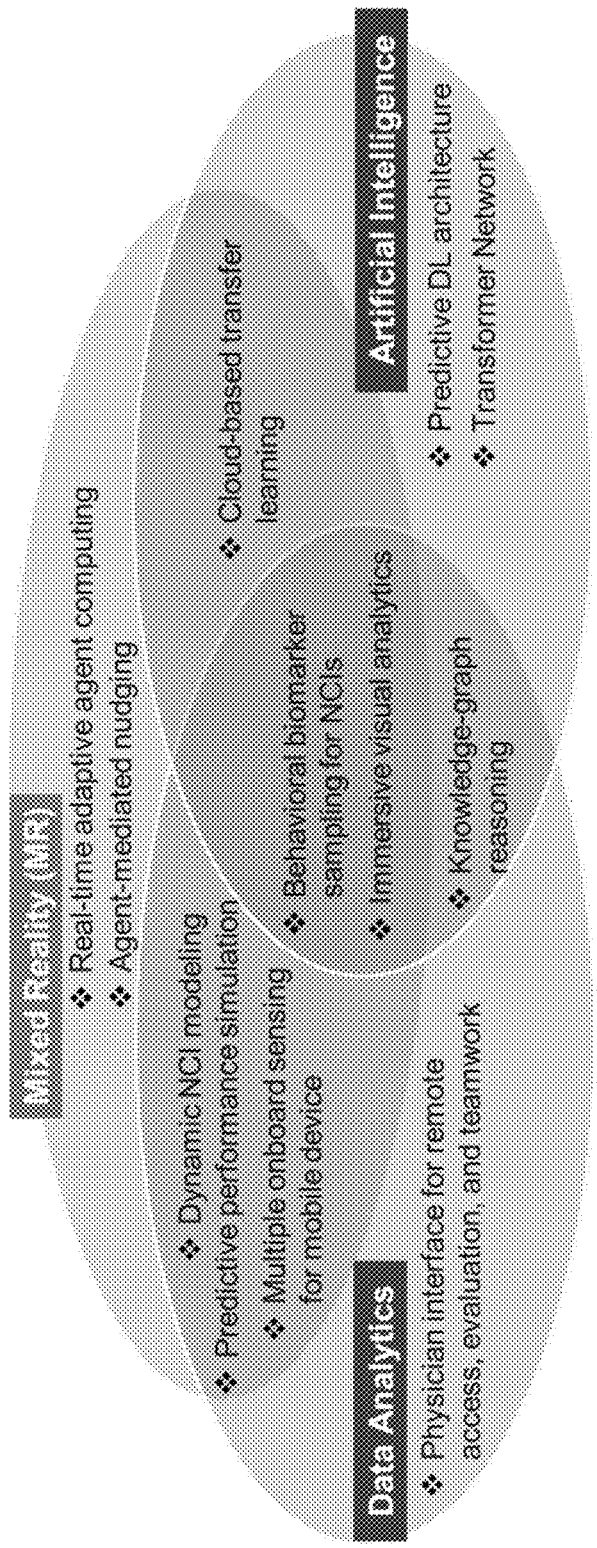
FIG. 24 is a diagram illustrating methodological advancements at the junctions of mobile MR computing, data analytics, and AI according to some configurations.

Accordingly, the technology discloses here may provide advancements in mobile MR computing, data analytic, and AI (as illustrated in FIG. 24) will converge to collective superintelligence: a system composed of smaller intellects that as a whole vastly outperforms conventional human effort alone. Through logical and empirical proofs that such superintelligence exists, the proposed AI/data-enhanced decision support will surpass the current quality of diagnosis, prognosis, and long-term management of NCIs.

The technology disclosed herein may utilize transformative data analytics and machine learning toward superintelligence in clinical evaluation. For instance, the technology disclosed herein may provide: (a) real-time computation of the virtual hummingbird interacting with a user in MR to create an adaptive agent; (b) runtime dynamic modeling of NCI through active sampling of users' "behavioral" biomarkers that are likely to be associated with NCI; or c) augmented clinical evaluation through the combination of predictive deep learning (DL) with knowledge-graph reasoning to offer flexible interpretability, as well as the predictive simulation of population-level performance to objectively infer the boundaries of normalcy.

The technology disclosed herein may facilitate engineering a streamlined clinical workflow consisting of patients, clinicians, and AI, which may include, e.g., a) offering a specialized Cloud service to support the workflow through integration of multiple forms of onboard sensing of patient behaviors onsite, sampled via an MR app on smart devices, machine-learned detection of NCI biomarkers, and clinical case registration and update; or b) designing for a remotely accessible user interface and immersive visual analytics to promote diagnostic collaboration between physicians and AI.

The technology disclosed herein may provide advancements in social, behavioral, or clinical science in the newly engineered clinical workflow, including, e.g., a) investigating how the AI collaboration model (either as an assistive tool or as a team member like other physician colleagues) may affect interpretability, demand, trust, and adoption of AI; b) examining the efficacy of agent-mediated adaptive "nudging" in MR to ensure effective, efficient, and robust sampling of behavioral biomarkers; and c) validating those biomarkers as clinically proven signs and symptoms of NCI by cross-referencing the biomarkers against the gold-standard diagnostic methods.

With respect to User Research, including usability testing and iterative design improvement, the technology disclosed herein has been tested on diverse population groups, including youth (age<17) and adult (age>50) groups, with data collected on up to 90 participants running two-minute sessions. Additionally, the technology disclosed herein was subject to a clinicians focused group interviewing process, which included interviewing eight clinical personnel including physicians, nurses, and athletic trainers, who have conducted concussion diagnosis in the last two years, as part of their professional obligations. The findings from the interviews included that: 1) most participants expressed a desire for automated tools in their concussion diagnosis toolkit, expecting such tools to introduce a level of objectivity into concussion diagnosis, and 2) many commented on desirable properties of those tools, including quick to use and support for flexible level of interpret-ability.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), Flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The present disclosure has described one or more preferred embodiments, and it should be appreciated that many equivalents, alternatives, variations, and modifications, aside from those expressly stated, are possible and within the scope of the technology disclosed herein.

The invention claimed is:

1. A system for providing neurocognitive impairment simulation using extended reality, the system comprising:
   one or more electronic processors configured to:
      generate an extended reality user environment ("XR-UX") for display via a user device, the XR-UX including a first augmented object configured to change position within the XR-UX and a second augmented object configured to dynamically change position within the XR-UX based on a position of the user device;
      control the first augmented object to traverse a path within the XR-UX;
      receive motion data describing physical movement of the user device;
      determine a performance metric based on the physical movement of the user device in relation to the path;
      dynamically adapt the path traversed by the first augmented object based on the performance metric;
      control, using the motion data, the second augmented object to dynamically change position within the XR-UX to represent the physical movement of the user device;
      determine a medical classification based on the physical movement of the user device in relation to the path; and
      generate and transmit an assessment report for display, the assessment report including the medical classification.

2. The system of claim 1, wherein the one or more electronic processors are configured to receive environment data from a sensor of the user device, wherein the environment data describes an external environment of the user device.

3. The system of claim 2, wherein the one or more electronic processors are configured to control the first augmented object based on the environment data.

4. The system of claim 1, wherein the one or more electronic processors are configured to dynamically adapt the path traversed by the first augmented object based on the physical movement of the user device.

5. The system of claim 1, wherein the one or more electronic processors are configured to determine the medical classification using a classification model trained using machine learning.

6. The system of claim 1, wherein the one or more electronic processors are configured to transmit the assessment report to another user device associated with a medical professional.

7. The system of claim 1, wherein the medical classification is indicative of a neurocognitive impairment of a user of the user device.

8. The system of claim 1, wherein the second augmented object is located, within the XR-UX, a fixed distance apart from the user device.

9. The system of claim 1, wherein the one or more electronic processors are configured to determine the medical classification based on at least one of:
(a) a spatial relationship of the first augmented object and the second augmented object;
(b) a temporal relationship of the first augmented object and the second augmented object;
(c) a spatiotemporal relationship of the first augmented object and the second augmented object; or
(d) a tracking pattern of the first augmented object and the second augmented object.

10. A method for providing neurocognitive impairment simulation using extended reality, the method comprising:
generating, with one or more electronic processors, an extended reality user environment ("XR-UX") for display via a user device, the XR-UX including a first augmented object and a second augmented object;
controlling, with the one or more electronic processors, the first augmented object to traverse a path within the XR-UX;
receiving, with the one or more electronic processors, motion data describing movement of the user device;
determining, with the one or more electronic processors, a performance metric based on the movement of the user device in relation to the path;
dynamically adapting, with the one or more electronic processors, the path traversed by the first augmented object based on the performance metric;
controlling, with the one or more electronic processors, using the motion data, the second augmented object within the XR-UX to dynamically change position to represent the movement of the user device;
determining, with the one or more electronic processors, a medical classification based on a spatiotemporal relationship between the movement of the user device and the path; and
generating and transmitting, with the one or more electronic processors, an assessment report for display, the assessment report including the medical classification.

11. The method of claim 10, wherein generating the XR-UX includes:
receiving, from a sensor of the user device, environment data describing an external surrounding of the user device,
wherein the XR-UX is generated such that the XR-UX reflects the external surrounding of the user device.

12. The method of claim 10, further comprising:
receiving environment data from a sensor of the user device, wherein the environment data describes an external environment of the user device; and
generating, based on the environment data, a scene mesh of the external environment of the user device,
wherein controlling the first augmented object to traverse the path includes controlling the first augmented object to traverse the path based on the scene mesh.

13. The method of claim 10, further comprising:
determining, based on the movement of the user device in relation to the path, a subsequent path for the first augmented object;
controlling the first augmented object to traverse the subsequent path; and
receiving subsequent motion data describing subsequent movement of the user device,
wherein determining the medical classification includes determining the medical classification based on the subsequent movement of the user device in relation to the subsequent path.

14. The method of claim 13, wherein determining the subsequent path for the first augmented object includes:
receiving, with the one or more electronic processors, environment data describing an external environment of the user device; and
determining the subsequent path for the first augmented object based on the environment data and the motion data.

15. A non-transitory, computer-readable medium storing instructions that, when executed by an electronic processor, perform a set of functions, the set of functions comprising:
generating an extended reality user environment ("XR-UX") for display via a user device, the XR-UX including a first augmented object configured to change position within the XR-UX and a second augmented object configured to dynamically change position within the XR-UX based on a position of the user device;
controlling the first augmented object to traverse a path within the XR-UX;
receiving motion data describing physical movement of the user device;
determining a performance metric based on the physical movement of the user device in relation to the path;
dynamically adapt the path traversed by the first augmented object based on the performance metric;
controlling, using the motion data, the second augmented object to dynamically change position within the XR-UX to represent the position of the user device;
determining a medical classification based on the physical movement of the user device in relation to the path; and
generating and transmitting an assessment report for display, the assessment report including the medical classification.

16. The computer-readable medium of claim 15, wherein controlling the first augmented object to traverse the path includes controlling the first augmented object to continuously change positions.

17. The computer-readable medium of claim 15, wherein controlling the first augmented object to traverse the path includes controlling the first augmented object to move to a multi-dimensional position and upon reaching the multi-dimensional position, maintaining the multi-dimensional position until a subsequent change in position of the user device is detected.

18. The computer-readable medium of claim 15, wherein controlling the first augmented object to traverse the path includes controlling the first augmented object to traverse a three-dimensional path.

19. The computer-readable medium of claim 15, wherein controlling the first augmented object to traverse the path includes controlling a speed at which the first augmented object traverses the path.

* * * * *